US009784417B1

(12) United States Patent
Springer

(10) Patent No.: US 9,784,417 B1
(45) Date of Patent: Oct. 10, 2017

(54) MULTI-PURPOSE LIGHTBULB

(71) Applicant: Astro, Inc., New York, NY (US)

(72) Inventor: Shaun Springer, Brooklyn, NY (US)

(73) Assignee: ASTRO, INC., New York, NY (US)

( * ) Notice: Subject to any disclaimer, the term of this patent is extended or adjusted under 35 U.S.C. 154(b) by 0 days.

(21) Appl. No.: 15/213,508

(22) Filed: Jul. 19, 2016

Related U.S. Application Data

(63) Continuation-in-part of application No. 14/805,316, filed on Jul. 21, 2015, now Pat. No. 9,408,282.
(Continued)

(51) Int. Cl.
*F21V 1/00* (2006.01)
*F21K 9/238* (2016.01)
(Continued)

(52) U.S. Cl.
CPC .............. *F21K 9/238* (2016.08); *F21K 9/232* (2016.08); *F21K 9/237* (2016.08); *F21K 9/61* (2016.08);
(Continued)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS 6,414,801 B1 * 7/2002 Roller .................. B60Q 1/0052 359/726
6,465,961 B1 * 10/2002 Cao ........................... F21V 3/00 257/E25.02
(Continued)

FOREIGN PATENT DOCUMENTS

GB 2479666 A 10/2011
GB 2483091 A 2/2012

OTHER PUBLICATIONS

Insteon LED Bulb, Smarthome Home Automation Superstore, Internet Archive Jul. 20, 2014, http://web.archive.org/web/20140720103143/http://www.smarthome.com/2672-222/INSTEON-LED-Bulb/p.aspx, 6 pages.

*Primary Examiner* — Douglas W Owens
*Assistant Examiner* — Syed M Kaiser
(74) *Attorney, Agent, or Firm* — Amster, Rothstein & Ebenstein, LLP

(57) ABSTRACT

A lighting device for use with one or more other networked devices is disclosed. In embodiments, the lighting device may comprise an outer globe, a diffuser, an outer cowling, a power input connector, a power control printed circuit board, a communication and control printed circuit board, an indicator printed circuit board, one or more microprocessors, a real-time clock, a supercapacitor, and an LED lighting printed circuit board. In embodiments, the real-time clock may be powered by the supercapacitor to track time without power from an input power source for the lighting device, enabling the lighting device to implement time-dependent settings, such as pre-programmed color temperatures and/or light intensities. The lighting device may communicate with one or more other networked devices, such as second lighting devices, mobile phones, servers, remote controls, and/or home or office automation equipment. The lighting device may be powered through a light socket.

33 Claims, 44 Drawing Sheets

520
518
516
514
512
510
508
506
504
502

Related U.S. Application Data

(60) Provisional application No. 62/183,276, filed on Jun. 23, 2015, provisional application No. 62/027,125, filed on Jul. 21, 2014.

(51) Int. Cl.

| | |
|---|---|
| ***F21V 3/04*** | (2006.01) |
| ***F21V 23/00*** | (2015.01) |
| ***F21V 29/503*** | (2015.01) |
| ***F21V 19/00*** | (2006.01) |
| ***F21K 9/61*** | (2016.01) |
| ***F21K 9/232*** | (2016.01) |
| ***F21K 9/237*** | (2016.01) |
| ***F21V 23/02*** | (2006.01) |
| ***H04R 1/02*** | (2006.01) |
| ***H05B 37/02*** | (2006.01) |
| ***H05B 33/08*** | (2006.01) |
| *F21Y 105/18* | (2016.01) |
| *F21Y 115/10* | (2016.01) |
| *F21Y 113/13* | (2016.01) |

(52) U.S. Cl.

CPC .......... *F21V 3/0445* (2013.01); *F21V 19/003* (2013.01); *F21V 23/006* (2013.01); *F21V 23/023* (2013.01); *F21V 29/503* (2015.01); *H04R 1/028* (2013.01); *H05B 33/0809* (2013.01); *H05B 33/0854* (2013.01); *H05B 37/0272* (2013.01); *H05B 37/0281* (2013.01); *F21Y 2105/18* (2016.08); *F21Y 2113/13* (2016.08); *F21Y 2115/10* (2016.08)

(58) Field of Classification Search

CPC .............. H05B 33/0896; H05B 37/029; H05B 37/0245; H05B 37/0254

USPC .......... 315/51, 235, 294, 152, 307; 326/235, 326/351, 294, 84

See application file for complete search history.

(56) References Cited

U.S. PATENT DOCUMENTS 6,634,771 B2 * 10/2003 Cao .......................... F21V 3/04 257/E25.02
6,719,446 B2 * 4/2004 Cao .......................... F21V 3/00 257/E25.02
6,812,970 B1 11/2004 McBride
7,161,313 B2 * 1/2007 Piepgras ................ F21S 8/035 315/292
7,455,435 B2 11/2008 Mathews et al.
7,510,299 B2 * 3/2009 Timmermans ..... H05B 33/0803 362/221
8,033,686 B2 10/2011 Recker et al.
8,602,579 B2 * 12/2013 Van de Ven ............ F21K 9/233 362/249.02
2002/0009275 A1 * 1/2002 Williams ............. G02B 6/0008 385/123
2003/0197807 A1 10/2003 Wu
2003/0210340 A1 11/2003 Frederick Romanowich
2006/0044789 A1 3/2006 Curtis
2006/0227558 A1 * 10/2006 Osawa ...................... F21V 3/00 362/351
2007/0258231 A1 * 11/2007 Koerner .................. B43L 1/004 362/109
2009/0096413 A1 * 4/2009 Partovi ................... H01F 5/003 320/108
2010/0103678 A1 * 4/2010 Van De Ven ............ F21K 9/00 362/294
2010/0110699 A1 * 5/2010 Chou ...................... F21S 8/026 362/365
2010/0296285 A1 * 11/2010 Chemel ................... F21S 2/005 362/235
2011/0133655 A1 * 6/2011 Recker ...................... H02J 9/02 315/159
2011/0163681 A1 * 7/2011 Dau ................... H05B 33/0845 315/191
2011/0273881 A1 * 11/2011 Domagala ............... F21K 9/233 362/235
2011/0273906 A1 * 11/2011 Nichol ................. G02B 6/0076 362/607
2011/0286200 A1 * 11/2011 Iimura .................... F21V 7/041 362/84
2012/0080699 A1 * 4/2012 Chowdhury .............. F21V 7/22 257/98
2012/0206050 A1 * 8/2012 Spero ...................... B60Q 1/04 315/152
2012/0235579 A1 * 9/2012 Chemel ................... F21S 2/005 315/152
2012/0261078 A1 * 10/2012 Adams ...................... E06B 9/32 160/6
2014/0043822 A1 * 2/2014 Bhattarai .............. F21V 29/248 362/294
2014/0334147 A1 * 11/2014 Bhattarai .................. F21K 9/90 362/235
2014/0355241 A1 * 12/2014 Takenaka .............. F21V 7/0016 362/84
2015/0062909 A1 * 3/2015 Progl ...................... F21K 9/135 362/294
2015/0252969 A1 * 9/2015 Panzella ................. E01C 17/00 362/153.1
2015/0260353 A1 * 9/2015 Bhattarai .............. F21K 9/1355 362/235
2015/0276239 A1 * 10/2015 Fadell ................ G05D 23/1905 237/2 A
2015/0276266 A1 * 10/2015 Warren ................. H04W 4/005 700/300
2016/0069518 A1 * 3/2016 Steele ....................... F21V 7/00 362/84

* cited by examiner

Power Failure Detection

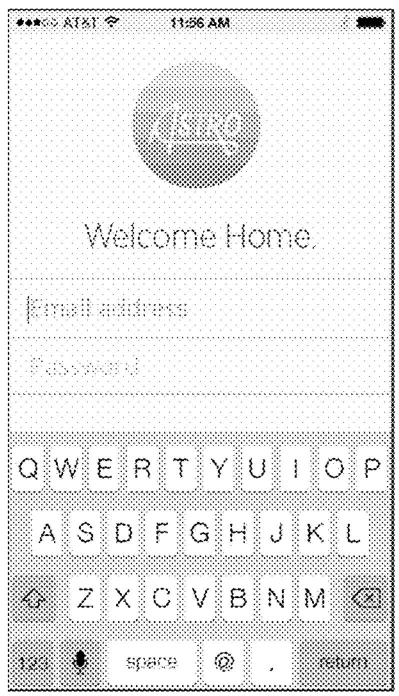
FIG. 16A
AT&T 11:56 AM
Shaun's Apartment
NEW BULBS
New Bulb 1
Distance: 0.5ft
New Bulb 2
Distance: 3.5ft
KITCHEN
Kitchen Island
Kitchen Sink
MASTER BEDROOM
Bedside Lamp
Bathroom Vanity
FIG. 16B
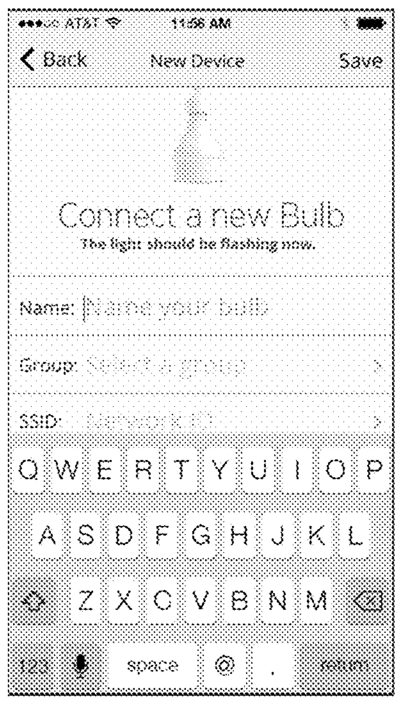
FIG. 16C
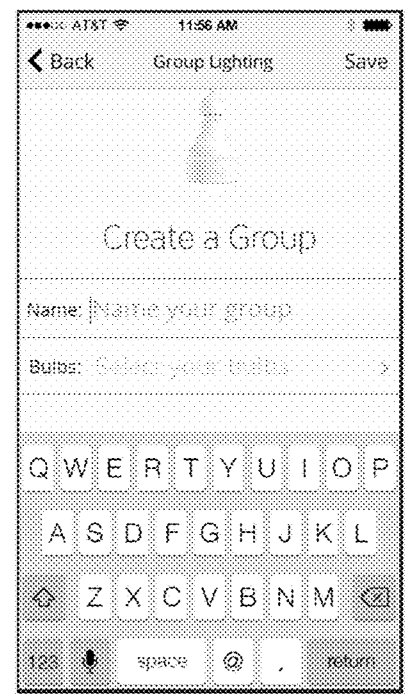
FIG. 16D

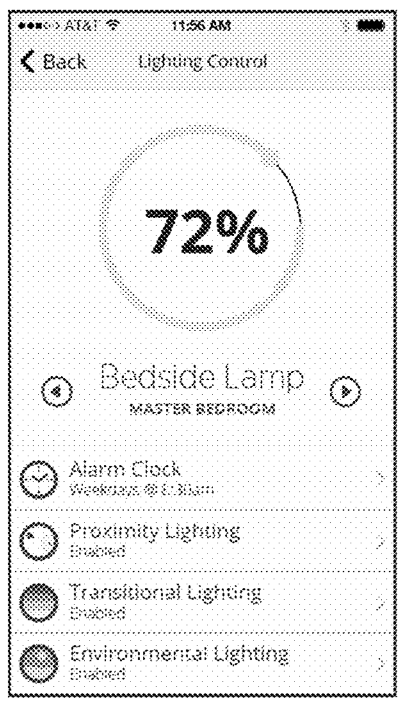
FIG. 17A
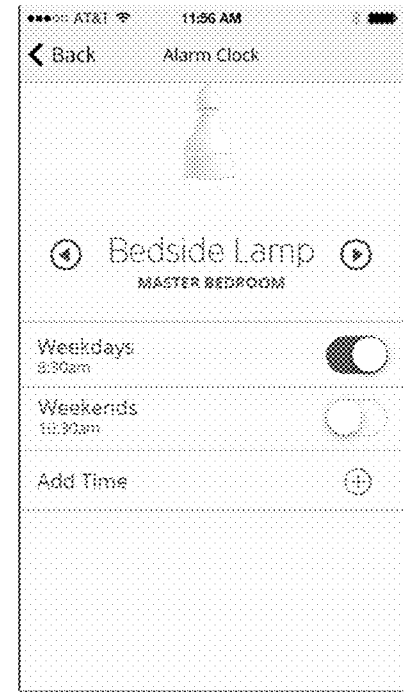
FIG. 17B
AT&T
11:56 AM
Back
Proximity Lighting
Bedside Lamp
MASTER BEDROOM
Arrive Home
Turn On
Leave Home
Turn Off
FIG. 17C
AT&T
11:56 AM
Back
Night Light
Bedside Lamp
MASTER BEDROOM
Bedtime
Sunset
Kids Bedtime
8:00pm
Add Time
FIG. 17D

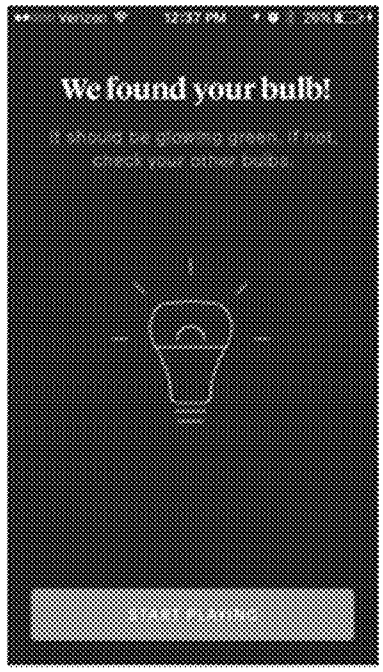
FIG. 22E
Name your speaker
Hallway
Table Lamp
2214
FIG. 22F
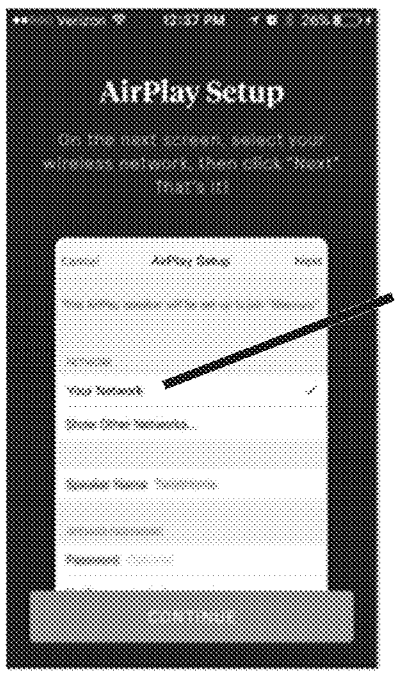
FIG. 22G
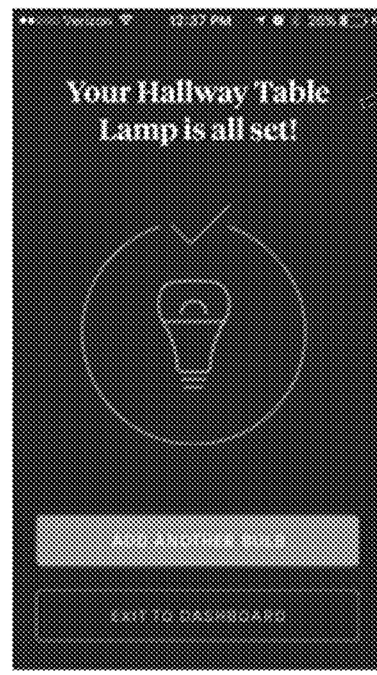
FIG. 22H

MULTI-PURPOSE LIGHTBULB

RELATED APPLICATIONS

This application claims the benefit as a continuation-in-part of U.S. Ser. No. 14/805,316, filed Jul. 21, 2015, to be issued as U.S. Pat. No. 9,408,282 on Aug. 2, 2016, which in turn claims the benefit of U.S. Ser. No. 62/027,125, filed on Jul. 21, 2014, and U.S. Ser. No. 62/183,276, filed on Jun. 23, 2015, the contents of each of which are incorporated by reference as if fully set forth herein.

FIELD

The present invention generally relates to lightbulbs incorporating other functionalities. In embodiments, lightbulbs may include such other functionalities as networking devices, speakers, cameras, and/or auxiliary lighting. In embodiments, lightbulbs may be incorporated in to home automation systems, and method and program products.

SUMMARY

A lightbulb is disclosed which incorporates one or more other functionalities, such as networking devices, speakers, cameras and/or auxiliary lighting. Such lightbulbs may be used as part of a home and/or office automation system and may interact with other networked devices, like cell phones, tablets, computers, other lightbulbs, speakers, to name a few.

In embodiments, a lighting device for use with one or more other networked devices can comprise an outer globe comprised of an at least partially transparent rigid material and forming the exterior of a head portion of the lighting device; a diffuser within the outer globe configured to receive light from one or more light sources and emit diffused light; a plurality of light pipes configured to transport light from one or more light emitting diodes (LEDs) to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat. The power control printed circuit board can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further comprise a communication and control printed circuit board within the lighting device operatively connected to the power control printed circuit board, which communication and control printed circuit board can comprise a first wireless communications module operatively connected to a first communications antenna and an auxiliary device control unit.

The lighting device can comprise an indicator printed circuit board within the lighting device, which can comprise a first plurality of LEDs each configured to deliver light to a respective one of the plurality of light pipes; a real-time clock configured to track time; and a supercapacitor operatively connected to the real-time clock and configured to provide power to the real-time clock at least in the absence of electricity flowing in to the lighting device via the power input connector. In embodiments, the first plurality of LEDs of the indicator printed circuit board may be RGB LEDs.

The lighting device can comprise one or more microprocessors operatively connected to first non-transitory computer-readable memory having stored thereon first processing instructions readable by at least one of the one or more microprocessors; an auxiliary device mounted within the lighting device closer to the head of the lighting device than the indicator printed circuit board, operatively connected to the communication and control printed circuit board, and configured to receive power from the power control printed circuit board; and an LED lighting printed circuit board mounted within the lighting device closer to the head of the lighting device than the indicator printed circuit board and having an aperture through which the auxiliary device extends, the LED lighting printed circuit board operatively connected to the indicator printed circuit board, configured to receive power from the power control printed circuit board and comprising a second plurality of LEDs configured to deliver light through the diffuser.

In embodiments, the first communications antenna may be located on the indicator printed circuit board. In embodiments, the first wireless communications module may be configured to communicate with one or more of the one or more other networked devices using a mesh network communications protocol. In embodiments, the lighting device may further comprise a second wireless communications module operatively connected to a second communications antenna. In embodiments, the first wireless communications module may be configured to communicate via Wi-Fi and the second wireless communications module is configured to communicate via a Bluetooth protocol (e.g., Bluetooth Low Energy and/or Bluetooth 4.0 or higher, to name a few).

In embodiments, at least one of the one or more microprocessors may be located on the indicator printed circuit board. In embodiments, at least one of the one or more microprocessors may be located on the communications and control printed circuit board. In embodiments, the auxiliary device control unit may comprise at least one of the one or more microprocessors configured to control the auxiliary device.

In embodiments, the communication and control printed circuit board, the indicator printed circuit board, and the LED lighting printed circuit board may comprise a stacked circuit board configuration within the lighting device.

In embodiments, the output current controller may comprise an LED driver.

In embodiments, the first processing instructions may comprise time-dependent settings, and the lighting device may output light (e.g., a particular color temperature and/or intensity) according to the time-dependent settings based at least in part upon a time measured by the real-time clock.

In embodiments, a lighting device for use with one or more other networked devices may comprise an outer globe comprised of an at least partially transparent rigid material and forming the exterior of a head portion of the lighting device; a diffuser within the outer globe configured to receive light from one or more light sources and emit diffused light; an LED printed circuit board comprising a plurality of LEDs configured to deliver light through the diffuser; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat. The power control printed circuit board may comprise a power converter configured to convert alternating current to direct current; a voltage regulator configured to output steady direct current power at one or more voltages; an LED driver configured to control output of power to a plurality of LEDs; an output power connector to output power to one or more other components within the lighting device; and an output current controller configured to control the output of electric current to the one or more other components within the lighting device.

The lighting device may further comprise one or more printed circuit boards within the lighting device operatively connected to the power control printed circuit board and comprising a first wireless communications module operatively connected to a first communications antenna and configured to communicate wirelessly with one or more mobile user devices; a real-time clock configured to track time; and a supercapacitor operatively connected to the real-time clock and configured to provide power to the real-time clock at least in the absence of electricity flowing in to the lighting device via the power input connector; and one or more microprocessors operatively connected to first non-transitory computer-readable memory having stored thereon first processing instructions readable by at least one of the one or more microprocessors to control the plurality of LEDs, wherein the first processing instructions may include instructions to adjust light intensity of the plurality of LEDs based at least in part upon time of day.

In embodiments, the first wireless communications module may be configured to communicate directly with the one or more mobile user devices via a direct wireless connection (e.g., using a Bluetooth Low Energy or other Bluetooth communications protocol). In embodiments, the first wireless communications module may be configured to communicate indirectly with the one or more mobile user devices via at least one data network, such as a wireless area network (e.g., provided via a router) and/or the Internet.

In embodiments, the first processing instructions may comprise time-dependent settings, and the lighting device may output light according to the time-dependent settings based at least in part upon a time measured by or measurable by the real-time clock. In embodiments, the time-dependent settings may indicate a color temperature and/or a light intensity.

In embodiments, a lighting device for use with one or more other networked devices may comprise an outer globe comprised of an at least partially transparent rigid material and forming the exterior of a head portion of the lighting device; a diffuser within the outer globe configured to receive light from one or more light sources and emit diffused light; an outer cowling forming the exterior of a base portion of the lighting device; a power input connector located at the base of the lighting device and configured to mate with a standard lightbulb socket; and power control components, which can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further comprise communication and control components, which may comprise one or more microprocessors operatively connected to non-transitory computer readable memory having stored thereon processing instructions readable by at least one of the one or more microprocessors; a first wireless communications module operatively connected to a first communications antenna and to at least one of the one or more microprocessors; a real-time clock configured to track time; and a supercapacitor operatively connected to the real-time clock and configured to provide power to the real-time clock at least in the absence of electricity flowing into the lighting device via the power input connector. The lighting device may also comprise an auxiliary device and a first plurality of LEDs configured to deliver light through the diffuser. In embodiments, the first plurality of LEDs may be located on an LED lighting printed circuit board. In embodiments, a radiator may be configured to dissipate heat, such as from the LEDs and/or circuitry.

In embodiments, the first communications antenna may be located on the indicator printed circuit board. In embodiments, the first wireless communications module may be configured to communicate with one or more of the one or more other networked devices using a mesh network communications protocol. In embodiments, the lighting device may further comprise a second wireless communications module operatively connected to a second communications antenna. In embodiments, the first wireless communications module may be configured to communicate via Wi-Fi, and the second wireless communications module may be configured to communicate via a Bluetooth protocol.

In embodiments, at least one of the one or more microprocessors may be configured to control the auxiliary device. In embodiments, at least one of the one or more microprocessors may be located on the indicator printed circuit board. In embodiments, at least one of the one or more microprocessors is located on the communications and control printed circuit board.

In embodiments, the first processing instructions may comprise time-dependent settings, and the lighting device outputs light according to the time-dependent settings based at least in part upon a time measured by the real-time clock.

In embodiments, a system of networked devices may be provided. Networked devices may comprise a base unit and a head unit, wherein the base unit is mated to a lighting socket from which it can receive power. The head unit may comprise a variety of core devices, such as a camera, speaker, sensor, and/or lighting device. In embodiments, the head unit may be a swappable attachment. In embodiments, each networked device may be a single unit without a separable base unit and head unit. In embodiments, a networked device may comprise communications hardware and software to communicate with other networked devices, user devices, such as smart phones and/or computers, and/or servers, to name a few. In embodiments, a networked device system can include master devices with full communications capabilities and slave devices, which may only communicate with or through master devices. The networked device system can include control units, which may comprise downloadable applications on user devices, a control server accessed through a web-based portal such as a website, self-contained control devices such as local remote control devices, and/or devices that provide additional functionality (such as clocks, alarm clocks, and/or digital photo frames) but also include networked device controls.

In embodiments, an infrared blaster may be used as a remote control. An infrared blaster may emulate an infrared remote control to control devices programmatically instead of requiring remote control key presses.

In embodiments, the present invention may provide a rapidly deployable home automation system without requiring permanent fitting or retrofitting of system components.

The networked device system can provide any of a lighting system, security system (e.g., comprising one or more cameras and/or motion detectors), climate control system (e.g., comprising climate and/or environmental sensors and/or controls), stereo system (e.g., comprising one or more speakers), video game and/or entertainment system (e.g., featuring any of ambient lighting, surround sound, motion detectors for body movement video game control inputs, other intelligent gesture control based on input gestures, and/or multi-projector system for 3-dimensional projections, to name a few), and/or network access points (e.g., Wi-Fi routers, Wi-Fi or other signal repeaters, mesh network relay nodes), to name a few.

In embodiments, a lighting device for use with one or more other networked devices may comprise an outer globe comprised of an at least partially transparent rigid material (e.g., clear copolyester, glass, to name a few) and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; and an outer cowling forming the exterior of a base portion of the lighting device.

The lighting device can include a power input connector located at the base of the lighting device and configured to mate with a standard lightbulb socket, as well as a power control printed circuit board (PCB) within the lighting device operatively connected to the power input connector and disposed at least partially within a heat sink configured to dissipate heat. The power control PCB can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further include a communication and control printed circuit board within the lighting device operatively connected to the power control printed circuit board and comprising a first wireless communications module operatively connected to a first communications antenna; an auxiliary device control unit. The lighting device may comprise an indicator printed circuit board within the lighting device operatively connected to the communication and control printed circuit board and configured to receive power from the power control printed circuit board via the communication and control printed circuit board and comprising a first plurality of LEDs each configured to deliver light to a respective one of the plurality of light pipes and one or more microprocessors operatively connected to first non-transitory computer-readable memory having stored thereon first processing instructions readable by at least one of the one or more microprocessors.

The lighting device may include an auxiliary device mounted within the lighting device closer to the head of the lighting device than the indicator printed circuit board, operatively connected to the communication and control printed circuit board, and configured to receive power from the power control printed circuit board via the communication and control printed circuit board.

The lighting device can further include an LED lighting printed circuit board mounted within the lighting device closer to the head of the lighting device than the indicator printed circuit board and having an aperture through which the auxiliary device extends, the LED lighting printed circuit board operatively connected to the indicator printed circuit board, operatively connected via the indicator printed circuit board to the communication and control printed circuit board, configured to receive power from the power control printed circuit board via both the indicator printed circuit board and the communication and control printed circuit board, and comprising a second plurality of LEDs configured to deliver light through the diffuser.

In embodiments, the auxiliary device control unit may comprise at least one of the one or more microprocessors configured to control the auxiliary device. In embodiments, the auxiliary device may comprise any of a speaker, a battery back-up power supply for the lighting device, a camera, a microphone, an air quality sensor, a motion sensor, an occupancy sensor, a Wi-Fi repeater, or an infrared blaster.

In embodiments, the first plurality of LEDs of the indicator printed circuit board may comprise RGB LEDs.

In embodiments, the first wireless communications module may be configured to communicate with one or more of the one or more other networked devices using a Wi-Fi protocol.

In embodiments, the indicator printed circuit board may comprise a second wireless communications module, which may be configured to communicate with one or more of the one or more other networked devices using a mesh network communications protocol (e.g., a broadcast/scan mesh network protocol). In embodiments, the second wireless communications module may communicate via Bluetooth or Bluetooth Low Energy communications protocols.

In embodiments, at least one of the one or more microprocessors may be located on the communications and control printed circuit board. It may be configured to control the auxiliary device. In embodiments, at least one of the one or more microprocessors is located on the indicator printed circuit board. It may be configured to control lighting and/or certain communications, such as mesh network communications.

In embodiments, the communication and control printed circuit board, the indicator printed circuit board, and the LED lighting printed circuit board comprise a stacked circuit board configuration within the lighting device. Different auxiliary devices may be manufactured by producing a device with a different auxiliary device, a respective communications and control PCB for the auxiliary device, and/or a different globe. In embodiments, power and/or internal circuitry communications signals may flow through the device from one PCB to the next. For example, PCBs, such as the indicator PCB and the communications and control PCB, may communicate with each other using a universal asynchronous receiver/transmitter (UART).

In embodiments, the lighting device may comprise direct connections between components instead of or in addition to signals flowing through the PCB stack. For example, a wired connection such as a ribbon cable may operatively connect the auxiliary device with the communications and control PCB.

In other embodiments, components of the lighting device may not be mounted on printed circuit boards.

In embodiments, the other networked devices with which the lighting device may communicate can include any of a second lighting device, computer, server, mobile phone, user electronic device, remote control, dimmer control device, networkable alarm clock, environmental sensor, sub-woofer, sub-woofer within a lamp, speaker, audio source device, or television.

A second lighting device may include a second outer globe comprised of an at least partially transparent rigid material and forming the exterior of a head portion of the lighting device; a second diffuser within the second outer globe configured to receive light from one or more light sources and emit diffused light; a plurality of second light pipes configured to transport light from one or more LEDs to an inner surface of the second diffuser, each second light pipe a solid conduit comprised of transparent material; a second outer cowling forming the exterior of a base portion of the second lighting device; a second power input connector located at the base of the second lighting device and configured to mate with a standard lightbulb socket; and a second power control printed circuit board within the second lighting device operatively connected to the second power input connector and disposed at least partially within a second heat sink configured to dissipate heat. The second power control PCB may comprise a second power converter configured to convert alternating current to direct current; a second voltage regulator configured to output steady direct current power at one or more voltages; a second output power connector to output power to one or more other components within the second lighting device; and a second output current controller configured to control the output of electric current to the one or more other components within the second lighting device.

The second lighting device can also include a second indicator printed circuit board within the second lighting device operatively connected to the second communication and control printed circuit board and configured to receive power from the second power control printed circuit board via the second communication and control printed circuit board and comprising a third plurality of LEDs each configured to deliver light to a respective one of the plurality of second light pipes and a second wireless communications module.

The second lighting device may include one or more second microprocessors operatively connected to second non-transitory computer-readable memory having stored thereon second processing instructions readable by at least one of the one or more second microprocessors and may include a second LED lighting printed circuit board mounted within the second lighting device closer to the head of the second lighting device than the second indicator printed circuit board, the second LED lighting printed circuit board operatively connected to the second indicator printed circuit board, configured to receive power from the second power control printed circuit board via at least the second indicator printed circuit board, and comprising a fourth plurality of LEDs configured to deliver light through the second diffuser.

In embodiments, the first lighting device may be configured to communicate with the second lighting device via a direct wireless connection. In embodiments, the first lighting device may be configured to communicate with the second lighting device via a local data network, which may be a mesh network. The first lighting device may communicate with the other networked devices using such communications protocols. In embodiments, the lighting device may be configured to communicate with a server via at least a Wi-Fi communications network.

In embodiments, a lighting device may be produced with additional PCBs, different PCBs, fewer PCBs, and/or no PCBs. Accordingly, a lighting device for use with one or more other networked devices can comprise an outer globe comprised of an at least partially transparent rigid material (e.g., glass, plastic, and/or copolyester) and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and power control components comprising a power converter configured to convert alternating current to direct current, a voltage regulator configured to output steady direct current power at one or more voltages, an output power connector to output power to one or more other components within the lighting device, and an output current controller configured to control the output of electric current to the one or more other components within the lighting device.

The lighting device may further comprise communication and control components comprising one or more microprocessors operatively connected to non-transitory computer readable memory having stored thereon processing instructions readable by at least one of the first set of one or more microprocessors and a first wireless communications module operatively connected to a first communications antenna and to at least one of the first set of one or more microprocessors.

The lighting device can include an auxiliary device, such as a speaker, camera, Wi-Fi repeater, other communications repeater, and/or environmental sensor, to name a few. The lighting device may include a first plurality of LEDs each configured to deliver light to a respective one of the plurality of light pipes and/or a second plurality of LEDs configured to deliver light through the diffuser. The second plurality of LEDs may provide a primary light source, while the first plurality of LEDs may provide a night light, mood light, or indicator light, to name a few.

In embodiments, a lighting device for use with one or more other networked devices may include a speaker, which may play streamed audio. Accordingly, the lighting device may comprise an outer globe comprised of an at least partially transparent rigid material and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat, the power control printed circuit board comprising a power converter configured to convert alternating current to direct current, a voltage regulator configured to output steady direct current power at one or more voltages, an output power connector to output power to one or more other components within the lighting device, and an output current controller configured to control the output of electric current to the one or more other components within the lighting device.

The lighting device may further comprise a communication and control printed circuit board within the lighting device operatively connected to the power control printed circuit board and comprising a first wireless communications module operatively connected to a first communications antenna and a speaker control unit. In embodiments, the first wireless communications module may be located on a different PCB or apart from a PCB.

The lighting device may comprise an indicator printed circuit board within the lighting device operatively connected to the communication and control printed circuit board and configured to receive power from the power control printed circuit board via the communication and control printed circuit board and comprising a first plurality of LEDs each configured to deliver light to a respective one of the plurality of light pipes.

The lighting device may comprise one or more microprocessors operatively connected to first non-transitory computer-readable memory having stored thereon first processing instructions readable by at least one of the one or more microprocessors. In embodiments, the one or more microprocessors may be located on one or more PCBs, such as the indicator PCB and/or the communications and control PCB.

The lighting device may comprise a speaker comprising a speaker driver, the speaker mounted within the lighting device closer to the head of the lighting device than the indicator printed circuit board, operatively connected to the communication and control printed circuit board, and configured to receive power from the power control printed circuit board via the communication and control printed circuit board.

The lighting device may comprise an LED lighting printed circuit board mounted within the lighting device closer to the head of the lighting device than the indicator printed circuit board and having an aperture through which the speaker extends, the LED lighting printed circuit board operatively connected to the indicator printed circuit board, operatively connected via the indicator printed circuit board to the communication and control printed circuit board, configured to receive power from the power control printed circuit board via both the indicator printed circuit board and the communication and control printed circuit board, and comprising a second plurality of LEDs configured to deliver light through the diffuser. In embodiments, the light from the LEDs mounted on the LED lighting PCB may provide a primary light source.

In embodiments, the speaker control unit may comprise at least one of the one or more microprocessors, configured to control the speaker.

BRIEF DESCRIPTION OF THE DRAWINGS

Exemplary embodiments of the present invention will be described with references to the accompanying figures, wherein:

FIGS. 16A-E are exemplary screen shots of an application for networked device system administration in accordance with exemplary embodiments of the present invention;

FIGS. 17A-E are exemplary screen shots of an application for networked device control settings in accordance with exemplary embodiments of the present invention;

FIGS. 22A-H are screen shots of exemplary graphical user interfaces for networked devices application account setup and application configuration in accordance with exemplary embodiments of the present invention.

DETAILED DESCRIPTION

The present invention generally relates to systems, methods, and program products for networked devices and home automation. Networked devices may be powered through lighting fixtures. The devices may be accessed and/or controlled through a data network, such as a local area network or the Internet and/or through direct connections, such as Bluetooth or other wireless communication protocols, which may provide an expandable and/or adaptable home automation system. Accordingly, the system enables remote access and/or control of networked devices. Moreover, such a networked device system can provide programmable control of one or more networked devices, which programming may be implemented and/or modified from a plurality of sources (e.g., a smart phone via a downloadable application, a computer or other user device accessing a website, a central server that implements general, default, and/or updated (e.g., seasonally updated) programming rules, a dedicated control device (such as a remote control panel), a wall-mountable control unit, and/or a device that performs other functions, such as a clock, alarm clock, and/or digital photo frame, that also includes networked device controls, to name a few). Such a system can be provided in accordance with the present invention without the need for wiring or re-wiring devices such as lights, speakers, cameras, and switches. Such a system may provide users with a high degree of system flexibility and reconfigurability since wiring is not required and reprogramming can be performed from user devices.

The networked device system can provide a lighting system, security system (e.g., comprising one or more cameras and/or motion detectors), climate control system (e.g., comprising climate and/or environmental sensors and/or controls), stereo system (e.g., comprising one or more speakers), video game and/or entertainment system (e.g., featuring any of ambient lighting, surround sound, motion detectors for body movement video game control inputs, other intelligent gesture control based on input gestures, and/or multi-projector system for 3-dimensional projections, to name a few), and/or network access points (e.g., Wi-Fi routers, Wi-Fi or other signal repeaters, mesh network relay nodes), to name a few. The networked device system can also interact with third-party devices, via garage door controls, automatic door locks, refrigerator or other appliance controls, and/or thermostats. In embodiments, a networked device may be adapted for connection to a socket for a light bulb, even where the device is not a lighting device or where the device functions as a light source as an ancillary function, e.g., where the device is a speaker, which may or may not also include a light source.

Figure 1A:
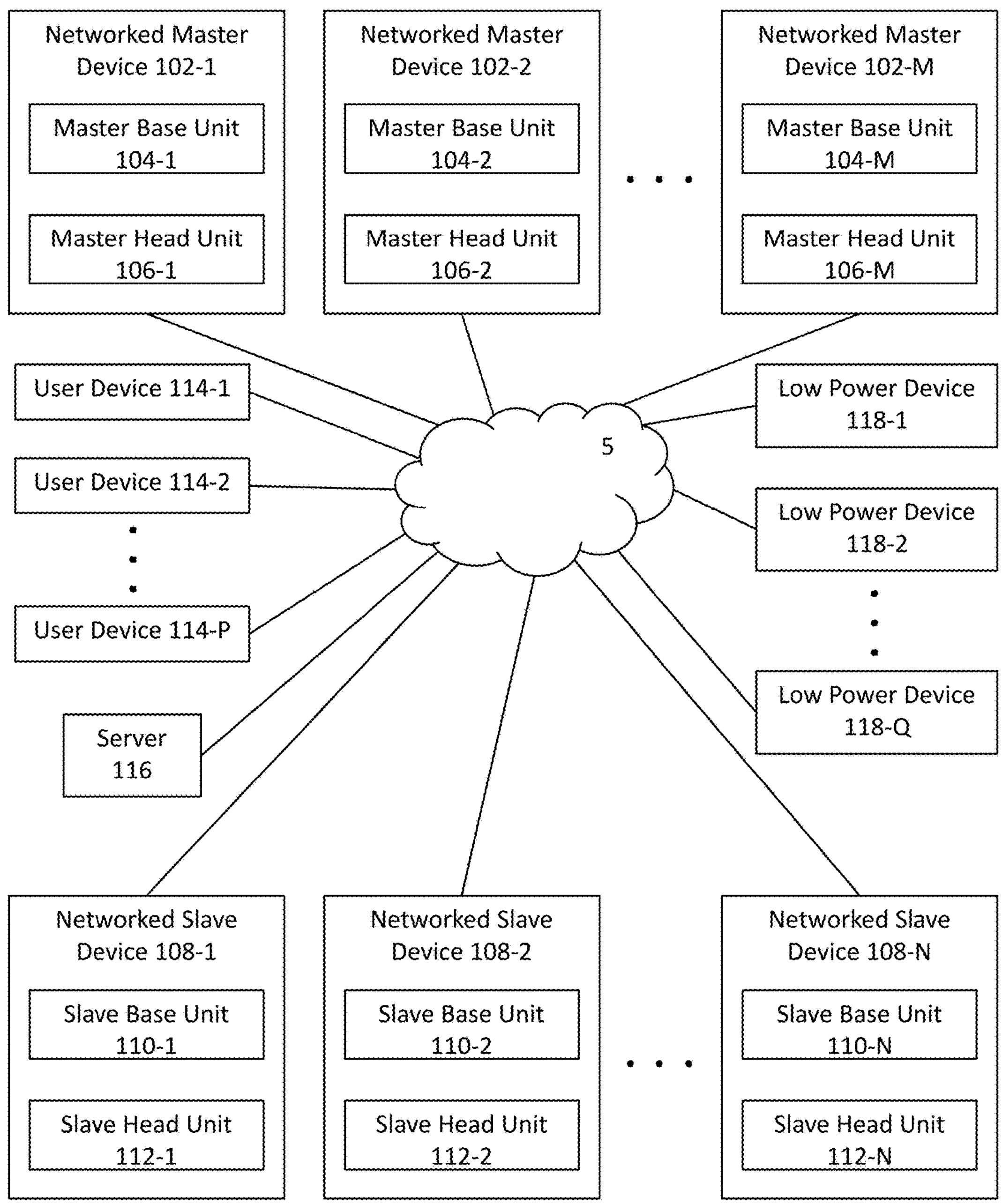
FIG. 1A is a schematic diagram of a networked device system in accordance with exemplary embodiments of the present invention.

FIG. 1A is a schematic diagram of an exemplary networked device system in accordance with exemplary embodiments of the present invention. The system can include one or more networked master device 102 (e.g., 102-1, 102-2, . . . , 102-M) each comprising a master base unit 102 and a master head unit 106, one or more networked slave device 108 (e.g., 108-1, 108-2, . . . , 108-N) each comprising a slave base unit 110 and a slave head unit 112, one or more user device 114 (e.g., 114-1, 114-2, . . . , 114-P), one or more server 116, and/or one or more low power device 118 (e.g., 118-1, 118-2, . . . , 118-Q). Such devices and/or computers may include one or more processors, computer-readable memory, communication portals, input devices (e.g., keyboards, mice, trackballs, touchpads, touchscreens, microphones, and/or cameras, to name a few), and/or output devices (e.g., display screens and/or speakers), to name a few.

The devices and/or computers in a networked device system can also include one or more communication portals, which may handle, process, support, and/or perform any wired and/or wireless communications. Communication portals can comprise hardware (e.g., hardware for wired and/or wireless connections) and/or software. Wired connections may be adapted for use with cable, POTS (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include any cellular or cellular data connections (e.g., digital cellular, PCS, CDPD, GPRS, EDGE, CDMA2000, 1×RTT, Ev-DO, HSPA, UMTS, 3G, 4G, and/or LTE, to name a few), Bluetooth protocols (e.g., Bluetooth 4.0 or higher and/or Bluetooth Low Energy), Wi-Fi, radio, satellite, infrared connections, Z-wave, and/or ZigBee communication protocols, to name a few. Communications interface hardware and/or software, which may be used to communicate over wired and/or wireless connections, may comprise any of Ethernet interfaces (e.g., supporting a TCP/IP stack), X.25 interfaces, T1 interfaces, and/or antennas, to name a few. In embodiments, antennas may include ceramic antennas, trace antennas, or combinations thereof, to name a few. Communications hardware can include one or more communications chipsets, which may include antennas or other components described herein. The components in a networked device system may be connected directly and/or indirectly, e.g., through a data network 5, such as the Internet, a telephone network, cellular data network, mesh network (e.g., using a broadcast/scan mesh network protocol, such as a protocol using gossip routing), Wi-Fi, WAP, LAN, WAN, to name a few. Various audio streaming protocols, such as Apple AirPlay and/or Google Cast may be employed by participants in the networked device system. Such audio streaming protocols may function over the communications protocols described herein, such as Wi-Fi and/or Bluetooth (e.g., Bluetooth Audio). In embodiments, the networked devices of the present invention may combine powerline networking with mesh or other wireless networking to extend control from one circuit to multiple circuits.

In an exemplary mesh network protocol, each device may broadcast messages and each receiving device may re-broadcast the message once. Data packets sent through such a mesh network may time out such that devices may not re-broadcast the message after the timeout. Acknowledgement may be required for certain messages. For example, when a dimmer knob is moving, the new states of the knob may be broadcast to control networked lighting devices. When the knob stops moving, the state may be broadcast with a requirement of acknowledgement to ensure that each networked device adjusts its state according to the control input via the dimmer knob.

Still referring to FIG. 1A, a networked device may be a networked master device 102 or a networked slave device 108. A networked master device 102 may communicate with an external data network, such as the Internet, and/or may communicate with one or more user device 114. A networked master device 102 may have longer transmission range and/or greater processing power. In embodiments, a networked master device 102 may serve as a hub for controlling and/or communicating with one or more other devices in the system. For example, each room in a house may contain one networked master device 102, through which a plurality of other devices in communication range (e.g., in the room) may participate in the networked system. Such other devices may be networked slave devices 108, which do not connect to an external network and/or which have limited communication range, such as through Bluetooth or Bluetooth Low Energy communication protocols.

A networked device may be a networked master device 102 or a networked slave device 108. A master device may serve as a hub to provide communication between one or more slave devices and one or more other devices or networks. In embodiments, a networked device may be a fully networkable device without requiring intermediate connection to or control from a master device. In embodiments, a networked device may comprise a base unit and a head unit, as described herein with respect to FIG. 2B. Accordingly, a networked master device 102 may comprise a master base unit 104, as described herein with respect to FIG. 3A, and a master head unit 106, as described herein with respect to FIG. 3B. A networked slave device 108 may comprise a slave base unit 110, as described herein with respect to FIG. 4A, and a slave head unit 112, as described herein with respect to FIG. 4B. A networked device can comprise (e.g., in the head unit) a light (e.g., light emitting diode (LED) lighting device, multi-color light), a wireless speaker (e.g., mono or stereo), a wireless SD and/or HD camera, a microphone, a display device (e.g., monitor, projector), an air quality sensor (e.g., smoke detector, carbon monoxide sensor, nitrogen dioxide sensor, and/or pollution sensor), an environmental sensor (e.g., temperature and/or humidity sensor), an ambient light sensor, heating and/or cooling device (e.g., a fan or hearer), a battery backup device, a Pico projector, a motion detector (e.g., an occupancy sensor, infrared sensor (e.g., comprising an infrared blaster), ultrasonic sensor), and/or a skeletal sensor (e.g., to track body position or body movement, such as a Microsoft Kinect sensor), to name a few.

Figure 13:
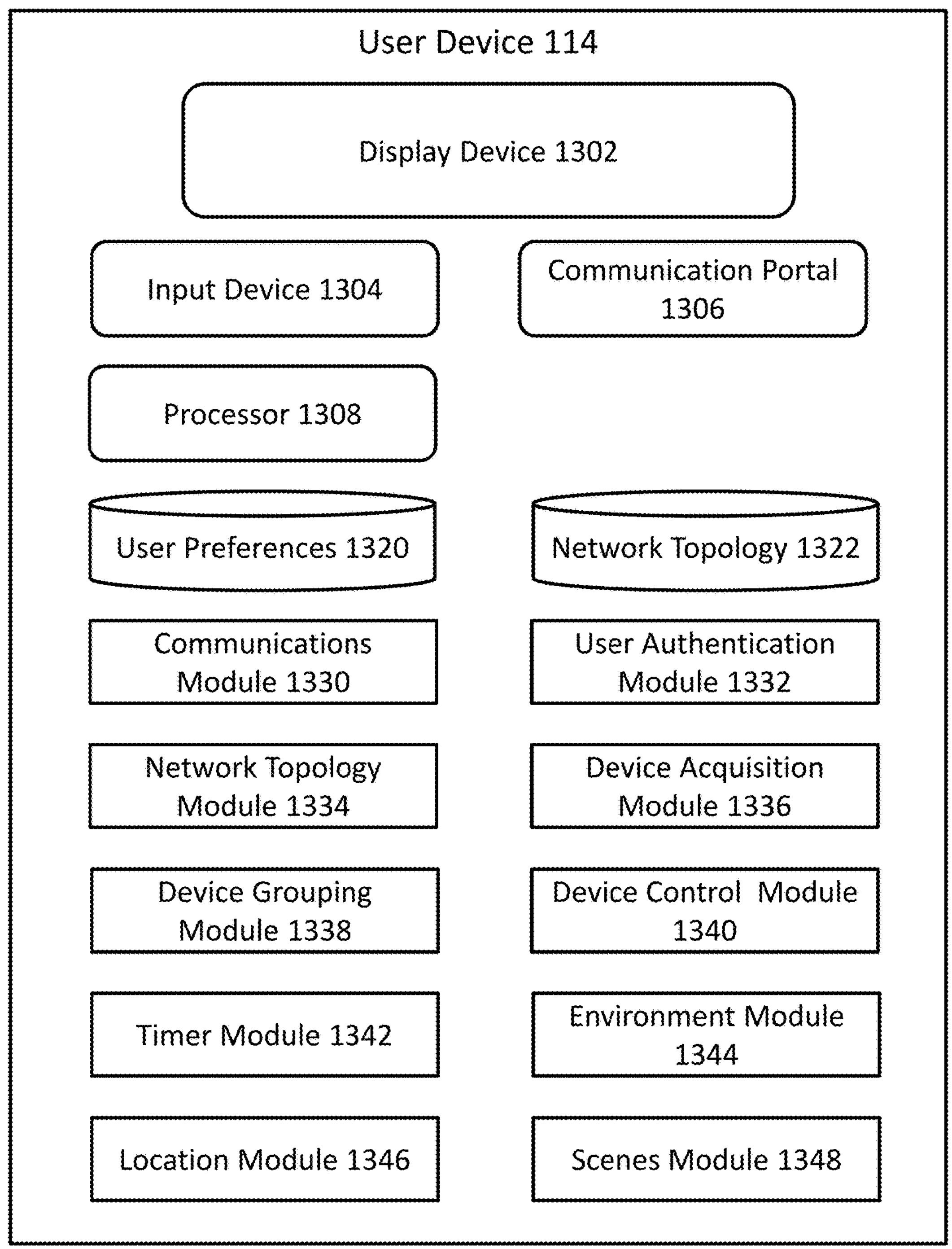
FIG. 13 is a schematic diagram of a user device in accordance with exemplary embodiments of the present invention.

A user device 114 may be a computer, laptop computer, tablet computer, mobile phone, smart phone, personal digital assistant, remote control, or other user electronic device, as described herein with respect to FIG. 13. A server 116 may be a computer system comprising one or more computers. A server 116 may be a cloud computing system, which may be owned, managed, and/or maintained by a third party. An exemplary server is described herein with respect to FIG. 14.

A low power device 118 may be a low-powered (e.g., coin battery cell powered) or passively powered (e.g., Bluetooth Low Energy) device. A low power device 118 may be a key fob (e.g., worn on the person or on a keychain of a user), doorknob, remote control, and/or light switch, to name a few. In embodiments, a low power device 118 may be a near field communication device such as an iBeacon device 132. Such devices may have location awareness, e.g., by determining whether they are in range of another device and/or by determining an approximate distance to one or more other devices. In embodiments, the one or more other devices may make the determination of whether a low power device 118 is within range or the determination of a distance or approximate distance to the device. In embodiments, the other devices may receive generic control signals from the low power device 118, which each other device may interpret differently. A low power device 118 may have one or more buttons, which can be programmable to provide different controls or to control different devices. Control output may be based on environmental scenarios such as location, time of day, weather, proximity, and/or user information (e.g., profile settings), to name a few. For example, a key fob device can be designed so that when it is within range of a light bulb that is part of the networked system and when one of the key fob buttons is pressed, the resulting control output can toggle the state of that light bulb (e.g., on or off).

In embodiments, a low power device 118 may comprise a switch, which may be a Bluetooth switch device. The device may be installed (e.g., hung, mounted, or otherwise affixed) on a wall, a door, a countertop, furniture, and/or an appliance, to name a few. Such a device may be programmed to perform specific tasks, e.g., based on various environmental scenarios. For example, such a switch device can be placed on the outside of an apartment door and when pressed can play audio over a networked wireless speaker device or flash one or more networked lighting devices in a networked device system. In embodiments, a Bluetooth switch may mount on top of an existing light switch that stay in the on position while the Bluetooth switch can communicate with a networked system to change power to a core device (e.g., in order to change light level or sound volume). In another embodiments, a Bluetooth switch may be a replacement light switch (e.g., installed in a wall and attached to a room's electrical wiring). Such a switch may remain in the on position, always delivering power to a socket in which a base unit of a networked device is fitted. The switch may then communicate with the base unit to effect control of the head unit.

Figure 1B:
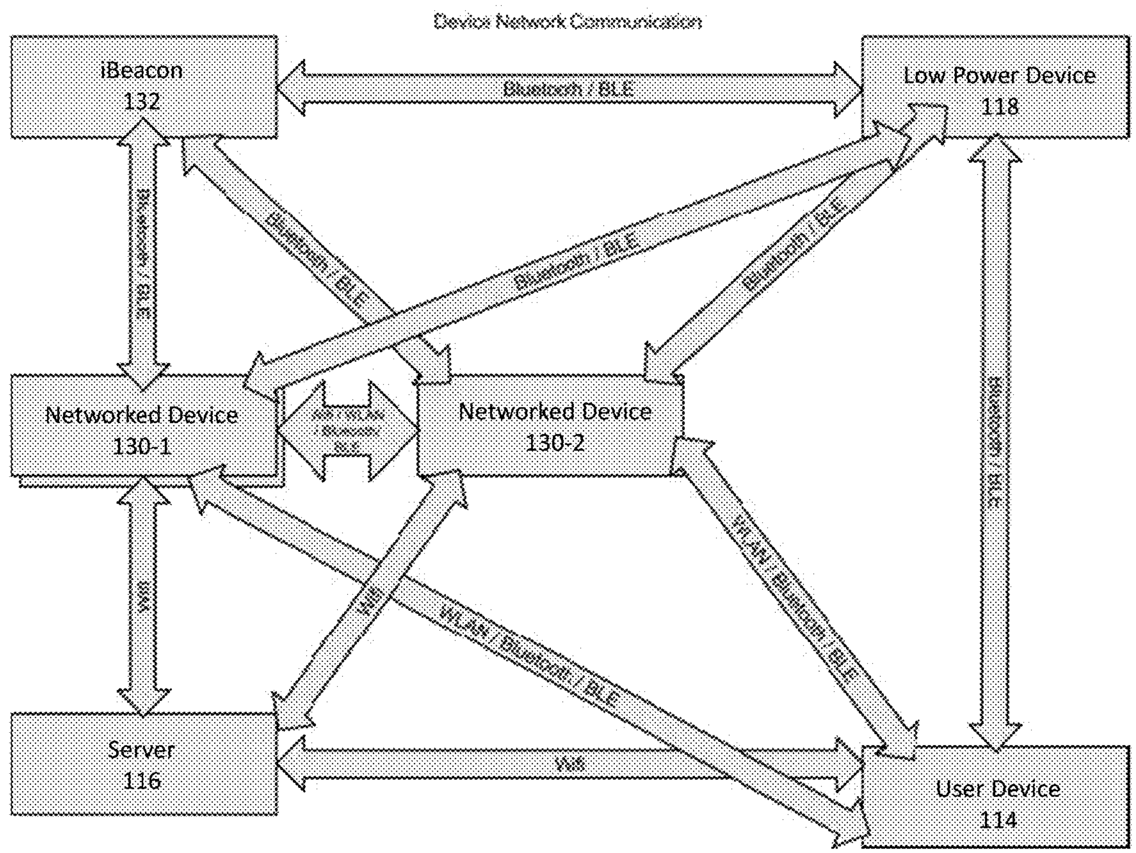
FIGS. 1B-C are schematic diagrams of communication paths in a networked device system in accordance with exemplary embodiments of the present invention.

FIG. 1B is a schematic diagram of exemplary communication paths in an exemplary networked device system. Communicating can comprise sending and/or receiving data (e.g., data packets). One or more networked devices 130 (e.g. a networked master device and/or a networked slave device) may communicate with each other via a wireless local area network ("WLAN"), Bluetooth, Bluetooth Low Energy, and/or other communications protocols with corresponding software and/or hardware, such as Apple Mfi communication. A networked device 130 may communicate with a user device 114 via WLAN, Bluetooth, and/or Bluetooth Low Energy. A networked device 130 may communicate with a server 116 via an external data network such as the Internet, which may be accessed via Wi-Fi provided by a wireless router. Similarly, a user device 114 may communicate with a server 116 via Wi-Fi. A user device 114 may also communicate with a server 116 via a cellular data network, such as UMTS 3G or LTE. The server 116 may access the Internet through a wired data connection and/or a wireless data connection, such as Wi-Fi. In embodiments, a user device 114 may communicate with a server 116, in order to effect changes at a networked device 130. Accordingly, the server 116 may relay and/or generate and send communications to the networked device 130. A low power device 118 may communicate via Bluetooth or Bluetooth Low Energy with a user device 114, with a networked device 130, and/or with other low powered devices 118. In embodiments, an iBeacon device 132 may be a type of low powered device that may participated in the networked device system.

Figure 1C:
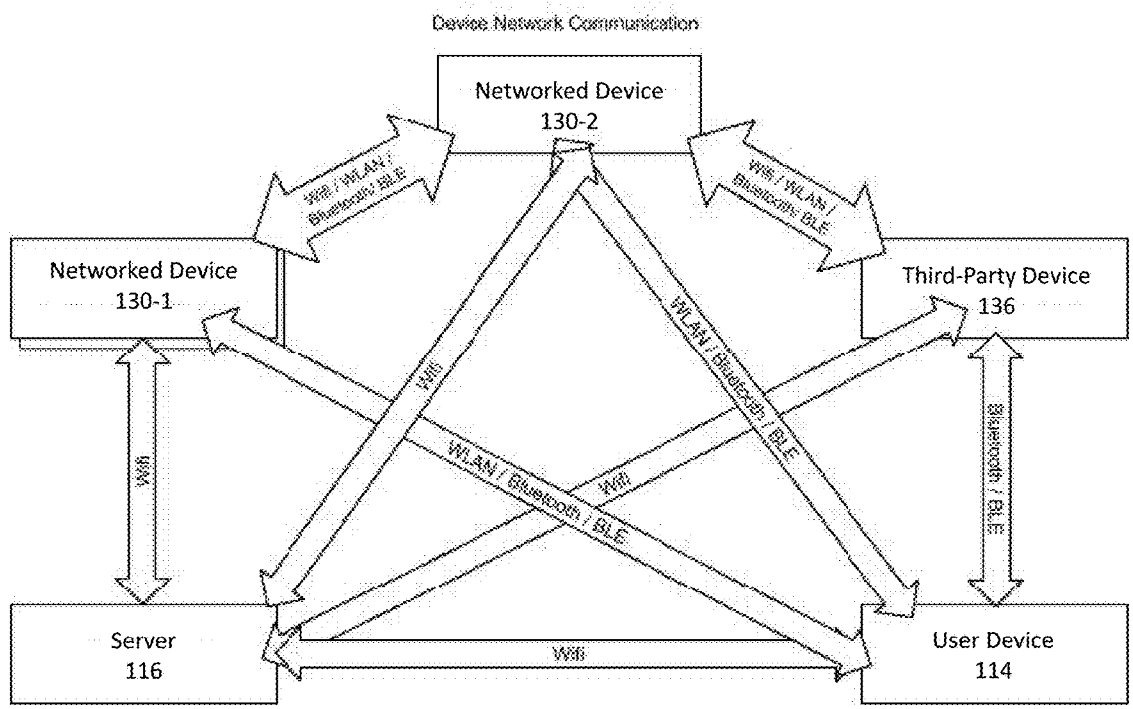

FIG. 1C is another schematic diagram of exemplary communication paths in an exemplary networked device system. The diagram indicates communications protocols and technologies that may be used by the participant devices in the networked device system. Networked devices 130 (e.g., 130-1 and 130-2) may communicate with each other using any of Wi-Fi, wireless local area networks (WLAN) (e.g., provided by a wireless router), Bluetooth, and/or Bluetooth Low Energy, to name a few. Bluetooth and/or Bluetooth Low Energy may comprise direct connections between devices without an intermediate router. In embodiments, WLAN connections may also be made without an intermediate router. Such connections may utilize Wi-Fi hardware, such as Wi-Fi chipsets, to form a direct connection between devices. Meanwhile, Wi-Fi connections can include access of and communication via an external data network, such as the Internet. A Wi-Fi router may provide a connection point for such an external data network, bridging the external network with a local network, which may be a wireless local area network. Networked devices 130 may also communicate with third-party devices 136 using at least any of Wi-Fi, wireless local area networks, Bluetooth, and/or Bluetooth Low Energy. Third-party devices 136 may be appliances (e.g., refrigerators, washers, and/or dryers), heating and/or cooling units, door locks, automatic doors, garage doors, security sensors and/or alarms, and/or stereo units, to name a few. Networked devices 130 and third-party devices 136 may communicate with a server 116 via Wi-Fi, e.g., by accessing an external data network via a wireless local area network provided over Wi-Fi. User devices 114 may communicate with networked devices 130 via a wireless local area network, Bluetooth, and/or Bluetooth Low Energy, to name a few. User devices 114 may communicate with third-party devices 136 via Bluetooth and/or Bluetooth Low Energy, to name a few. User devices 114 may communicate with one or more servers 116 via one or more data networks. These data networks can include a wireless local area network provided over Wi-Fi, which interfaces with an external data network, such as the Internet, to which the servers 116 are operatively connected. In embodiments, user devices 114 may access the Internet via an intermediate, non-local network, such as a cellular data network, which may be a closed network aside from its external interfaces to other data networks (e.g., the Internet and/or other cellular data networks, to name a few).

Figure 2A:
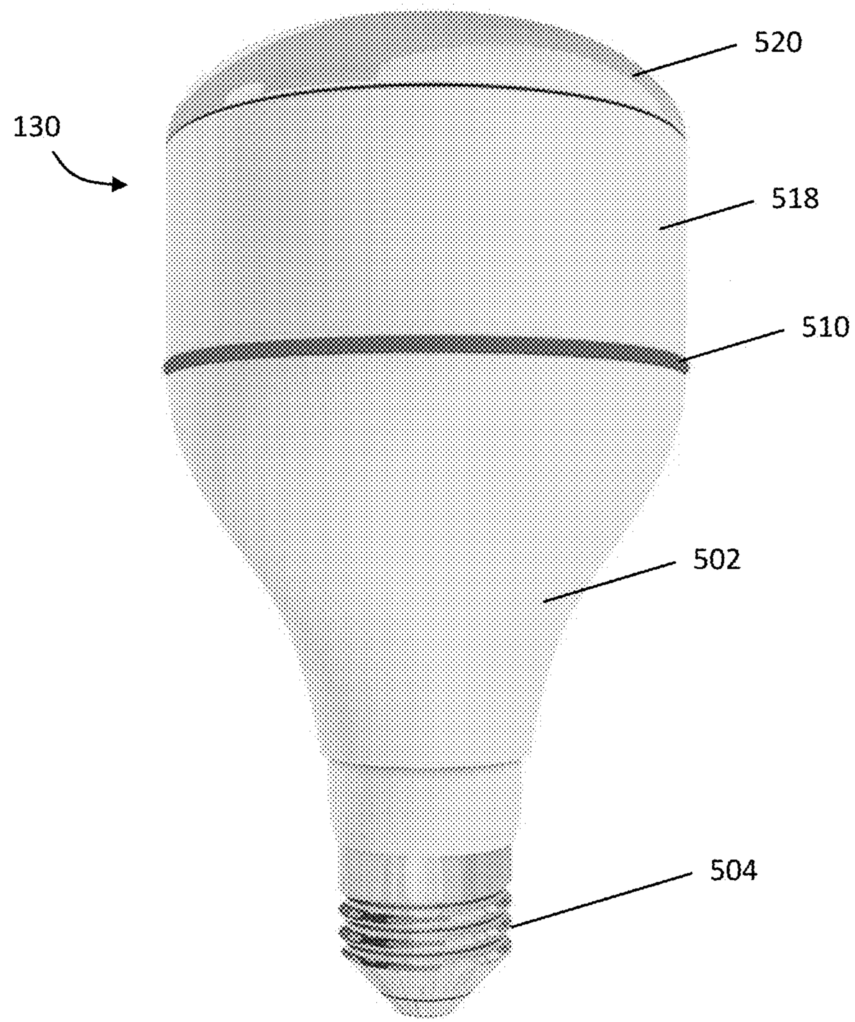
FIG. 2A is a front view of a networked device in accordance with exemplary embodiments of the present invention.
Figure 2B:
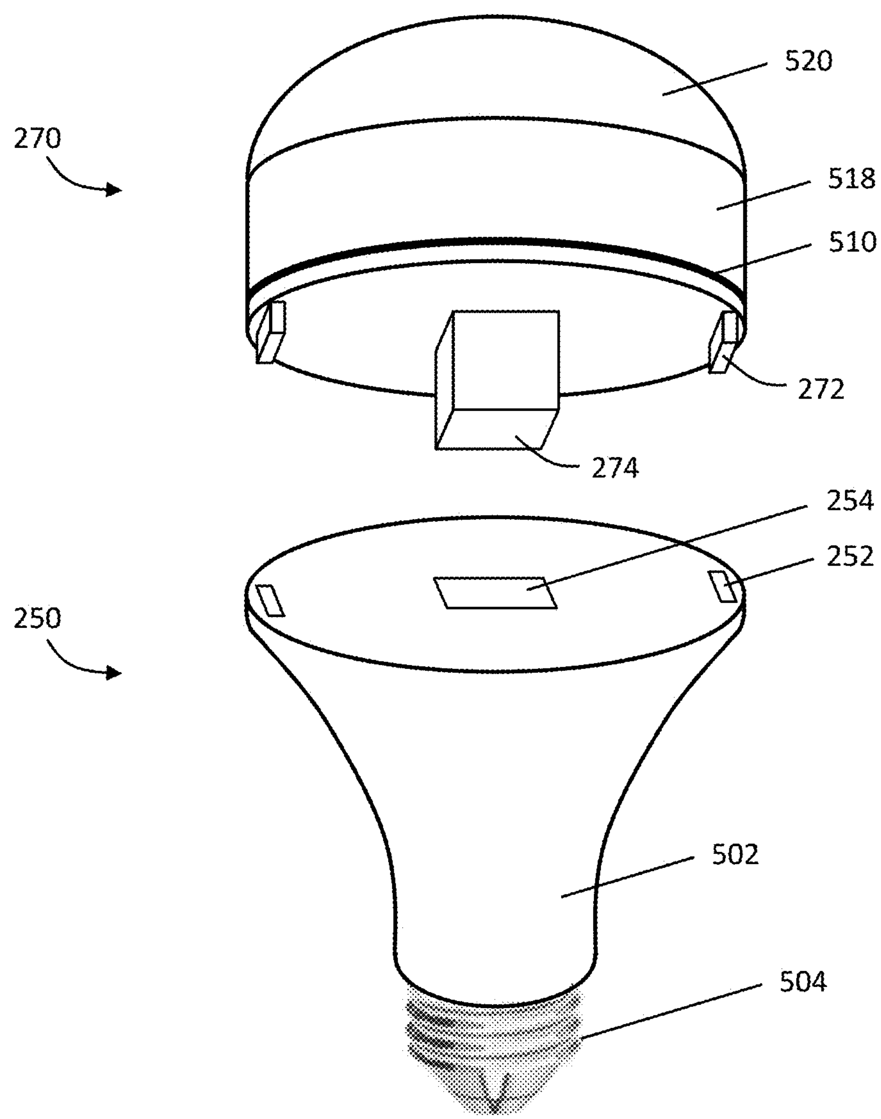
FIG. 2B is a diagram of a networked device base unit and head unit in accordance with exemplary embodiments of the present invention.

FIGS. 2A-B illustrate an exemplary networked device 130. As shown in FIG. 2A, a networked device 130 can include a lighting fixture attachment 504 to mate the device to a lighting socket to provide power. A lighting socket may be an incandescent socket, a compact fluorescent lamp socket, and/or a cold cathode fluorescent lamp socket, to name a few. A networked device 130 may have a base unit outer casing 502, head unit outer casing 518, and/or head unit top casing 520. In embodiments, head unit top casing 520 may be a light diffuser for a networked lighting device, a tinted translucent covering for a security camera, and/or a speaker front, to name a few. A networked device can include an auxiliary light 510, as described herein with respect to FIGS. 6A-B. An auxiliary light 510 may provide low-level lighting and/or may provide indicators and/or visual communications, e.g., by turning on and/or off, flashing (e.g., flashing a specified number of times), and/or changing color. Accordingly, an auxiliary light 510 may indicate when a networked device 130 is successfully connected to a network.

FIG. 2B shows that a networked device 130 can comprise a base unit 250 and a head unit 270. A base unit 250 may contain a power controller and communications portals, as described herein. Meanwhile, a head unit 270 may contain a core device (e.g., microphone, sensor, camera, speaker, light, to name a few) and communications portals. Head units may be removable and/or swappable so that a single base unit can alternately be mated to a plurality of head units to provide different or improved functionality. A head unit 270 may include an auxiliary light 510. In embodiments, a base unit 250 may include an auxiliary light 510. One or more base unit attachment points 252 (e.g., male or female connectors) may mate with one or more head unit attachment points 272 (e.g., female or male connectors) to hold the base and head units together. In embodiments, the head unit 270 may snap, screw, or otherwise attach to the base unit 250. A base unit connection portal 254 may mate with a head unit connection portal 274 to deliver power and/or two-way communications. In embodiments, such connection portals may be male and female USB connections. In embodiments, such connection portals may comprise a plurality of connectors (e.g., a data transmission connection and a power transmission connection).

Figure 3A:
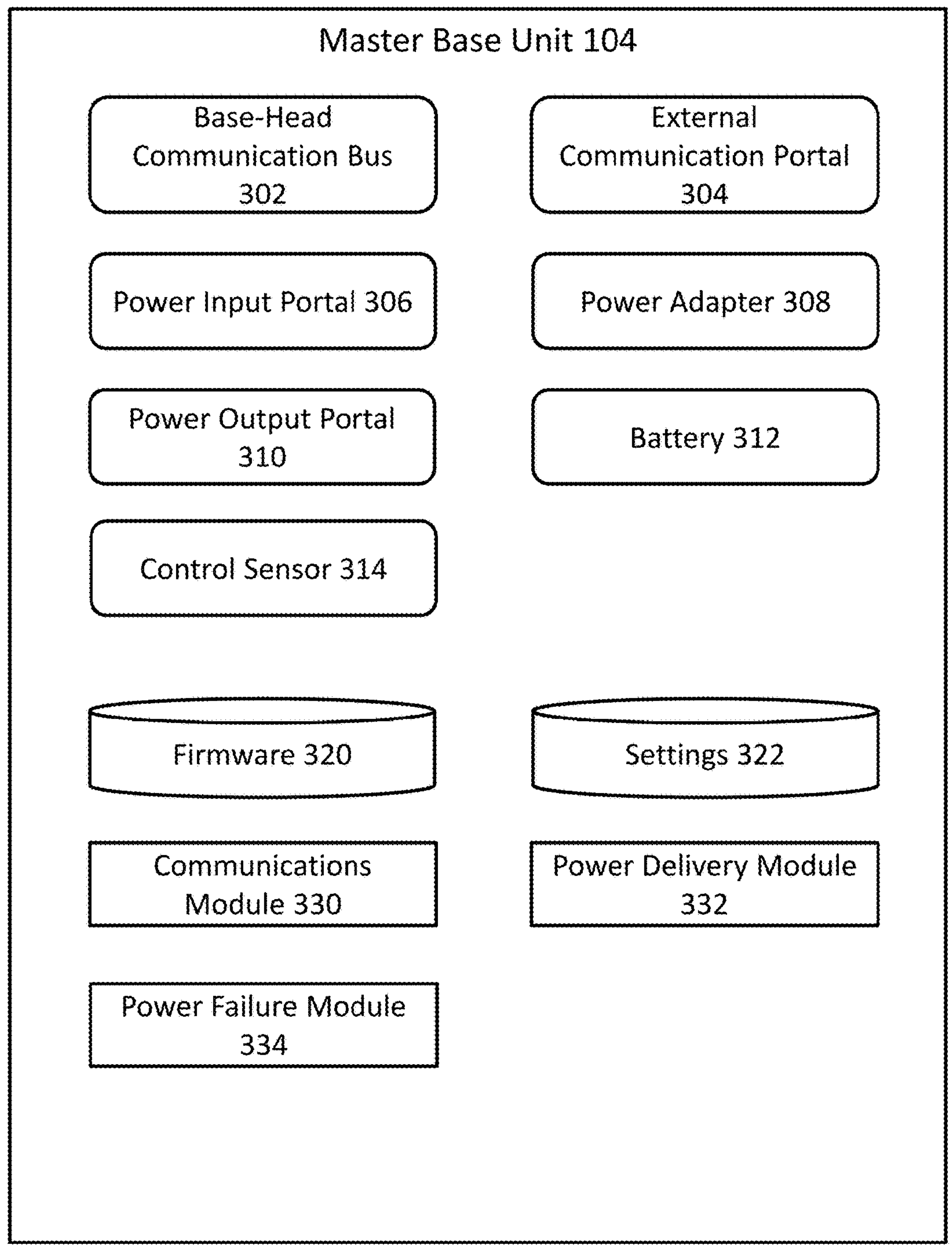
FIG. 3A is a schematic diagram of a master device base unit in accordance with exemplary embodiments of the present invention.
Figure 3B:
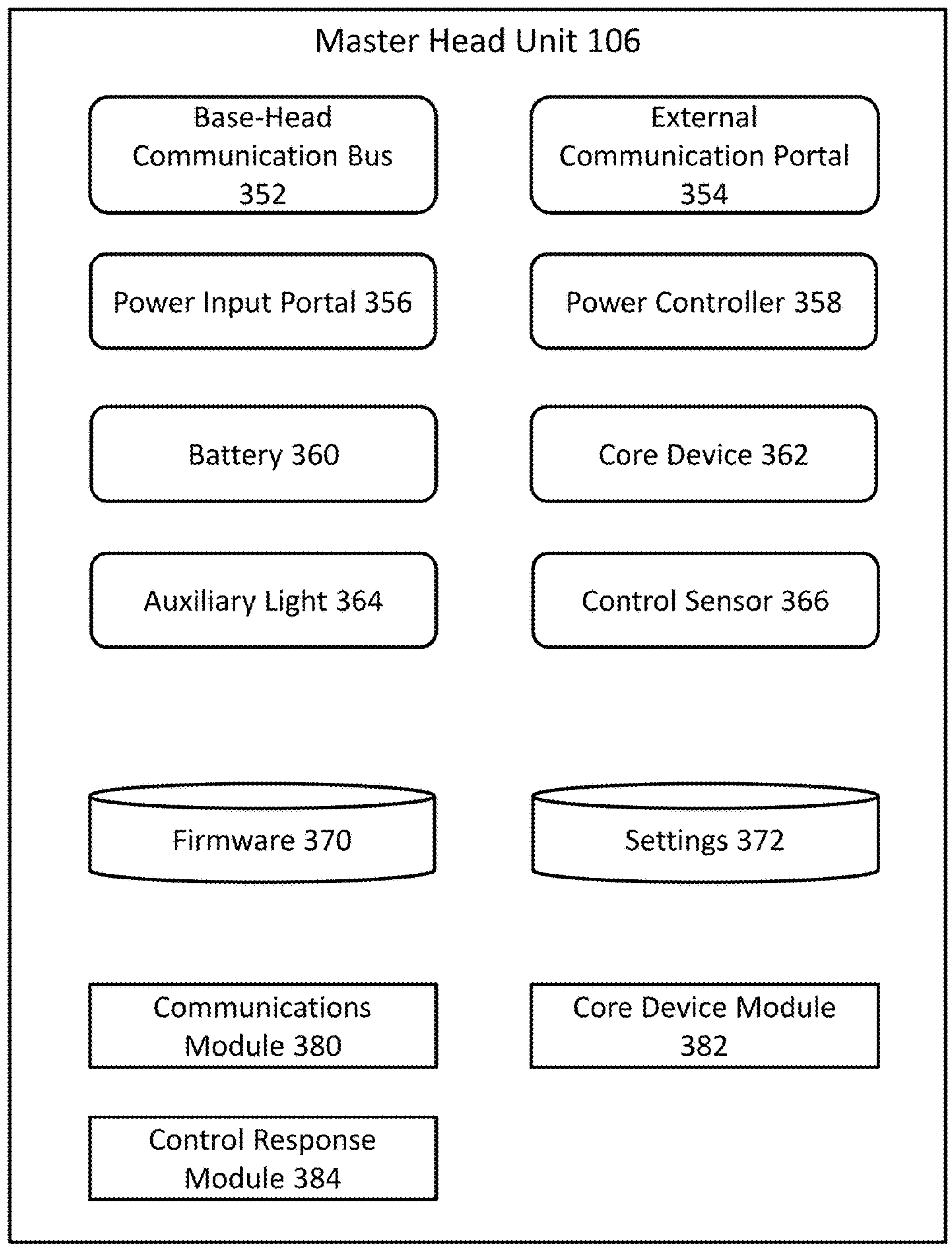
FIG. 3B is a schematic diagram of a master device head unit in accordance with exemplary embodiments of the present invention.

FIGS. 3A-B are schematic diagrams of exemplary master head units and base units. In embodiments, functionality attributed herein to a base unit may instead be performed by a head unit and vice versa.

FIG. 3A is a schematic diagram of an exemplary master base unit 104. The master base unit 104 may include a base-head communication bus 302 for two-way communications between a base unit and a head unit. The master base unit 104 can also include an external communication portal 304, which may be configured to communicate with one or more external data networks, such as the Internet, and/or configured to communicate with one or more other devices in a networked device system (e.g., via a WLAN, Bluetooth, and/or Bluetooth Low Energy, to name a few). A power input portal 306 may be a lighting fixture attachment for receiving power from a light socket. A power adapter 308 may be a power controller that may convert the input power to a form that can be output to the head unit. A power adapter 308 may supply direct and/or alternating current through the power output portal 310. The master base unit 104 may include a battery 312, which may activate upon a loss of power at the lighting socket. A battery may be a rechargeable battery and/or a capacitor device to store charge. A control sensor 314 may receive control inputs, e.g., from a remote control such as an infrared remote control.

A master base unit 104 can also include data stored on non-transitory computer-readable memory. In embodiments, data may be stored in one or more database. Firmware data 320 may comprise operating instructions (e.g., programming) for operation of one or more components of master base unit 104, such as the external communication portal 304. Settings data 322 may comprise default settings, settings set by a user, and/or machine learned settings (e.g., based upon a usage history).

A master base unit 104 can include one or more software modules running on one or more processors. A communications module 330 can handle communication to and/or from the base unit 104, including relaying and/or routing of data to and/or from a head unit. A communications module 330 in a master base unit 104 may provide communications with external data networks and/or devices. Such a module may enable the master base unit 104 to serve as a networking hub and/or provide external communications from and/or to one or more slave devices that are not connected to external data networks.

A power delivery module 332 may transform input power for output to a head unit and/or may output the power to a head unit. In embodiments, a power delivery module 332 may modulate power, e.g., in response to input controls, such as to adjust speaker volume or light brightness of a respective head unit speaker or lighting device. A power failure module 334 may determine whether a power failure has occurred and control a power failure mode of operation of the base and/or head unit. For example, a base unit may activate a backup battery and/or may activate an auxiliary light upon determining that a power failure has occurred.

FIG. 3B is a schematic diagram of an exemplary master head unit 106. In embodiments, a master head unit 106 may be the same as a slave head unit 112, as the master-slave distinction may only apply to the base unit. In other embodiments, a master head unit 106 may itself provide a networking platform for slave devices. In such a setup the master head unit 106 may be mated with a slave base that does not itself serve as a network hub. A master head unit 106 can include a base-head communication bus 352 for communicating with a master base unit 104. Such a communication bus 352 can comprise one or more physical connections (e.g., a USB connection) between the base and head units. In embodiments, a master head unit 106 can include an external communication portal 354, which may communicate with one or more other devices without relaying communications through a master based unit 104. A power input portal 356 may receive power from a base unit. A power controller 358 may supply variable current and/or voltage to the core device based on a control signal input, while simultaneously supplying various constant voltages to other control circuits requiring power, such as communications circuits and/or processors (e.g., microcontrollers). A battery 360 may be a backup battery, which may be activated in the event of a power failure. A core device 362 may be a camera, speaker, sensor, and/or lighting device, to name a few, as described herein. An auxiliary light 364 may provide low-level lighting and/or may provide an indicator that can be used for device setup and/or to indicate device status, as described herein. A control sensor 366 may receive control inputs, e.g., from a remote control such as an infrared remote control.

A master head unit 106 can include firmware 370 and/or settings data 372, as described with respect to the exemplary master head unit 104 depicted in FIG. 3A. A communications module 380 may process two-way communications between the master head unit 106 and the base unit and/or between the master head unit 106 and one or more other devices and/or networks. A core device module 382 may control operation of and/or interaction with the core device 362. Accordingly, for an exemplary camera core device, a core device module 382 may enable recording video, taking photographs, zooming, panning, focusing, and/or color adjustment, to name a few. A core device module 382 can comprise programming that automatically controls core device operation and/or that processes input commands and/or outputs data. In embodiments, a control response module 384 may receive electronic input commands, process input commands, and/or execute the received commands, such as to turn a device on or off.

Figure 4A:
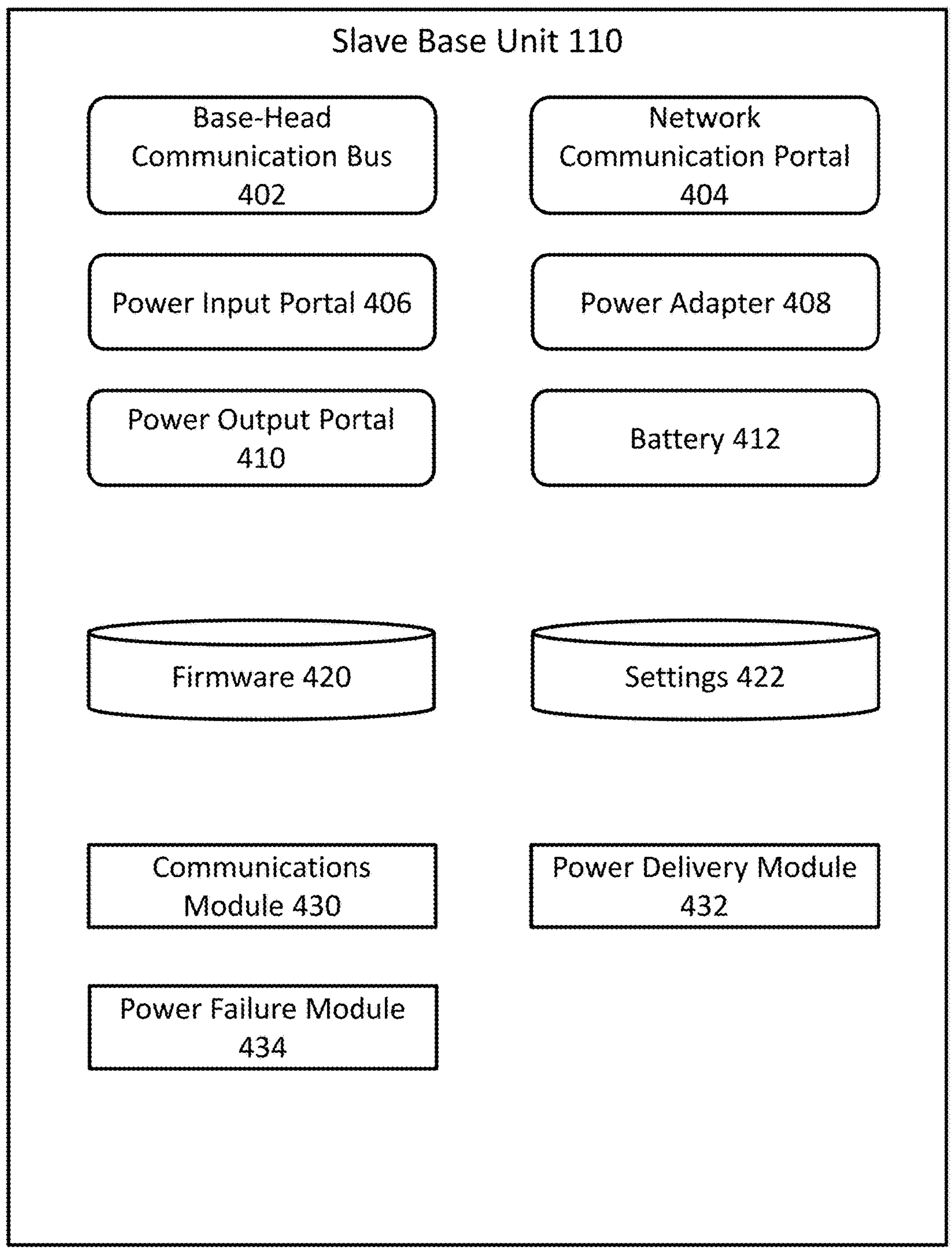
FIG. 4A is a schematic diagram of a slave device base unit in accordance with exemplary embodiments of the present invention.
Figure 4B:
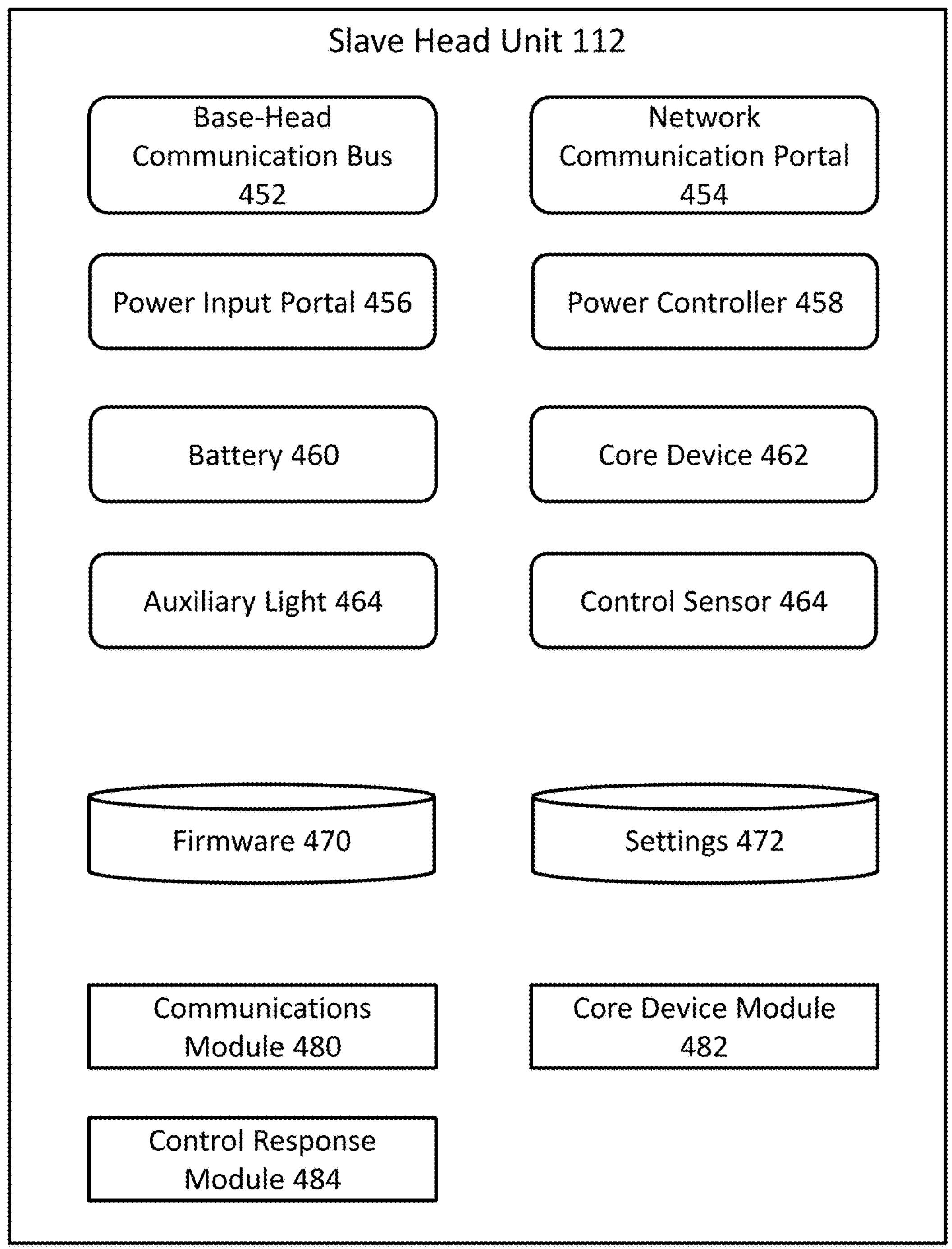
FIG. 4B is a schematic diagram of a slave device head unit in accordance with exemplary embodiments of the present invention.

FIGS. 4A-B are schematic diagrams of exemplary slave head units and base units. In embodiments, functionality attributed herein to a base unit may instead be performed by a head unit and vice versa.

FIG. 4A is a schematic diagram of an exemplary slave base unit 110. A slave base unit 110 may have a base-head communication bus 402 for communicating (e.g., transmitting and/or receiving data) between a base unit and a head unit. A slave base unit 110 may include a network communication portal 404 for communicating with local devices of a networked device system. For example, a network communication portal 404 may transmit and/or receive data between the slave base unit 110 and a master head unit or a master base unit. In embodiments, a network communication portal 404 may communicate with one or more user devices and/or one or more low power devices. A slave base unit 110 may not communicate with external devices (e.g., not participating in a local area network and/or not located within a certain proximity) and/or networks (e.g., the Internet).

A slave base unit 110 can include a power input portal 406, power adapter 408, and power output portal 410 for powering a head unit, as described with respect to the master base unit of FIG. 3A. A slave base unit 110 may also include a battery 412. It may also include firmware 420 and/or settings data 422, as described with respect to FIG. 4A.

A communications module 430 may process communications with a head unit and/or with other devices on the network. Accordingly, a communications module 430 may handle communications with a network hub provided by a master device (e.g., either a master base unit or a master head unit). A slave base unit 110 can further include a power delivery module 432 and/or a power failure module 434, as described with respect to FIG. 4A.

FIG. 4B is a schematic diagram of an exemplary slave head unit 112. It can include a base-head communication bus 452 for communication with a base unit. It can also include a network communication portal 454 for communicating with other devices on a local area network, including a master device. A network communication portal 454 may provide communications between other networked devices, low energy devices, and/or user devices but may not communicate with external devices or external data networks except through a communication relay as may be provided by a master device. A slave head unit 112 can also include a power input portal 456, power controller 458, battery 460, core device 462, auxiliary light 464, and/or control sensor 464, as such components are described with respect to FIG. 3B. A slave head unit 112 can include firmware 470 and/or settings 472 stored on non-transitory computer-readable memory, as described with respect to FIG. 3A.

A slave head unit 112 can include a communications module 480, which may handle and/or process communications with a base unit and/or communications with other devices on a local network and/or within a certain proximity. A core device module 482 may control operation of the core device 462, as described with respect to FIG. 3B, and a control response module 484 may process input control signals, as also described with respect to FIG. 3B.

Figure 5A:
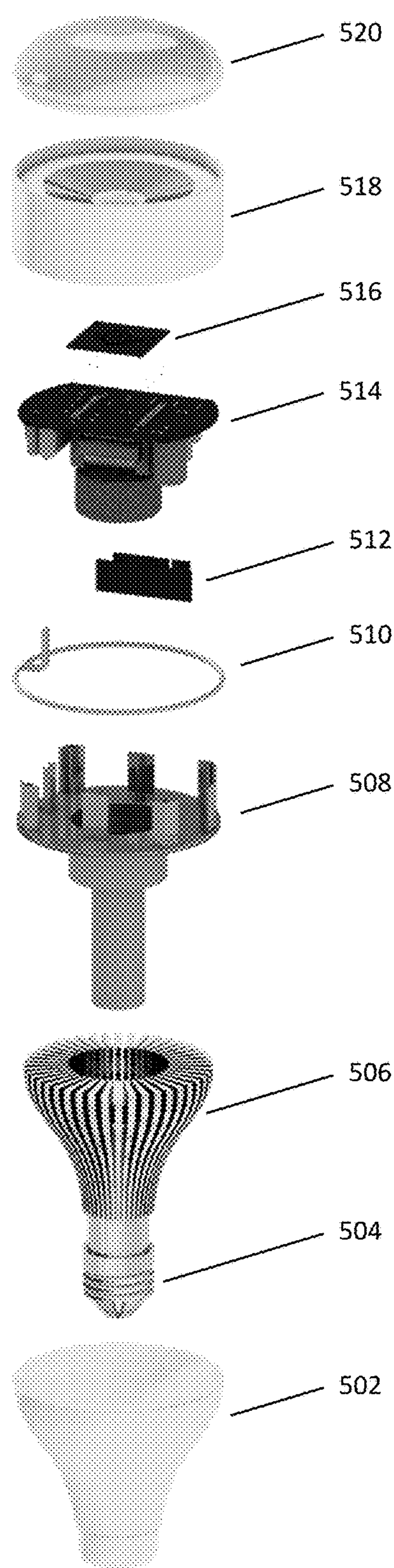
FIGS. 5A-C are exploded views of a networked device in accordance with exemplary embodiments of the present invention.
Figure 5B:
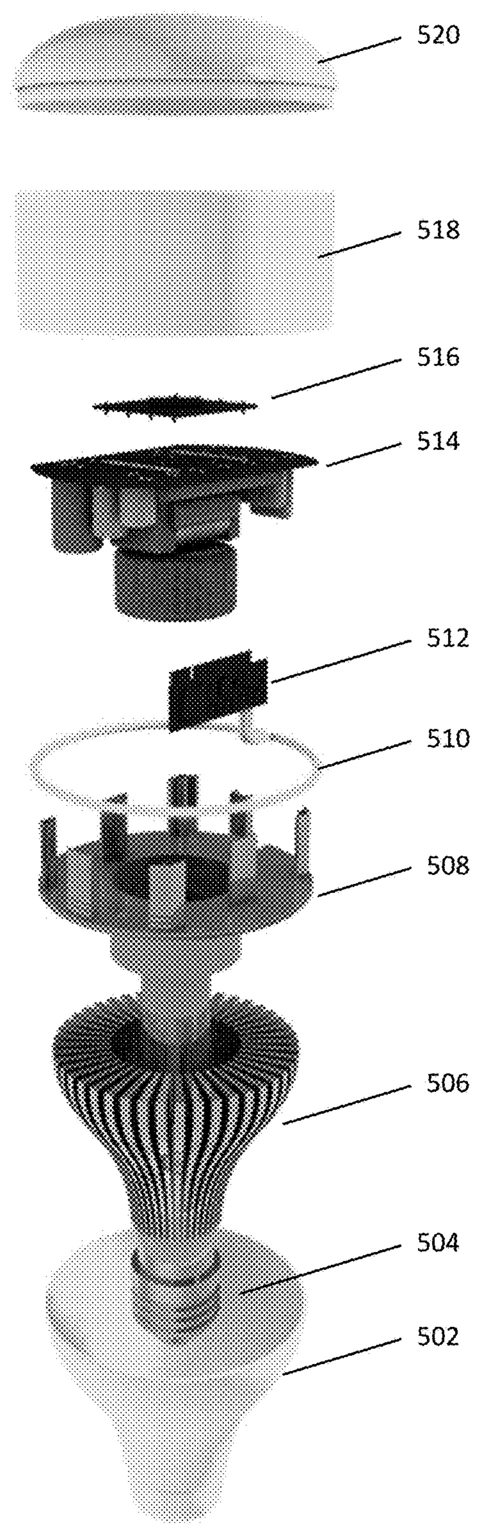
Figure 5C:
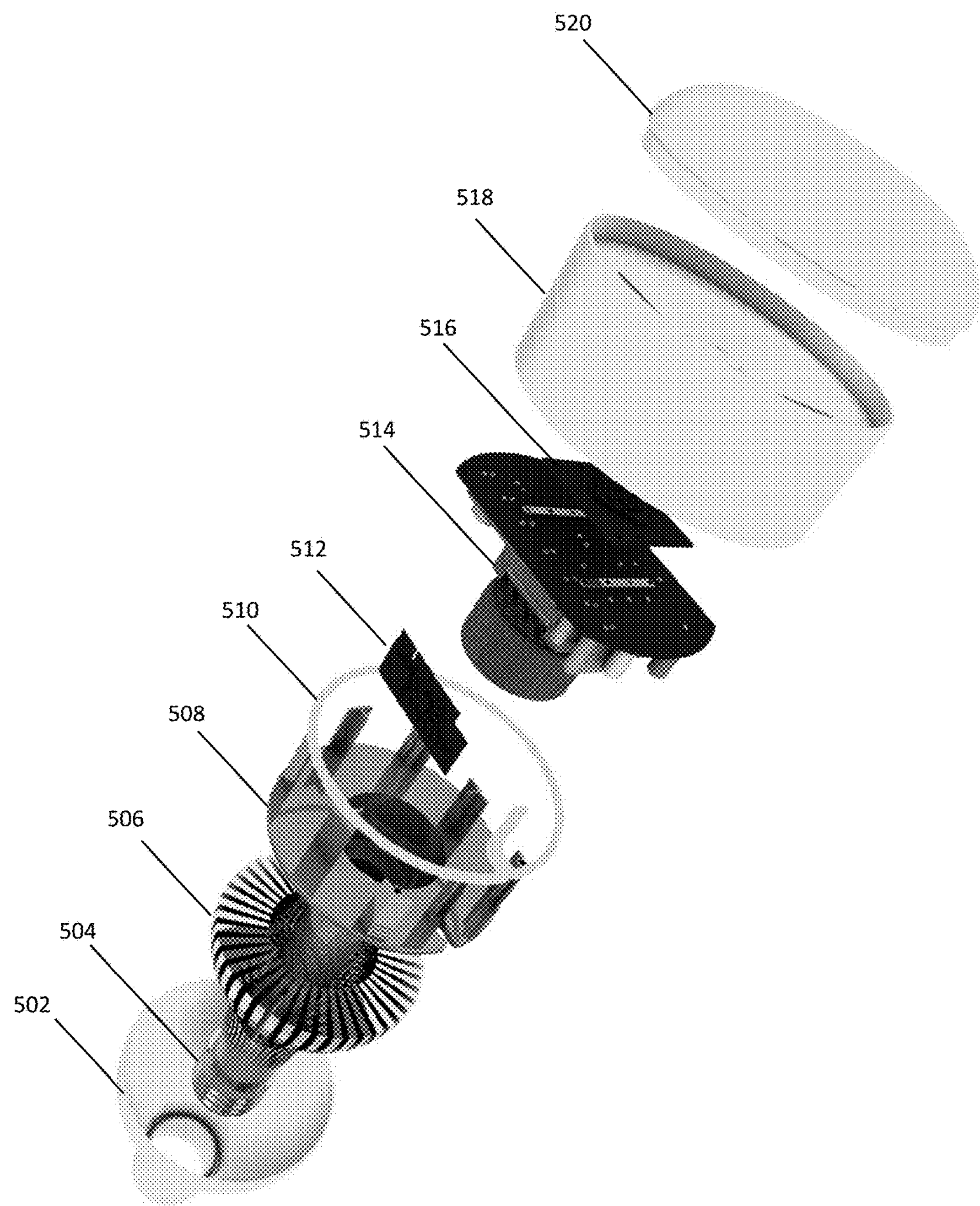

FIGS. 5A-C are exploded diagrams of an exemplary networked device in accordance with the present invention. A networked device may comprise a base unit casing 502 and a head unit casing 518. A head unit top casing 520 may comprise openings for sensors, translucent portions, and/or porous portions, to name a few. An exemplary networked device may include a lighting fixture attachment 504, which may mate a base device to a lighting socket. A networked device may include a heat sink 506 to facilitate cooling the device, e.g., to maintain an operating temperature range. A component mount 508 may be a fixture to hold other device components in place. An auxiliary light 510, as described herein, may provide low-level lighting and/or communication-based indicative lighting. An exemplary auxiliary light 510 is described with respect to FIGS. 6A-B. A wireless data transceiver 512 may be a communication portal having different functionality for slave and master devices. In embodiments, a slave device wireless data transceiver 512 may only handle Bluetooth communications, while a master device wireless data transceiver may handle Wi-Fi communication. A power controller 514 may regulate power that is supplied to one or more components of the networked device, e.g., in response to control inputs. A universal module 516 may be a core device, which can vary from head unit to head unit. The exemplary universal module 516 comprises LED lights as the core device. In embodiments, a universal module can be a lighting module, camera module, sensor module, and/or speaker module, to name a few.

Figure 6A:
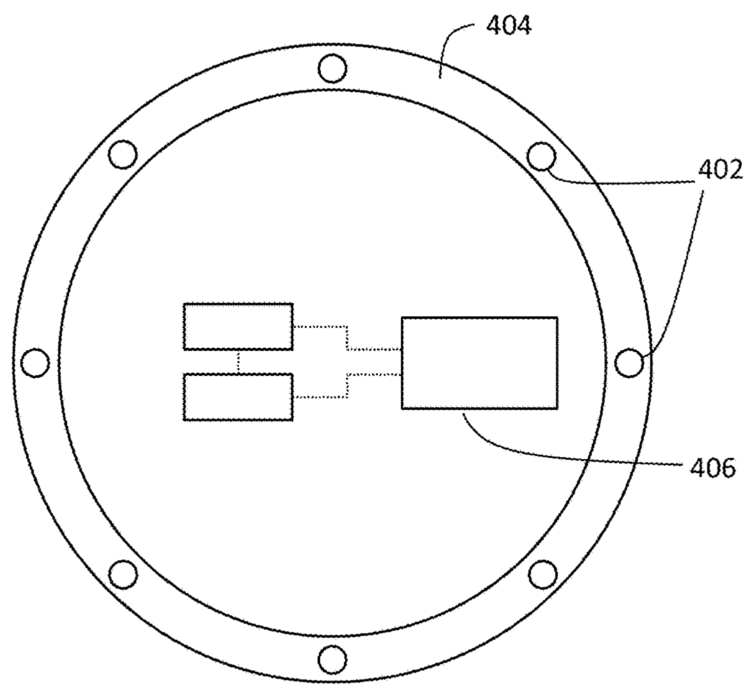
FIG. 6A is a top view of an auxiliary lighting component in accordance with exemplary embodiments of the present invention.
Figure 6B:
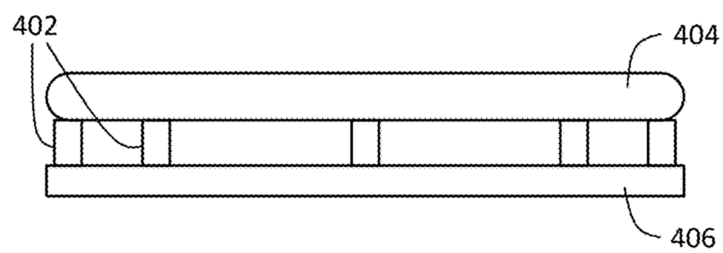
FIG. 6B is a side view of an auxiliary lighting component in accordance with exemplary embodiments of the present invention.

FIG. 6A is a top view and FIG. 6B is a side view of an exemplary auxiliary lighting component in accordance with the present invention. The exemplary auxiliary lighting component is an LED ring. The LED light ring comprises a plurality of RGB LED diodes 402 mounted on a printed circuit board 406. At least a portion of each LED diode 402 may be enclosed and/or surrounded by a plastic light curtain, which may be translucent and/or colored translucent plastic that can transport the light along its surface and/or allow light to pass through its surface.

FIGS. 7A-K illustrate various views of an exemplary networked device 700 in accordance with the present invention. The exemplary networked device can comprise a speaker and/or a light source. In embodiments, the device may have an auxiliary function, such as audio playing provided by an auxiliary device (e.g., a speaker), in addition to the primary function as a light source and an ancillary function as a diffused light source (e.g., a night light). Accordingly, in embodiments, the device may serve as an A19 light bulb, which may be provided in addition to a function provided by an auxiliary device (e.g., as a speaker, camera, sensor, or spot light, to name a few). The exemplary networked device 700 is described with respect to a speaker embodiment, although the device may comprise other auxiliary devices, such as a camera, a microphone, an air quality sensor, a motion sensor, an occupancy sensor, a Wi-Fi repeater, or an infrared blaster, to name a few. Accordingly, the speaker control components described herein may be replaced with respective auxiliary device control components. In embodiments, a networked device may not function as a light source, e.g., an auxiliary device without the primary lighting LEDs. In other embodiments, a networked device can include multiple auxiliary devices and may have additional PCBs (e.g., a PCB configured to control each auxiliary device).

Figure 7A:
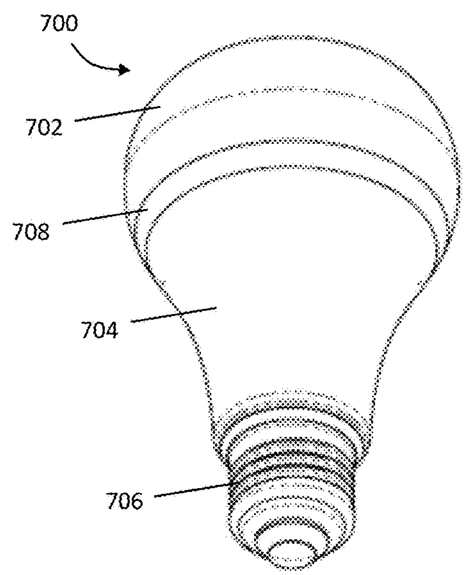
FIG. 7A is a perspective view of a networked device in accordance with exemplary embodiments of the present invention.
Figure 7B:
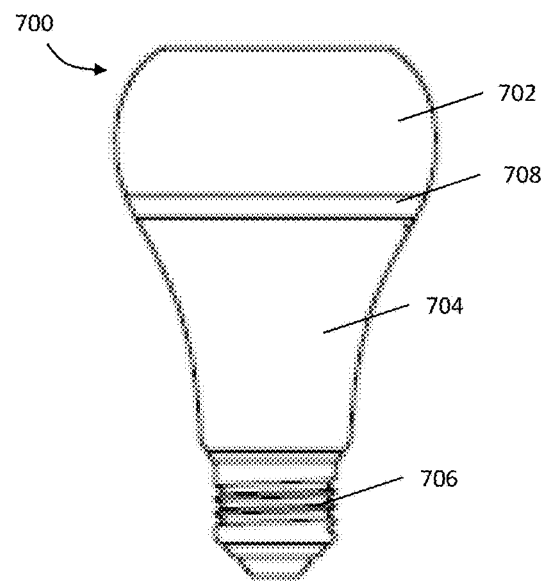
FIG. 7B is a front view of a networked device in accordance with exemplary embodiments of the present invention.

As seen in FIGS. 7A and 7B, the device 700 may have an outer globe 702 at the upper portion of the device. The outer globe 702 may be transparent. In embodiments, the outer globe 702 may be translucent, filtering out or scattering some light from the light source. In embodiments, the outer globe 702 may be constructed from clear copolyester or glass. The outer globe 702 may be frosted to reduce the amount of light that passes through it and/or to scatter light. A transition ring 708 may connect the globe 702 to the cowling 704, which forms the outer portion body of the lower portion of the device 700. In embodiments, the transition ring 708 may be threaded to couple the upper and lower portions of the networked device 700. In embodiments, the upper and/or lower portions and the transition ring 708 may snap together. At the base of the device 700 a threaded connector 706 may be configured to attach to a light socket. The threaded connector 706 may be an Edison screw. The threaded connector 706 may be manufactured in different sizes (e.g., 5-40 mm base diameters including the external threads) to fit within various sockets (e.g., E5, E11, E12, E14, E17, E26, E27, E27, E39, E40 socket sizes, to name a few), as socket sizes may differ among lighting base units or lighting sockets installed in buildings and/or may differ among countries and/or regions. In embodiments, the device 700 may be configured to attach to different types of light sockets, which may or may not require a threaded attachment. For example, the networked device 700 may be adapted to attach to fluorescent light sockets, which may use two connectors. In embodiments, adapters may be provided to connect the device 700 to a variety of sockets. The light sockets may provide power to the device, as discussed herein. In embodiments, a lighting device may be configured to mate directly to a power source, such as by plugging into a power socket. Accordingly, a connector 706 may comprise a power plug.

Figure 7C:
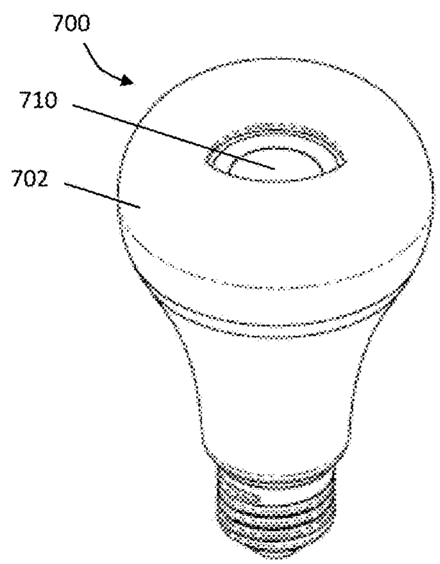
FIG. 7C is a perspective view of a networked device in accordance with exemplary embodiments of the present invention.
Figure 7D:
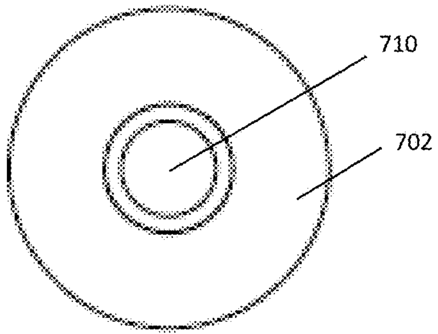
FIG. 7D is a top view of a networked device in accordance with exemplary embodiments of the present invention.

FIGS. 7C and 7D show that the networked device 700 can include an aperture 710 in the center of the top of the globe 702. The aperture 710 may simply be an opening in the structure of the globe 702.

Figure 7E:
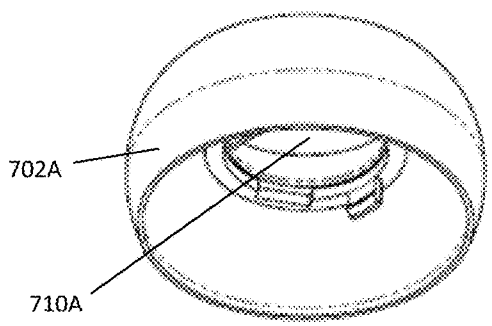
FIG. 7E is a perspective view of a first exemplary outer globe for a networked device comprising a speaker in accordance with exemplary embodiments of the present invention.
Figure 7G:
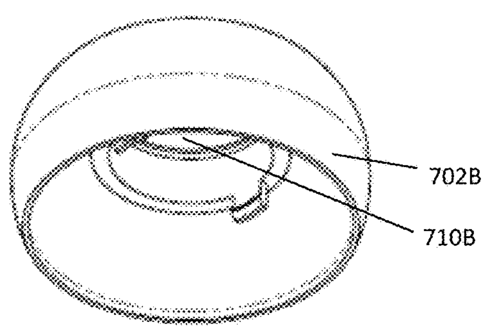
FIG. 7G is a perspective view of a second exemplary outer globe for a networked device comprising a spot light in accordance with exemplary embodiments of the present invention.
Figure 7F:
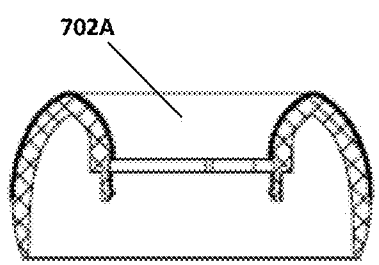
FIG. 7F is a section view of the first exemplary outer globe for the networked device comprising a speaker in accordance with exemplary embodiments of the present invention.

FIGS. 7E and 7F show an exemplary globe 702A for a networked device 700A with a speaker auxiliary device. Speaker hardware 714 may be fitted within an aperture 710A or below the aperture 710A.

Figure 7H:
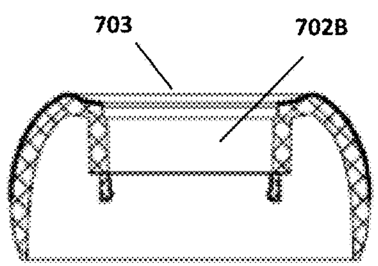
FIG. 7H is a section view of the second exemplary outer globe for the networked device comprising a spot light in accordance with exemplary embodiments of the present invention.

FIGS. 7G and 7H show an exemplary globe 702B for a networked device 700 with a spot light auxiliary device. Light from the spot light source may shine through an aperture 710B. Such a device can include a spot globe cap 703 across the top of the aperture 710B in globe 702B. The spot light source may be a single light bulb or an arrangement of a plurality of discrete light sources, such as a plurality of LEDs, as described herein.

Figure 7I:
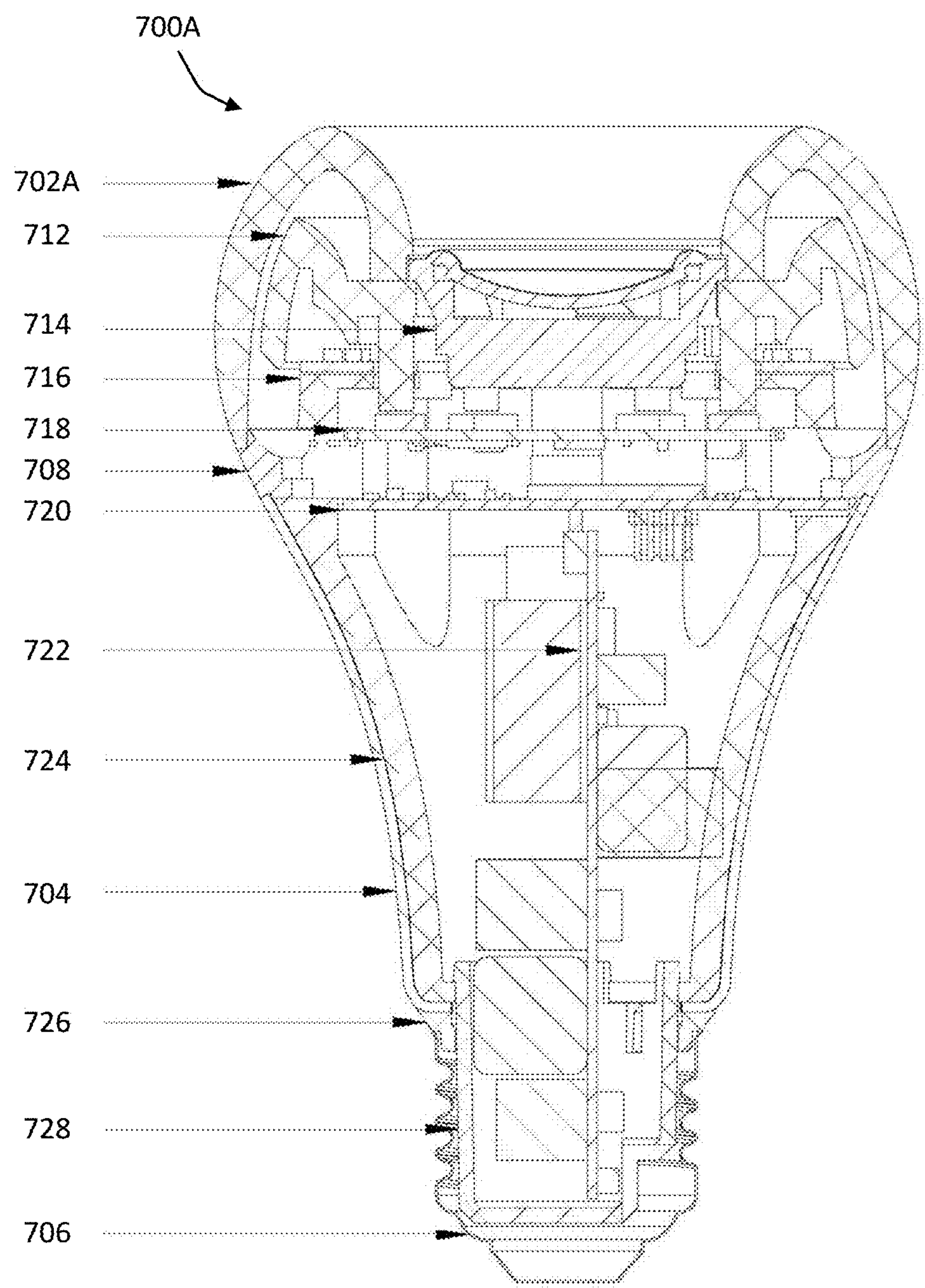
FIG. 7I is a section view of an assembled networked device in accordance with exemplary embodiments of the present invention.

FIG. 7I is a section view of the exemplary networked device 700A corresponding to a speaker embodiment of the networked device 700. The components described with respect to the speaker embodiment 700A may be largely the same as or similar to the components of other embodiments, with the primary difference being the communication and control printed circuit board (PCB) and speaker hardware, which would be replaced with hardware and a corresponding communication and control PCB configured to perform the auxiliary function of the device, such as a spot light or a camera.

Below the globe 702A is a diffuser 712. The diffuser may be translucent, which may be achieved via a textured and/or polished surface. The diffuser may be made from translucent, clear copolyester. The diffuser may scatter light so as to soften the light emitted from the device 700. The diffuser may be used to provide light without a spotlight effect. The diffuser may also blend light from a plurality of LED light sources, which LEDs may provide light at differing wavelengths (and accordingly, differing colors), as described herein. The diffuser 712 may combine these discrete sources of light to provide a uniform glow, e.g., uniform in brightness and/or color. In embodiments, the diffuser 712 may scatter light that is emitted directly into the diffuser. The diffuser 712 may also scatter light that is transported to the diffuser (e.g., to an inner surface of the diffuser) via one or more light pipes. A light pipe may be a solid conduit comprised of transparent and/or translucent material, such as glass or clear copolyester. In embodiments, light pipes may be hollow and/or non-rigid. In embodiments, a light pipe may be a cylindrical member with a flat surface at a first end that contacts an LED. For example, LEDs, such as RGB LEDs on the indicator PCB, may each contact a light pipe, which transports light emitted from those LEDs to the diffuser 712. This configuration can enable the diffuser to glow, such as to create the effect of a ring of light (e.g., colored light) within the head of the lighting device. The aperture 710 may extend through the diffuser 712.

A speaker comprising a speaker driver 714 may be located within the aperture or within the channel formed by the aperture through the globe 702A. The speaker driver 714, which is a transducer that can produce sound waves from electrical signals, may be recessed from the top of the globe 702A. All or part of the aperture channel may comprise cylindrical shape or a conical shape forming a conical cylinder. In embodiments, the aperture channel may have a different diameter through all or part of its length, such as a parabolic cross-section viewed along the length. The aperture channel may thus provide directional focus and/or amplification of sound waves. In embodiments, the speaker may be attached to the globe.

A communication and control PCB 720 may be a communication and speaker control PCB comprising circuitry for audio generation and/or audio controls (including, e.g., an audio amplifier). In embodiments, the communication and control PCB 720 can include some or all of the communications circuitry and/or other communications hardware of the device 700A. Communications circuitry can include one or more chipsets and/or antennas. For example, the communications and control PCB 720 may also include Wi-Fi communications hardware. A communications and control PCB may also comprise one or more microprocessors, which may be used to control certain communications (e.g., Wi-Fi and Internet-based communications) and/or speaker operation (e.g., volume controls, audio generation, surround sound integration, to name a few). Such a PCB is described in greater detail with respect to FIGS. 9C and 9D.

In embodiments where the networked device 700 is not a speaker, the speaker driver 714 may be replaced with different hardware, such as a camera, one or more sensors, and/or another light source (e.g., a spot light source). Instead of a speaker control circuitry as found in PCB 720, a non-speaker networked device 700 can include a communications and control PCB comprising circuitry for the auxiliary device hardware, e.g., camera circuitry, sensor circuitry, spot light source comprising, which may comprise a plurality of LEDs (e.g., clustered LEDs), to name a few.

Components within the networked device 700A may be mounted to a chassis 716, which may hold the components, such as the PCBs and/or the auxiliary device (e.g., the speaker driver 714), fixed in their respective positions.

Other PCBs in the networked device 700A can include an indicator PCB 718. The indicator PCB 718 may comprise one or more LEDs (e.g., four, five, or six LEDs, to name a few), which can be used to provide alerts and/or signals, such as by flashing a specified number of times and/or changing colors. In embodiments, the LEDs may provide a secondary light source, such as low output light, as may be used for a night light. These LEDs may provide colored light output (e.g., RGB LEDs outputting colored light of various effective visible wavelengths through combinations of red, green, and blue light). Light from these LEDs may be diffused through the diffuser 712. In embodiments, the RGB LEDs may be positioned in proximity to and/or may contact a light pipe, which can transport the light to the outside surface of the networked device, such as to form a circular ring around the device. In embodiments, this secondary light source may provide light to a light pipe, which transports the light to the surface of the device, e.g., as a band around the device. An indicator PCB 718 can also include additional communications circuitry, such as a Bluetooth Low Energy communications chipset. An indicator PCB 718 can also include one or more microprocessors, which may control lighting and/or certain communications, such as mesh network communications. An exemplary indicator PCB is described herein with respect to FIGS. 9E and 9F.

As shown in FIG. 7I the aforementioned components may be mounted within the upper portion of the networked device 700A. Additional components may be mounted in the lower base portion, e.g., at and/or below the transition ring 708 and contained within the cowling 704. A radiator 724 may dissipate heat from processing the input power, such as transforming input alternating current (AC) power to direct current (DC) power. The radiator 724 may be a heat sink, which may have no moving parts (e.g., milled metal with pins and/or fins to promote convective heat transfer). In embodiments, the radiator 724 may dissipate heat from other PCBs (e.g., heat generated by the circuitry and/or processors) and/or from the LEDs or other heat-producing hardware.

A power control PCB 722 may be located within the radiator 724. The power control PCB 722 may be configured for AC power processing, such as modulating the power delivered (e.g., to other PCBs and/or hardware components) and/or transforming input AC power to a DC output (e.g., to power the LED lights). Power control PCBs are described herein in greater detail with respect to FIGS. 9A and 9B.

At the base of the device 700A an insulating cap 728 may be positioned within the interior of the threaded cap 706. The insulating cap 728 may reduce the heat transferred to the threaded cap 706 so as to avoid melting of socket components and/or to avoid temperatures too high for safe human touch. A retaining ring 726 may form the connection between the threaded cap 706 and the cowling 704.

Figure 7J:
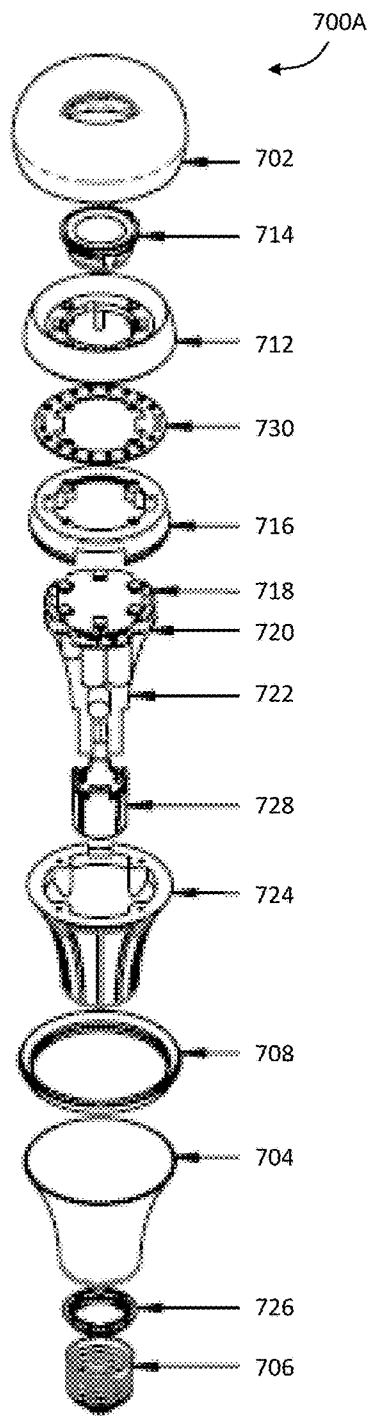
FIGS. 7J-K are assembly views of a networked device in accordance with exemplary embodiments of the present invention.
Figure 7K:
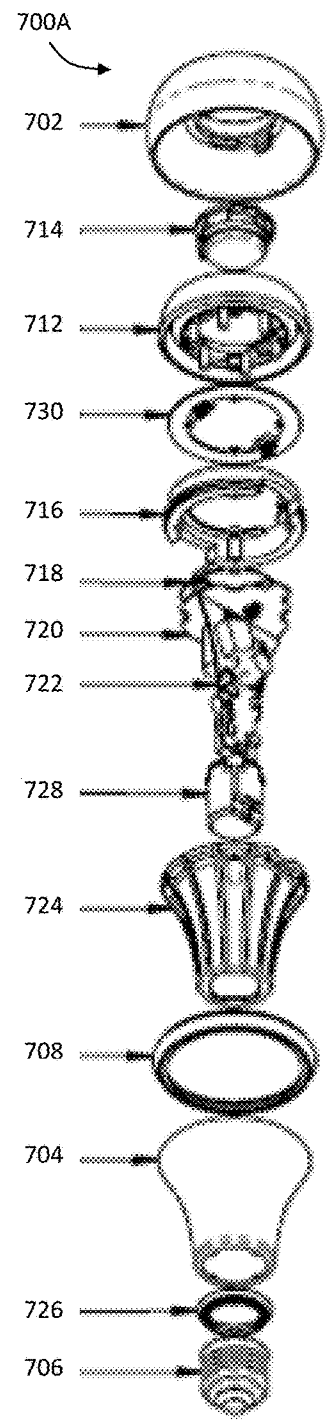

Turning to the exploded views shown in FIGS. 7J and 7K additionally illustrate the LED lighting PCB 730 of networked device 700A. Such an LED lighting PCB 730 may be included in other networked devices 700 so that those devices can function as lightbulb in addition to their auxiliary function. The LED lighting PCB 730 may provide the primary light source for the networked device 700A. A plurality of LEDs may be arranged on the LED lighting PCB 730, such as around its perimeter. The light from these LEDs may be diffused through the diffuser 712. The LEDs may comprise alternating white and yellow LEDs or other such patterned arrangements. LED lighting PCBs are described herein with respect to FIGS. 9G and 9H.

Figure 7L:
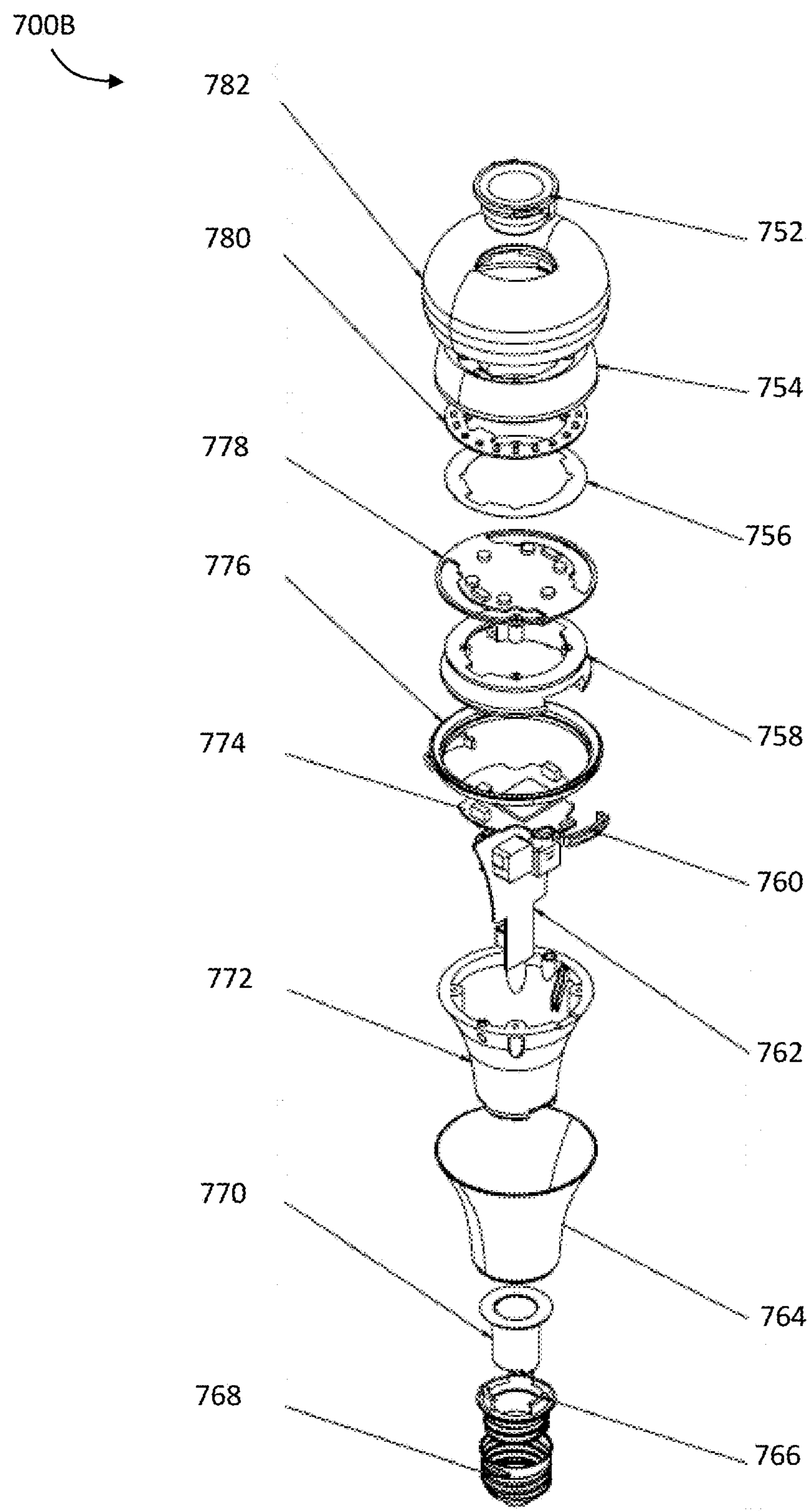
FIG. 7L is an assembly view of a networked device in accordance with exemplary embodiments of the present invention.

FIG. 7L is an assembly view of another networked device in accordance with embodiments of the present invention. As with the networked device 700, device 700B can include a globe 782 at a head portion of the device and a transition ring 776 between the globe and cowling 764. In embodiments, a transition ring may be excluded, and the globe may mate directly to the cowling. In embodiments, another coupling may connect the globe to the cowling, which coupling may comprise a light pipe, LEDs, antenna, speaker, and/or some other auxiliary device, to name a few. At the base of the device, a threaded connector 768 can enable mating of the device to a lightbulb or other power socket. The threaded connector 768 may be sized to fit within various sockets (e.g., E5, E11, E12, E14, E17, E26, E27, E27, E39, E40 socket sizes, to name a few). In embodiments, other shaped connectors may be used to allow the device to mate to an appropriate lighting socket or power source. Such connectors may be threaded of different sizes, non-threaded, and/or plug-in, to name a few. The device 700B can further include a radiator insulating cap 2016 and/or a potting cap 770, as described herein. A chassis plug 760 may prevent leakage of potting material. It may connect the threaded connector 768 to a radiator 772. Components within the device 700B may be mounted to a chassis 758, as described herein.

The device 700B can include an optical diffuser 754 within the globe, which can diffuse light from one or more light sources (e.g., one or more LEDs). An LED PCB assembly 780 may comprise a plurality of LEDs, which can deliver light through the diffuser 754. One or more LEDs may be arranged (e.g., on a PCB) in an array or pattern, such as a row, grid, circle, ring, and/or concentric rings, to name a few. In embodiments, LEDs of different sizes may be used. LEDs of different colors may be used (e.g., differing color temperatures). In embodiments, the brightness or intensity, color or hue, and/or temperature or warmth of the LEDs may be controlled, e.g., via a light driver or LED driver and/or a microcontroller. In embodiments, different LEDs may be controlled to output light of differing qualities, which may blend together in the diffuser, enabling greater combinations of output light types. For example, white light in the temperature range 2700 k to 5000 k may be output. In certain embodiments, light may be output up to 800 lumens in brightness. In embodiments, a critical rendering index (CRI) of the light may be in the range 85-90.

A speaker 752 may extend through an opening in the globe. In embodiments, the speaker may be recessed from the top of the device 700B. In other embodiments, a face of the speaker may be approximately flush with the top of the device 700B. The speaker may be mounted on a printed circuit board or operatively connected to one or more printed circuit boards. In embodiments, the speaker may be mounted to an indicator PCB 778.

In embodiments, the indicator PCB 778 may comprise one or more communications chipsets, such as a Bluetooth Low Energy chipset. The indicator PCB 778 can include one or more communications antennas, such as Bluetooth antennas and/or Wi-Fi antennas. The antennas may be located along outer wings or edges of the PCB, which may improve signal quality. In embodiments, the antennas may be operatively connected to other components within lighting device 700B, such as a communication and control PCB 774. The indicator PCB may further include a real-time clock (RTC), as described herein. The real-time clock may be operatively connected to a super-capacitor for power.

The indicator PCB may further comprise one or more LEDs to be used for communicative lighting (e.g., providing steady, flashing, and/or colored indicator lights). In embodiments, the indicator lights may output light to one or more light pipes, which may transport the light to an outer surface of the lighting device 700B. In embodiments, the light pipes may form patterns such as one or more rings around the device 700B or one or more points that emit the light from the device.

The lighting device 700B may further comprise a communication and control PCB 774, which can include one or more microcontrollers, speaker control components (e.g., audio amplifier), and/or other communications chipsets. The communication and control PCB 774 or portions thereof may be operatively connected to the indicator PCB 778 or portions thereof, including the speaker 752. Accordingly, audio data and/or control signals may be transmitted from the communication and control PCB 774 to or through the indicator PCB 778 to control the speaker. In embodiments, there may be a 2-wire connection between the communication and control PCB 774 and the indicator PCB 778. The connection may provide power, ground and/or 2-wire data.

In embodiments, the PCB circuitry and/or components described herein may be located on one or more other PCBs described herein or on additional PCBs. Accordingly, the components and circuitry can be arranged on a plurality of PCBs, such as, e.g., two, three, four, and/or five PCBs, to name a few. In embodiments, all communications chipsets, such as Bluetooth (and/or Bluetooth Low Energy) along with Wi-Fi, may be located on a single PCB. Speaker (or other auxiliary device) control components (e.g., an amplifier) and/or lighting control components (e.g., LED driver) may be located on one or more other PCBs. Non-PCB arrangements are also possible, with chips and components being mounted to a chassis.

A power PCB 762, which may be an AC power PCB as described herein, may provide power to one or more components of the lighting device 700B. Accordingly, the power PCB 762 can include power output components. An LED driver to output and/or regulate power to the LED PCB or to other LEDs. A radiator 772 may dissipate heat, which may be produced by the power PCB 762 and/or LED PCB assembly 780. One or more thermal pads or thermal connectors may improve heat flow within the device. The thermal connectors may comprise thermally conductive material that compresses between two surfaces to remove or reduce air gaps between heat-conducting surfaces, which gaps could cause temperature spikes. The thermal connectors may be thermal pads, paste, or grease. Thermal connectors may be located between the LED PCB and the chassis, between the chassis and the radiator, and/or between the radiator and outer cowling, to name a few.

Accordingly, an exemplary lighting device for use with one or more other networked devices can comprise an outer globe comprised of an at least partially transparent rigid material and forming the exterior of a head portion of the lighting device; a diffuser within the outer globe configured to receive light from one or more light sources and emit diffused light; a plurality of light pipes configured to transport light from one or more light emitting diodes (LEDs) to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat. The power control printed circuit board can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further comprise a communication and control printed circuit board within the lighting device operatively connected to the power control printed circuit board, which communication and control printed circuit board can comprise a first wireless communications module operatively connected to a first communications antenna and an auxiliary device control unit.

The lighting device can comprise an indicator printed circuit board within the lighting device, which can comprise a first plurality of LEDs each configured to deliver light to a respective one of the plurality of light pipes; a real-time clock configured to track time; and a supercapacitor operatively connected to the real-time clock and configured to provide power to the real-time clock at least in the absence of electricity flowing in to the lighting device via the power input connector. In embodiments, the first plurality of LEDs of the indicator printed circuit board may be RGB LEDs.

The lighting device can comprise one or more microprocessors operatively connected to first non-transitory computer-readable memory having stored thereon first processing instructions readable by at least one of the one or more microprocessors; an auxiliary device mounted within the lighting device closer to the head of the lighting device than the indicator printed circuit board, operatively connected to the communication and control printed circuit board, and configured to receive power from the power control printed circuit board; and an LED lighting printed circuit board mounted within the lighting device closer to the head of the lighting device than the indicator printed circuit board and having an aperture through which the auxiliary device extends, the LED lighting printed circuit board operatively connected to the indicator printed circuit board, configured to receive power from the power control printed circuit board and comprising a second plurality of LEDs configured to deliver light through the diffuser.

In embodiments, the first communications antenna may be located on the indicator printed circuit board. In embodiments, the first wireless communications module may be configured to communicate with one or more of the one or more other networked devices using a mesh network communications protocol. In embodiments, the lighting device may further comprise a second wireless communications module operatively connected to a second communications antenna. In embodiments, the first wireless communications module may be configured to communicate via Wi-Fi and the second wireless communications module is configured to communicate via a Bluetooth protocol (e.g., Bluetooth Low Energy and/or Bluetooth 4.0 or higher, to name a few).

In embodiments, at least one of the one or more microprocessors may be located on the indicator printed circuit board. In embodiments, at least one of the one or more microprocessors may be located on the communications and control printed circuit board. In embodiments, the auxiliary device control unit may comprise at least one of the one or more microprocessors configured to control the auxiliary device.

In embodiments, the communication and control printed circuit board, the indicator printed circuit board, and the LED lighting printed circuit board may comprise a stacked circuit board configuration within the lighting device.

In embodiments, the output current controller may comprise an LED driver.

In embodiments, the first processing instructions may comprise time-dependent settings, and the lighting device may output light (e.g., a particular color temperature and/or intensity) according to the time-dependent settings based at least in part upon a time measured by the real-time clock.

In embodiments, a lighting device for use with one or more other networked devices may comprise an outer globe comprised of an at least partially transparent rigid material and forming the exterior of a head portion of the lighting device; a diffuser within the outer globe configured to receive light from one or more light sources and emit diffused light; an LED printed circuit board comprising a plurality of LEDs configured to deliver light through the diffuser; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat. The power control printed circuit board may comprise a power converter configured to convert alternating current to direct current; a voltage regulator configured to output steady direct current power at one or more voltages; an LED driver configured to control output of power to a plurality of LEDs;

an output power connector to output power to one or more other components within the lighting device; and an output current controller configured to control the output of electric current to the one or more other components within the lighting device.

The lighting device may further comprise one or more printed circuit boards within the lighting device operatively connected to the power control printed circuit board and comprising a first wireless communications module operatively connected to a first communications antenna and configured to communicate wirelessly with one or more mobile user devices; a real-time clock configured to track time; and a supercapacitor operatively connected to the real-time clock and configured to provide power to the real-time clock at least in the absence of electricity flowing in to the lighting device via the power input connector; and one or more microprocessors operatively connected to first non-transitory computer-readable memory having stored thereon first processing instructions readable by at least one of the one or more microprocessors to control the plurality of LEDs, wherein the first processing instructions may include instructions to adjust light intensity of the plurality of LEDs based at least in part upon time of day.

In embodiments, the first wireless communications module may be configured to communicate directly with the one or more mobile user devices via a direct wireless connection (e.g., using a Bluetooth Low Energy or other Bluetooth communications protocol). In embodiments, the first wireless communications module may be configured to communicate indirectly with the one or more mobile user devices via at least one data network, such as a wireless area network (e.g., provided via a router) and/or the Internet.

In embodiments, the first processing instructions may comprise time-dependent settings, and the lighting device may output light according to the time-dependent settings based at least in part upon a time measured by or measurable by the real-time clock. In embodiments, the time-dependent settings may indicate a color temperature and/or a light intensity.

In embodiments, a lighting device for use with one or more other networked devices may comprise an outer globe comprised of an at least partially transparent rigid material and forming the exterior of a head portion of the lighting device; a diffuser within the outer globe configured to receive light from one or more light sources and emit diffused light; an outer cowling forming the exterior of a base portion of the lighting device; a power input connector located at the base of the lighting device and configured to mate with a standard lightbulb socket; and power control components, which can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further comprise communication and control components, which may comprise one or more microprocessors operatively connected to non-transitory computer readable memory having stored thereon processing instructions readable by at least one of the one or more microprocessors; a first wireless communications module operatively connected to a first communications antenna and to at least one of the one or more microprocessors; a real-time clock configured to track time; and a supercapacitor operatively connected to the real-time clock and configured to provide power to the real-time clock at least in the absence of electricity flowing into the lighting device via the power input connector. The lighting device may also comprise an auxiliary device and a first plurality of LEDs configured to deliver light through the diffuser.

In embodiments, the first communications antenna may be located on the indicator printed circuit board. In embodiments, the first wireless communications module may be configured to communicate with one or more of the one or more other networked devices using a mesh network communications protocol. In embodiments, the lighting device may further comprise a second wireless communications module operatively connected to a second communications antenna. In embodiments, the first wireless communications module may be configured to communicate via Wi-Fi, and the second wireless communications module may be configured to communicate via a Bluetooth protocol.

In embodiments, at least one of the one or more microprocessors may be configured to control the auxiliary device. In embodiments, at least one of the one or more microprocessors may be located on the indicator printed circuit board. In embodiments, at least one of the one or more microprocessors is located on the communications and control printed circuit board.

In embodiments, a lighting device for use with one or more other networked devices may comprise an outer globe comprised of an at least partially transparent rigid material and forming the exterior of a head portion of the lighting device; a diffuser within the outer globe configured to receive light from one or more light sources and emit diffused light; an auxiliary device mounted within the lighting device closer to the head of the lighting device than one or more printed circuit boards; an LED printed circuit board comprising a plurality of LEDs configured to deliver light through the diffuser; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat. The power control printed circuit board may comprise a power converter configured to convert alternating current to direct current; a voltage regulator configured to output steady direct current power at one or more voltages; an LED driver configured to control output of power to a plurality of LEDs; an output power connector to output power to one or more other components within the lighting device; and an output current controller configured to control the output of electric current to the one or more other components within the lighting device.

The lighting device may further comprise one or more printed circuit boards within the lighting device operatively connected to the power control printed circuit board and comprising a first wireless communications module operatively connected to a first communications antenna and configured to communicate wirelessly with one or more mobile user devices; an auxiliary device control unit; a real-time clock configured to track time; a supercapacitor operatively connected to the real-time clock and configured to provide power to the real-time clock at least in the absence of electricity flowing in to the lighting device via the power input connector; and one or more microprocessors operatively connected to first non-transitory computer-readable memory having stored thereon first processing instructions readable by at least one of the one or more microprocessors to control the plurality of LEDs.

Figure 8A:
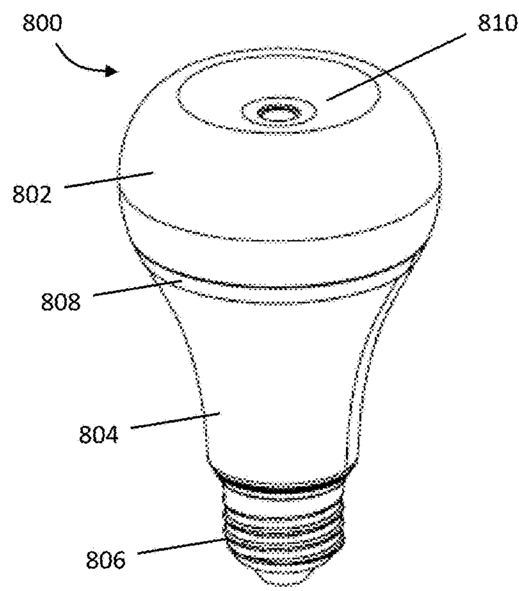
FIG. 8A is a perspective view of a networked device in accordance with exemplary embodiments of the present invention.
Figure 8B:
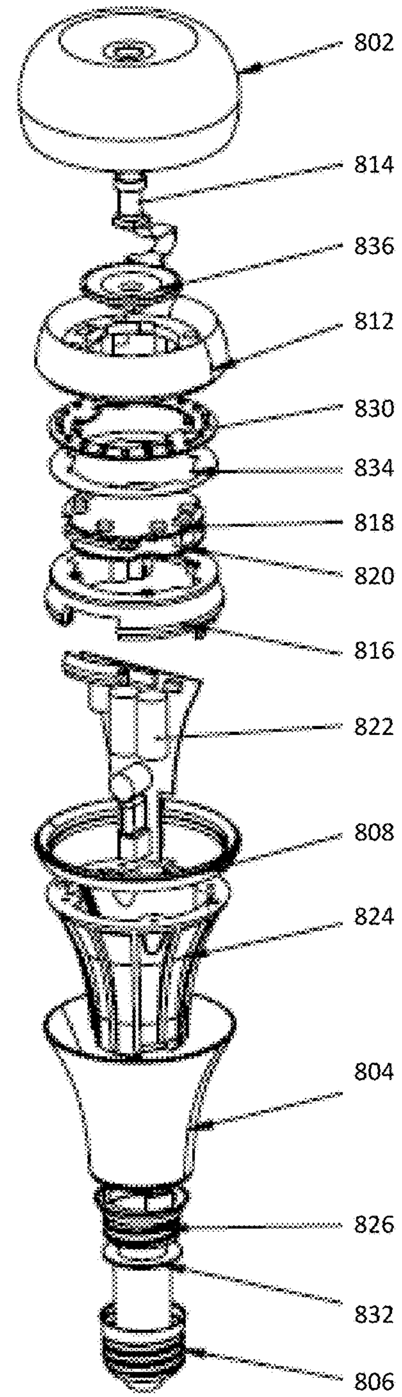
FIG. 8B is an assembly view of a networked device in accordance with exemplary embodiments of the present invention.

FIGS. 8A and 8B show an exemplary networked device 800 corresponding to a camera embodiment of the networked device. As with the networked device 700 described herein, networked device 800 can include a globe 802, transition ring 808, cowling 804, and threaded cap 806, which components can form outer surfaces of the device 800. A camera 814 may be located within an aperture 810 in the top of the globe 802. A camera support disk 836 may support the camera 814 and/or fix it in position within the aperture 810. Light from an LED lighting PCB 830 may be diffused through a diffuser 812 located within the head of the device 800, encapsulated by globe 802. A heat spreader 834, such as an LED heat spreader, may be a heat sink coupled to the LED lighting PCB 830 to facilitate heat dissipation from the LED lighting PCB 830. In embodiments, such a heat sink may be found in other networked devices, such as networked device 700.

An indicator PCB 818 can include one or more LEDs, which may be RGB LEDs capable of emitting light at different wavelengths. Light emitted from LEDs mounted on an indicator PCB 818 may also be channeled through the diffuser 812. In embodiments, communications circuitry and/or other communications hardware may be mounted on the indicator PCB 818. Such communications circuitry and/or hardware can include a Bluetooth Low Energy chipset. The indicator PCB 818 may include one or more microprocessors, which may control certain communications and/or lighting. A communications and control PCB 820 can include camera control circuitry. In embodiments, the communications and control PCB 820 may include one or more microprocessors, which may control certain communications (e.g., Wi-Fi communications) and/or the camera (or a different auxiliary device). It may be operably connected to the camera module 814. The communications and control PCB 820 may also include communications circuitry and/or hardware such as chipsets and/or antennas. In embodiments, such communications circuitry and/or hardware can provide Wi-Fi communications.

Components such as the LED lighting PCB 830, LED head spreader 834, indicator PCB 818, and/or communications and control PCB 820 may be mounted to a chassis 816. The chassis 816 may be positioned at the base of the head portion of device 800, above the cowling 804. A power control PCB 822 may be operably connected to one or more of the other PCBs. The power control PCB 822 may be substantially located within a radiator 824 in the base portion of the device 800. However, a portion of the power control PCB 822 may extend upwards beyond the base portion to contact one or more other PCBs, such as the communications and control PCB.

A retaining ring 826 may join the cowling 804 to a potting cap 832. The potting cap 832 may be located within a threaded cap 806. A potting compound may be disposed around the power control PCB 822. The potting compound may provide insulation and/or physical support to facilitate securing the power control PCB 822 within the radiator. The potting compound may be a silicone resin, which may be liquid prior to curing. The potting cap 832 can contain such a liquid resin prior to its curing. During manufacture and/or assembly the liquid resin may be poured into the potting cap 832.

Figure 9A:
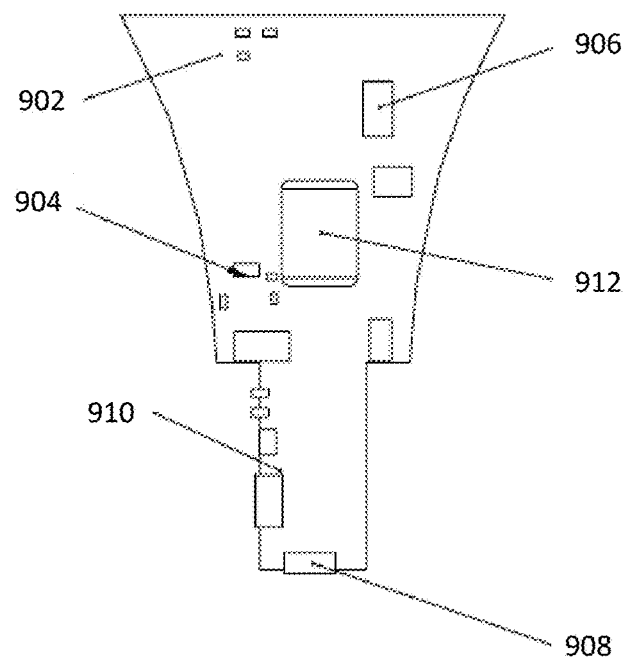
FIG. 9A is a bottom view of a power control printed circuit board in accordance with exemplary embodiments of the present invention.
Figure 9B:
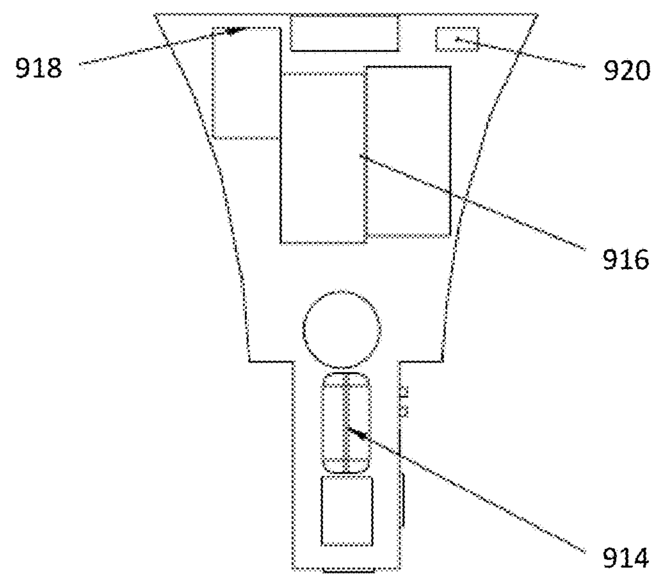
FIG. 9B is a top view of a power control printed circuit board in accordance with exemplary embodiments of the present invention.

FIGS. 9A-K illustrate exemplary PCB components and/or layouts. FIGS. 9A-B show an exemplary power control PCB. Although certain PCB drawings are described with respect to a top view and a bottom view, it will be understood by one skilled in the art that such designations may not refer to the orientation of the PCB within the device. For example, the power control PCB may actually be oriented along the longitudinal axis of the networked device, within the base portion of the device and thus the faces designated as top and bottom may actually be oriented to face the sides of the device. The power control PCB may have a power input 908, such as a 120V AC power input. A power converter 910 may be adapted to convert the input alternating current to direct current for output. The power converter may comprise one or more rectifiers, capacitors inductors, and/or switching elements. The power converter may use a switch mode power supply principle to convert AC voltage, which may be utility power, to DC low voltage, which may be required by the logic and/or radio (e.g., communications) circuits of the networked device. The DC power output by such an AC/DC power converter may be routed to a voltage regulator 912. The voltage regulator 912 may stabilize the output voltage from the power control PCB. Accordingly, the voltage regulator 912 may maintain one or more constant voltages that it then outputs to one or more current control components (e.g., current control components 902, 904, and 906). For example, a constant voltage of 5V may be output to the logic components, while 50-60V may be output to the LEDs. Lower and higher voltages are possible, as required by the components of the networked device. The current control components can govern the current output to one or more of the other PCBs within device 900. An LED driver may output power to the plurality of LEDs. Current control component 902 may be a logic power supply current control component, which may form part of a logic power supply. In embodiments, it may provide 5V to Wi-Fi communications components and/or 3.3V to Bluetooth Low Energy communications components. Current control component 904 may form part of the power supply to an LED driver, to power the LEDs. Meanwhile, current control component 906 may be an LED driver current control component, which is part of the LED driver itself. It can provide constant current for the LEDs.

FIG. 9B shows exemplary power control components and circuitry on the second side of the power control PCB. These can include input power conditioning circuitry 914, which can perform noise filtering and/or impulse protection, to name a few. DC power conditioning circuitry 916 can operate in conjunction with the voltage regulator 912 to stabilize the converted DC power. The power control PCB can include one or more connectors to other PCBs and/or components thereof. These connectors can include a DC power and control connector 918 to output power to other PCBs and/or an LED power connector 920 to output power specifically to the LED lighting PCB.

Figure 9C:
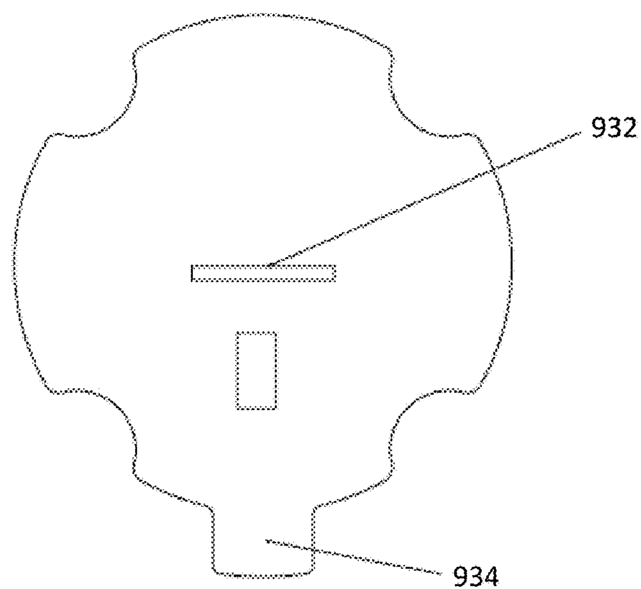
FIG. 9C is a bottom view of a communications and control printed circuit board in accordance with exemplary embodiments of the present invention.
Figure 9D:
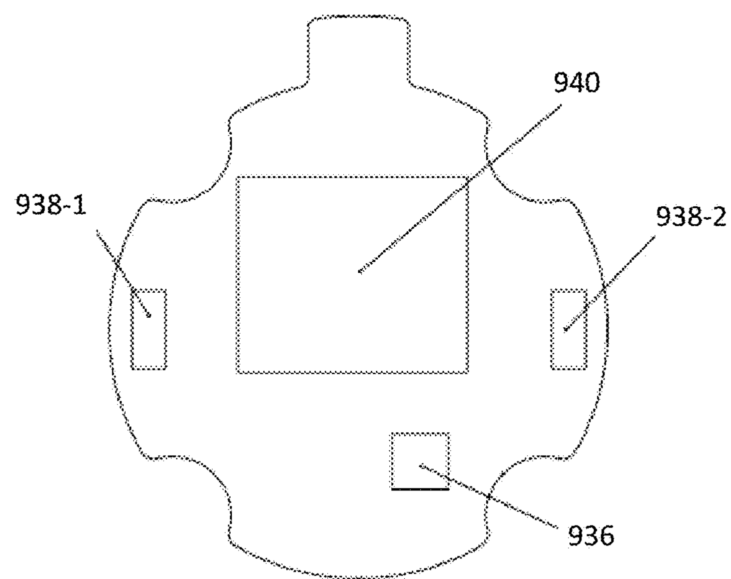
FIG. 9D is a top view of a communications and control printed circuit board in accordance with exemplary embodiments of the present invention.

FIGS. 9C-D show an exemplary communications and control PCB. It can include a power connector 932 to connect to the power control PCB. A wireless communications module 940 can process communications received and/or transmitted by the networked device and/or any of its components. The communications and control PCB can also include a communications antenna 934, which can be used for transmitting and/or receiving communications signals and/or data. One or more processors 936, which may be microprocessors, may include non-transitory computer-readable memory, which may be programmed with control laws specially programmed to control one or more components (e.g., the auxiliary device) of the networked device. The control laws may run on the processor 936, which may interpret received commands, evaluate control laws, and/or generate machine-readable instructions for controlling various device components. For example, the control laws be evaluated to generate instructions to identify when and how to adjust LED output, such as by reducing power to the LED lighting PCB. The communications and control PCB may include one or more connectors 938 (e.g., connectors 938-1 and 938-2), which can be operably connected to the LED lighting PCB and/or the indicator PCB. In embodiments, the communications and control PCB may connect to hardware for performing the device's auxiliary functions, such as a camera, a speaker driver, and/or a spot light (e.g., a clustered LED array). In embodiments where an auxiliary device is not included, a dummy communications and control PCB may be included for ease of manufacturing (e.g., to preserve the relative positions of components within the device).

Figure 9E:
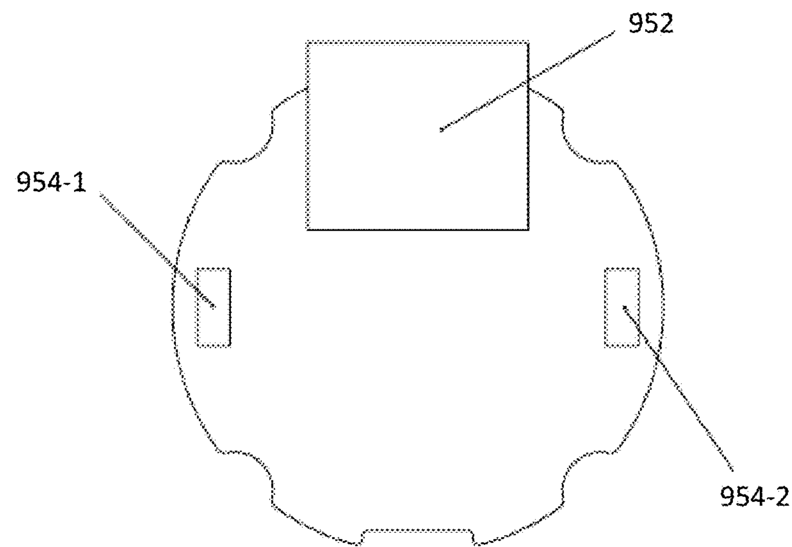
FIG. 9E is a bottom view of an indicator printed circuit board in accordance with exemplary embodiments of the present invention.
Figure 9F:
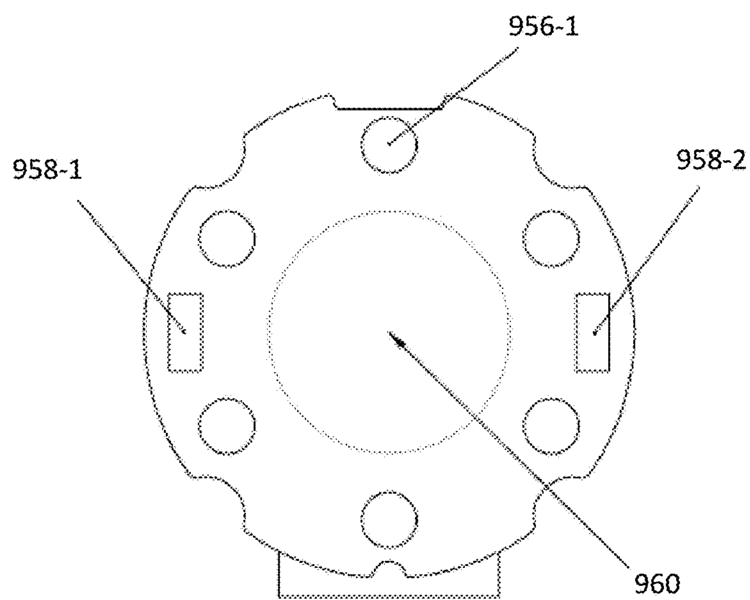
FIG. 9F is a top view of an indicator printed circuit board in accordance with exemplary embodiments of the present invention.

FIGS. 9E-F show an exemplary indicator PCB. The indicator PCB can include a wireless communications module 952. It may handle communications via different protocols from the wireless communications module 940 of the communications and control PCB shown in FIG. 9D. In embodiments, the wireless communications module 952 may handle Bluetooth and/or Bluetooth Low Energy communications. The indicator PCB may be positioned between LED lighting PCB and the communications and control PCB. Accordingly, the indicator PCB may have connectors on both sides for connecting to other PCBs. Connectors 954-1 and 954-2 may connect to the communications and control PCB. On the other side, connectors 958-1 and 958-2 may connect to the LED lighting PCB. A plurality of LEDs 956, which may be RGB LEDs, may be positioned on the indicator PCB. In embodiments, the LEDs 956 may be positioned around the perimeter of the PCB. The indicator PCB may have an opening 960 in its center in which hardware for the auxiliary device function, such as a camera or a speaker, may be positioned. The indicator PCB may comprise one or more microprocessors, which may control lighting for the entire device and/or certain communications, such as mesh network communications or Bluetooth communications.

Figure 9G:
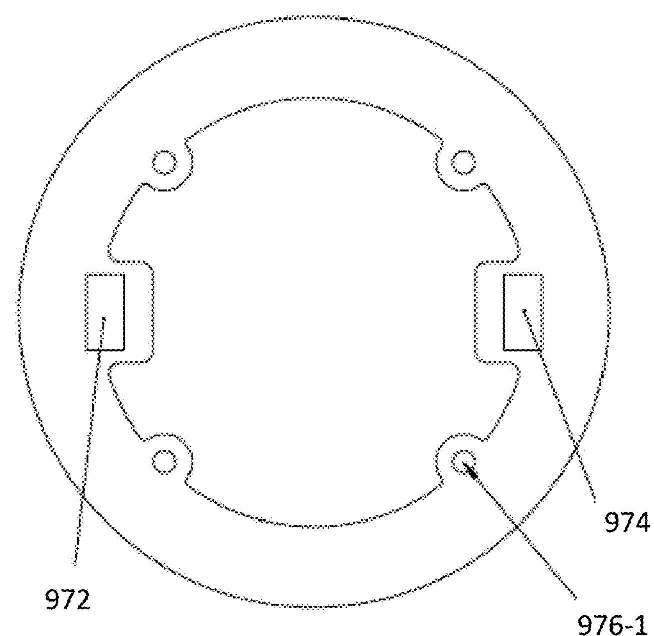
FIG. 9G is a bottom view of an LED lighting printed circuit board in accordance with exemplary embodiments of the present invention.
Figure 9H:
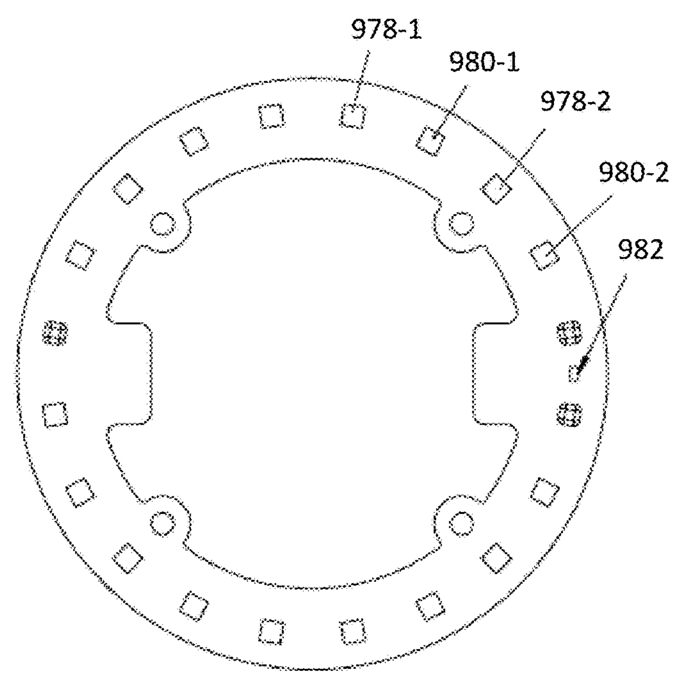
FIG. 9H is a top view of an LED lighting printed circuit board in accordance with exemplary embodiments of the present invention.

FIGS. 9G-H show an exemplary LED lighting PCB. It can include a power connector 974 by which the LED lighting PCB can receive power for the LEDs. In embodiments, a secondary connector 972 may also receive power. Mounting holes 976 may be used to mount the LED lighting PCB to a chassis and/or to mount the LED lighting PCB in relation to the other PCBs. The LED lighting PCB can comprise a plurality of LEDs, which may be alternating warm LEDs 978 and cool LEDs 980. Warm LEDs 978 may be yellow LEDs, and cool LEDs 980 may be white LEDs. The warm and cool LEDs may be controlled separately to adjust the effective wavelength that is output, such as by increasing the warm LED output, decreasing the warm LED output, increasing the cool LED output, and/or decreasing the cool LED output. In embodiments, the output (light intensity) of both warm and cool LEDs may be controlled together, such as to dim the light or increase the brightness. The LED lighting PCB can include a temperature sensor 982, which may be used to prevent overheating, such as by triggering a shut-off or dimming of the LEDs.

Figure 9I:
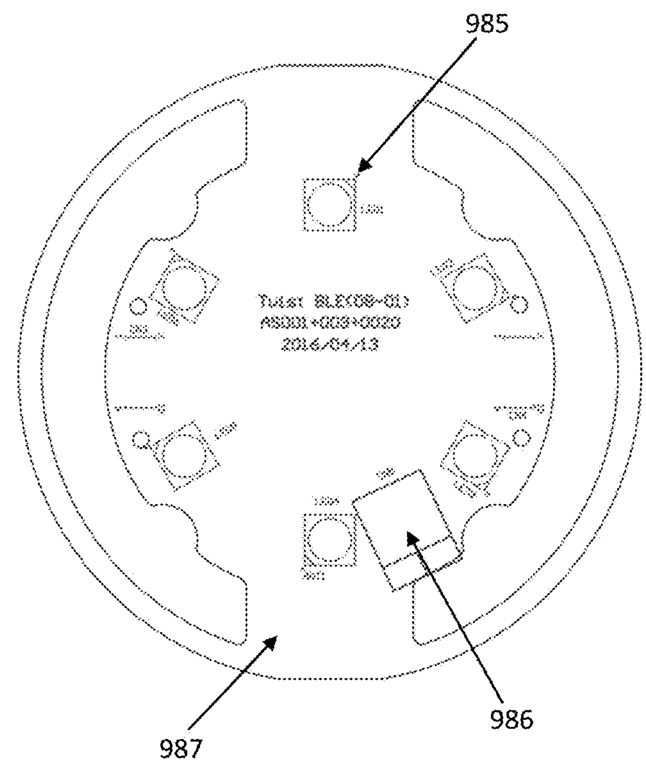
FIG. 9I is a top view of an indicator printed circuit board in accordance with exemplary embodiments of the present invention.

FIG. 9I is a top view of an exemplary indicator printed circuit board in accordance with exemplary embodiments of the present invention. Circuitry components may be arranged and operatively connected on the board 987. The indicator PCB can comprise one or more indicator LEDs 985 (e.g., six LEDs), which may be RGB LEDs. The indicator PCB may comprise an auxiliary connector 986, which may be a data connection, such as an audio input connection. A speaker or auxiliary device may be mounted on the indicator PCB. Accordingly, audio signals may be delivered to a speaker via the auxiliary connector 986, which may operably connect, e.g., via printed circuitry, to the speaker.

Figure 9J:
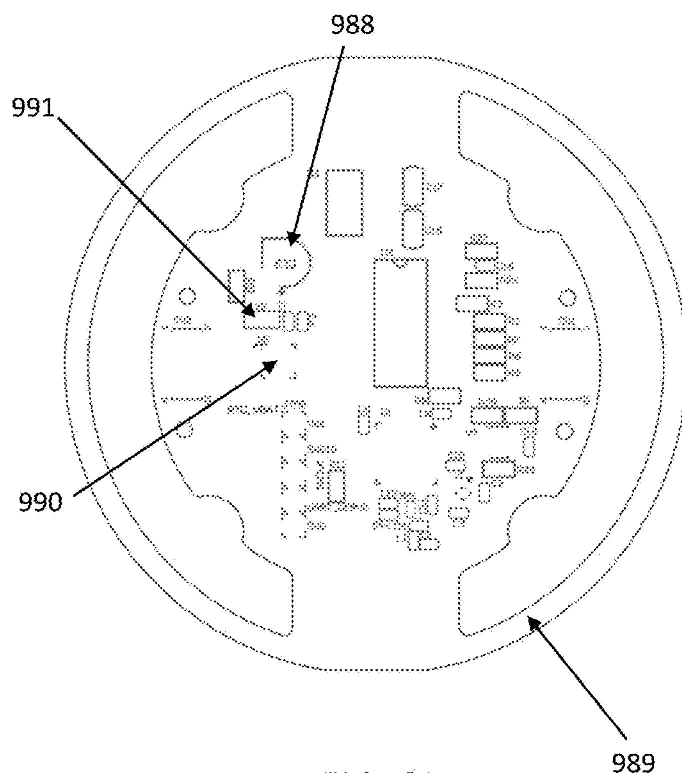
FIGS. 9J-K are bottom views of an indicator printed circuit board in accordance with exemplary embodiments of the present invention.
Figure 9K:
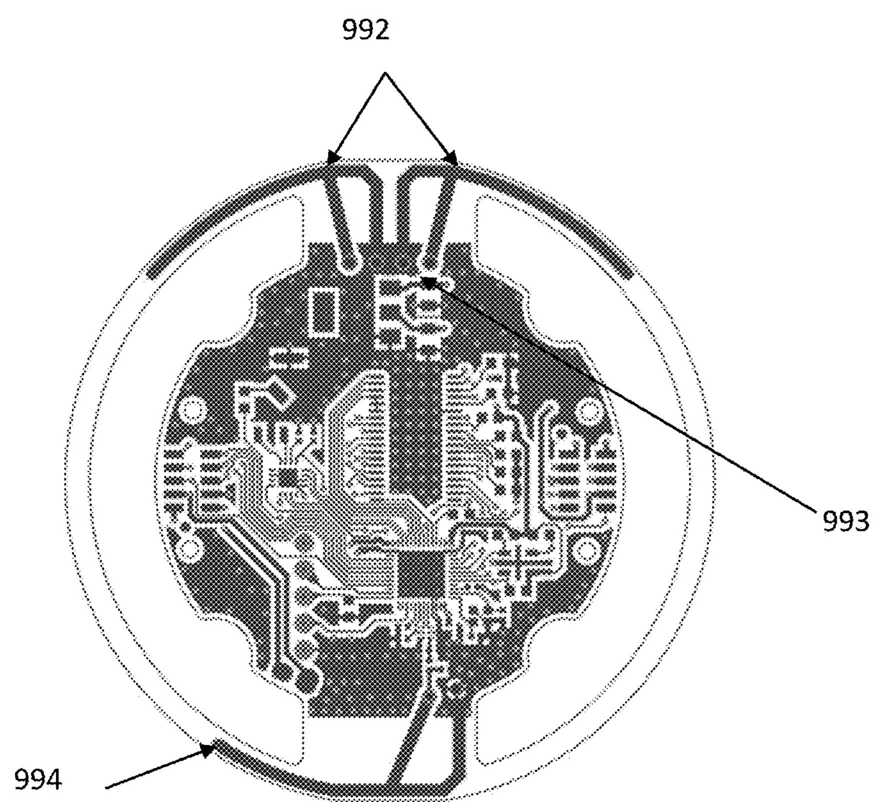

FIGS. 9J-K are bottom views of an indicator printed circuit board in accordance with exemplary embodiments of the present invention. FIG. 9J illustrates a crystal oscillator 991, which may be a quartz crystal or other watch crystal. The crystal oscillator 991 may emit an electrical signal with a precise signal that can be used to track time for one or more components within the networked lighting device. In embodiments, the crystal oscillator 991 may require a persistent electrical connection to track time.

Some existing networked devices typically can be controlled via electronic communications received from control devices, such as a remote control, user device (e.g., running a network control application), and/or server. However, to process such communications and execute responses networked devices must have input power and must be connected, directly or indirectly, to the control device. Accordingly, a secondary light switch (e.g., a software-based switch, such as via a remote control, a web-based application, or an application running on a mobile device) may transmit instructions to switch a device on and/or off, and such instructions may be executed by the device while input power remains flowing. The device can thus remain connected to a data network and/or can receive settings via the network even while the device is not outputting (e.g., light for a lightbulb and/or sound).

Meanwhile, a standard light switch would toggle the flow of power to the networked device, such as by switching the electrical circuit to which the device is connected. Accordingly, when power is shut off and then turned back on a device must re-connect to the device network (e.g., a smart hub, server, and/or other network device). The network can provide the device with the current time. However, connection to the network and receipt of information such as a current time or control instructions entails a delay. Locally stored time-dependent settings cannot be implemented until the current time is received after connection to the network.

However, there is a need to enable networkable devices (e.g., lightbulbs) to implement time-dependent settings without the delay of connecting to the network when used with a standard switch that can cut off power to the devices. To address this technical problem the indicator PCB may comprise a real-time clock 990. The real-time clock 990 can track time for the device. A supercapacitor 988 may provide power or backup power to the real-time clock 990 (e.g., for two or more weeks without input power). In embodiments, an alternate power supply for real-time clock 990 may be used, such as a battery. The real-time clock 990 may thus track time with precision for periods of time (e.g., prolonged periods of time) when a device is not receiving power. When a standard light switch is used to power on one or more networked devices, the devices may use the supercapacitor-powered real-time clock to determine settings based on the current time and execute actions in accordance with those settings. For example, a networked lightbulb may determine what quality of light to display (e.g., particular light temperature and/or brightness) when the light is switched on without having to connect to and communicate with a network (e.g., other devices or a remote server). In embodiments, a networked light switched on in the evening may output a warm yellow glow without delay from the time at which it is switched on. Accordingly the appropriate quality of light may be output immediately in response to a user powering on the light via the standard switch. Such a light may store user-defined time-dependent settings and/or default time-dependent settings in non-transitory computer-readable memory, which settings may persist in memory without power flow. In embodiments, the settings may correspond to time-based adaptive lighting, such as lighting that changes color temperature and/or intensity.

The indicator PCB may further comprise one or more wireless antennas 989. In embodiments, wireless antennas 989 may be trace antennas and/or ceramic antennas. The antennas may be radio antennas, such as Wi-Fi antennas, Bluetooth Low Energy antennas, and/or other Bluetooth antennas, to name a few. In embodiments, the indicator PCB may comprise two Wi-Fi antennas and one BLE antenna. The antennas may be located on wings such as at the perimeter of the indicator PCB. The wings may be located near the outside of the lighting device to improve signal quality for sending and/or receiving data. The antennas may be operably connected to one or more other components within the lighting device, including components such as wireless communication chipsets, which may be located on other PCBs. In embodiments, locating antennas on the indicator PCB may enable the antenna configuration to remain the same across networked product types having different ancillary devices, which require different control components, such as on a command and control PCB.

FIG. 9K further illustrates positions of wireless antennas, e.g., antennas 992 and 994. In embodiments, antennas 992 may comprise two Wi-Fi antennas, and antenna 994 may comprise a BLE antenna. Connector 993 may connect the indicator PCB with a command and control PCB or another PCB or component of the networked device. In embodiments, connector 993 may comprise a connector, wires, and/or pogo pins, to name a few.

The networked device of the present invention may be adapted for use with one or more base devices, such as a desk lamp, a floor lamp, track lighting (e.g., a track lighting gimbal), wall-mounted lighting sockets, ceiling-mounted lighting sockets, outdoor lighting sockets, stadium lighting fixtures, and/or portable lighting bases, to name a few. A portable base may comprise a portable power source, such as a battery, which may be a rechargeable battery, and/or one or more solar panels. The portable power source may be an uninterrupted power supply. For example, a networked device used with a portable power supply can comprise a camp lantern and/or speaker. In embodiments, user devices such as smart phones may stream audio, e.g., music, to such a device. In embodiments, a lamp may comprise a subwoofer, which may be located in the base of the lamp. The lamp may thus participate in a networked device system in accordance with the present invention. Stand-alone subwoofers or other audio components such as speakers, remote controls, audio receiver units, audio streaming devices, to name a few, may also be networked along with the networked devices of the present invention. In embodiments, the networked devices of the present invention may be hermetically sealed. Water resistant networked devices may be specifically designed for outdoor use. Moreover, waterproof networked devices, such as underwater speakers and/or lights may be configured to mate with light and/or speaker connections in pools. An antenna may extend above the surface of the water to receive electromagnetic waves. In embodiments, networked devices may be adapted for use on boats and/or on water floats. For example, a waterproof outdoor lantern and speaker device with a portable power supply may attach to a water float.

In embodiments, the networked devices of the present invention may communicate with other networked devices. Other networked devices can include home automation devices, such as automated blinds (e.g., with an electronic motor controllable via direct communications and/or communications over a data network), tinting windows (e.g., electronically controlled tinting windows), remote controls, dimmer control devices, to name a few.

In embodiments, a lighting device for use with one or more other networked devices may comprise an outer globe comprised of an at least partially transparent rigid material (e.g., clear copolyester, glass, to name a few) and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; and an outer cowling forming the exterior of a base portion of the lighting device.

The lighting device can include a power input connector located at the base of the lighting device and configured to mate with a standard lightbulb socket, as well as a power control printed circuit board (PCB) within the lighting device operatively connected to the power input connector and disposed at least partially within a heat sink configured to dissipate heat. The power control PCB can comprise a power converter configured to convert alternating current to direct current; a voltage regulator configured to output steady direct current power at one or more voltages; an output power connector to output power to one or more other components within the lighting device; and an output current controller configured to control the output of electric current to the one or more other components within the lighting device.

The lighting device may further include a communication and control printed circuit board within the lighting device operatively connected to the power control printed circuit board and comprising a first wireless communications module operatively connected to a first communications antenna; an auxiliary device control unit. The lighting device may comprise an indicator printed circuit board within the lighting device operatively connected to the communication and control printed circuit board and configured to receive power from the power control printed circuit board via the communication and control printed circuit board and comprising a first plurality of LEDs each configured to deliver light to a respective one of the plurality of light pipes and one or more microprocessors operatively connected to first non-transitory computer-readable memory having stored thereon first processing instructions readable by at least one of the one or more microprocessors.

The lighting device may include an auxiliary device mounted within the lighting device closer to the head of the lighting device than the indicator printed circuit board, operatively connected to the communication and control printed circuit board, and configured to receive power from the power control printed circuit board via the communication and control printed circuit board.

The lighting device can further include an LED lighting printed circuit board mounted within the lighting device closer to the head of the lighting device than the indicator printed circuit board and having an aperture through which the auxiliary device extends, the LED lighting printed circuit board operatively connected to the indicator printed circuit board, operatively connected via the indicator printed circuit board to the communication and control printed circuit board, configured to receive power from the power control printed circuit board via both the indicator printed circuit board and the communication and control printed circuit board, and comprising a second plurality of LEDs configured to deliver light through the diffuser.

In embodiments, the auxiliary device control unit may comprise at least one of the one or more microprocessors configured to control the auxiliary device. In embodiments, the auxiliary device may comprise any of a speaker, a battery back-up power supply for the lighting device, a camera, a microphone, an air quality sensor, a motion sensor, an occupancy sensor, a Wi-Fi repeater, or an infrared blaster.

In embodiments, the first plurality of LEDs of the indicator printed circuit board may comprise RGB LEDs.

In embodiments, the first wireless communications module may be configured to communicate with one or more of the one or more other networked devices using a Wi-Fi protocol.

In embodiments, the indicator printed circuit board may comprise a second wireless communications module, which may be configured to communicate with one or more of the one or more other networked devices using a mesh network communications protocol (e.g., a broadcast/scan mesh network protocol). In embodiments, the second wireless communications module may communicate via Bluetooth or Bluetooth Low Energy communications protocols.

In embodiments, at least one of the one or more microprocessors may be located on the communications and control printed circuit board. It may be configured to control the auxiliary device. In embodiments, at least one of the one or more microprocessors is located on the indicator printed circuit board. It may be configured to control lighting and/or certain communications, such as mesh network communications.

In embodiments, the communication and control printed circuit board, the indicator printed circuit board, and the LED lighting printed circuit board comprise a stacked circuit board configuration within the lighting device. Different auxiliary devices may be manufactured by producing a device with a different auxiliary device, a respective communications and control PCB for the auxiliary device, and/or a different globe. In embodiments, power and/or internal circuitry communications signals may flow through the device from one PCB to the next.

In embodiments, the lighting device may comprise direct connections between components instead of or in addition to signals flowing through the PCB stack. For example, a wired connection such as a ribbon cable may operatively connect the auxiliary device with the communications and control PCB.

In other embodiments, components of the lighting device may not be mounted on printed circuit boards.

In embodiments, the other networked devices with which the lighting device may communicate can include any of a second lighting device, computer, server, mobile phone, user electronic device, remote control, dimmer control device, networkable alarm clock, environmental sensor, sub-woofer, sub-woofer within a lamp, speaker, audio source device, or television.

A second lighting device may include a second outer globe comprised of an at least partially transparent rigid material and forming the exterior of a head portion of the lighting device; a second diffuser within the second outer globe configured to receive light from one or more light sources and emit diffused light; a plurality of second light pipes configured to transport light from one or more LEDs to an inner surface of the second diffuser, each second light pipe a solid conduit comprised of transparent material; a second outer cowling forming the exterior of a base portion of the second lighting device; a second power input connector located at the base of the second lighting device and configured to mate with a standard lightbulb socket; and a second power control printed circuit board within the second lighting device operatively connected to the second power input connector and disposed at least partially within a second heat sink configured to dissipate heat. The second power control PCB may comprise a second power converter configured to convert alternating current to direct current; a second voltage regulator configured to output steady direct current power at one or more voltages; a second output power connector to output power to one or more other components within the second lighting device; and a second output current controller configured to control the output of electric current to the one or more other components within the second lighting device.

The second lighting device can also include a second indicator printed circuit board within the second lighting device operatively connected to the second communication and control printed circuit board and configured to receive power from the second power control printed circuit board via the second communication and control printed circuit board and comprising a third plurality of LEDs each configured to deliver light to a respective one of the plurality of second light pipes and a second wireless communications module.

The second lighting device may include one or more second microprocessors operatively connected to second non-transitory computer-readable memory having stored thereon second processing instructions readable by at least one of the one or more second microprocessors and may include a second LED lighting printed circuit board mounted within the second lighting device closer to the head of the second lighting device than the second indicator printed circuit board, the second LED lighting printed circuit board operatively connected to the second indicator printed circuit board, configured to receive power from the second power control printed circuit board via at least the second indicator printed circuit board, and comprising a fourth plurality of LEDs configured to deliver light through the second diffuser.

In embodiments, the first lighting device may be configured to communicate with the second lighting device via a direct wireless connection. In embodiments, the first lighting device may be configured to communicate with the second lighting device via a local data network, which may be a mesh network. The first lighting device may communicate with the other networked devices using such communications protocols. In embodiments, the lighting device may be configured to communicate with a server via at least a Wi-Fi communications network.

In embodiments, a lighting device may be produced with additional PCBs, different PCBs, fewer PCBs, and/or no PCBs. Accordingly, a lighting device for use with one or more other networked devices can comprise an outer globe comprised of an at least partially transparent rigid material (e.g., glass, plastic, and/or copolyester) and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and power control components comprising a power converter configured to convert alternating current to direct current, a voltage regulator configured to output steady direct current power at one or more voltages, an output power connector to output power to one or more other components within the lighting device, and an output current controller configured to control the output of electric current to the one or more other components within the lighting device.

The lighting device may further comprise communication and control components comprising one or more microprocessors operatively connected to non-transitory computer readable memory having stored thereon processing instructions readable by at least one of the first set of one or more microprocessors and a first wireless communications module operatively connected to a first communications antenna and to at least one of the first set of one or more microprocessors.

The lighting device can include an auxiliary device, such as a speaker, camera, Wi-Fi repeater, other communications repeater, and/or environmental sensor, to name a few. The lighting device may include a first plurality of LEDs each configured to deliver light to a respective one of the plurality of light pipes and/or a second plurality of LEDs configured to deliver light through the diffuser. The second plurality of LEDs may provide a primary light source, while the first plurality of LEDs may provide a night light, mood light, or indicator light, to name a few.

In embodiments, a lighting device for use with one or more other networked devices may include a speaker, which may play streamed audio. Accordingly, the lighting device may comprise an outer globe comprised of an at least partially transparent rigid material and forming the exterior of a head portion of the lighting device; a diffuser within the outer globe configured to receive light from one or more light sources and emit diffused light; a plurality of light pipes configured to transport light from one or more LEDs to an inner surface of the diffuser, each light pipe a solid conduit comprised of transparent material; an outer cowling forming the exterior of a base portion of the lighting device; a power input connector located at the base of the lighting device and configured to mate with a standard lightbulb socket; and a power control printed circuit board within the lighting device operatively connected to the power input connector and disposed at least partially within a heat sink configured to dissipate heat, the power control printed circuit board comprising a power converter configured to convert alternating current to direct current, a voltage regulator configured to output steady direct current power at one or more voltages, an output power connector to output power to one or more other components within the lighting device, and an output current controller configured to control the output of electric current to the one or more other components within the lighting device.

The lighting device may further comprise a communication and control printed circuit board within the lighting device operatively connected to the power control printed circuit board and comprising a first wireless communications module operatively connected to a first communications antenna and a speaker control unit. In embodiments, the first wireless communications module may be located on a different PCB or apart from a PCB.

The lighting device may comprise an indicator printed circuit board within the lighting device operatively connected to the communication and control printed circuit board and configured to receive power from the power control printed circuit board via the communication and control printed circuit board and comprising a first plurality of LEDs each configured to deliver light to a respective one of the plurality of light pipes.

The lighting device may comprise one or more microprocessors operatively connected to first non-transitory computer-readable memory having stored thereon first processing instructions readable by at least one of the one or more microprocessors. In embodiments, the one or more microprocessors may be located on one or more PCBs, such as the indicator PCB and/or the communications and control PCB.

The lighting device may comprise a speaker comprising a speaker driver, the speaker mounted within the lighting device closer to the head of the lighting device than the indicator printed circuit board, operatively connected to the communication and control printed circuit board, and configured to receive power from the power control printed circuit board via the communication and control printed circuit board.

The lighting device may comprise an LED lighting printed circuit board mounted within the lighting device closer to the head of the lighting device than the indicator printed circuit board and having an aperture through which the speaker extends, the LED lighting printed circuit board operatively connected to the indicator printed circuit board, operatively connected via the indicator printed circuit board to the communication and control printed circuit board, configured to receive power from the power control printed circuit board via both the indicator printed circuit board and the communication and control printed circuit board, and comprising a second plurality of LEDs configured to deliver light through the diffuser. In embodiments, the light from the LEDs mounted on the LED lighting PCB may provide a primary light source.

In embodiments, the speaker control unit may comprise at least one of the one or more microprocessors, configured to control the speaker.

Figure 10:
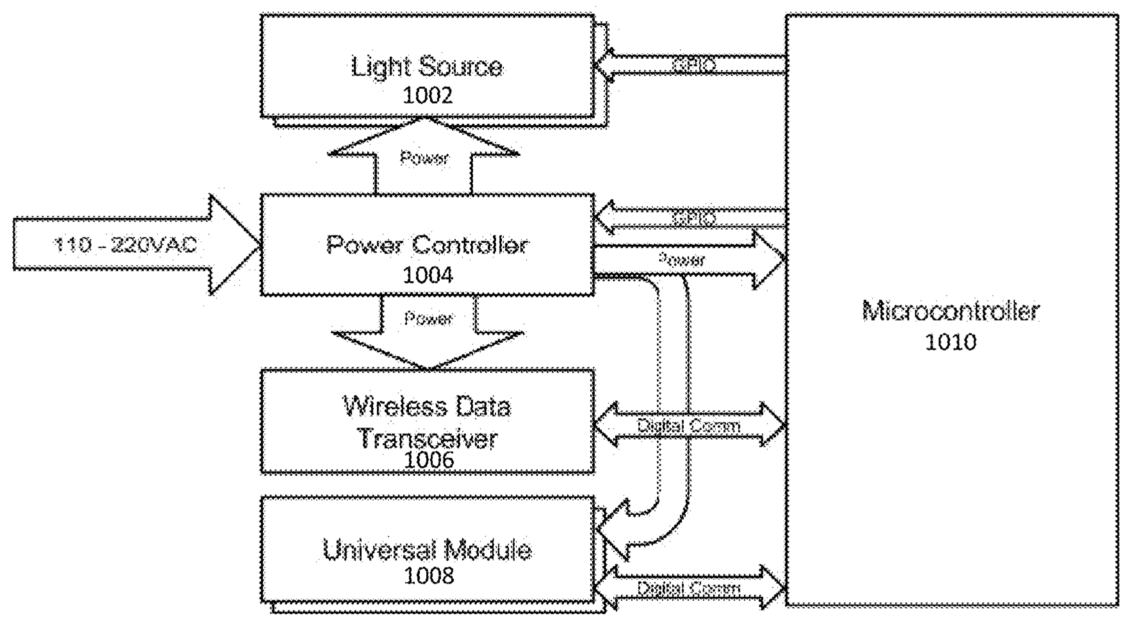
FIG. 10 is a schematic diagram of a networked device architecture in accordance with exemplary embodiments of the present invention.

FIG. 10 is a schematic diagram of a networked device architecture in accordance with exemplary embodiments of the present invention. A power controller 1004 may receive input power at 110-220 volts of alternating current. The power controller 1004 may transform the power (e.g., to direct current, to a different voltage, and/or to a different current) and/or output the transformed power to one or more components in the base and/or head units, such as one or more light sources 1002, a microcontroller 1010 (e.g., located in the base unit), one or more core devices (e.g., universal modules 1008, such as a speaker, sensor, and/or camera), communications circuitry (e.g., one or more wireless data transceivers 1006), and/or an auxiliary light source. A microcontroller 1010 may control the power controller and/or a light source 1002 (e.g., a main light source, such as a plurality of LEDs, and/or an auxiliary or indicator light source) via general purpose input/output (GPIO) connections. A microcontroller 1010 may communicate (e.g., bidirectional digital communication) with wireless data transceivers 1006 and/or universal modules 1008 for core devices.

Figure 11:
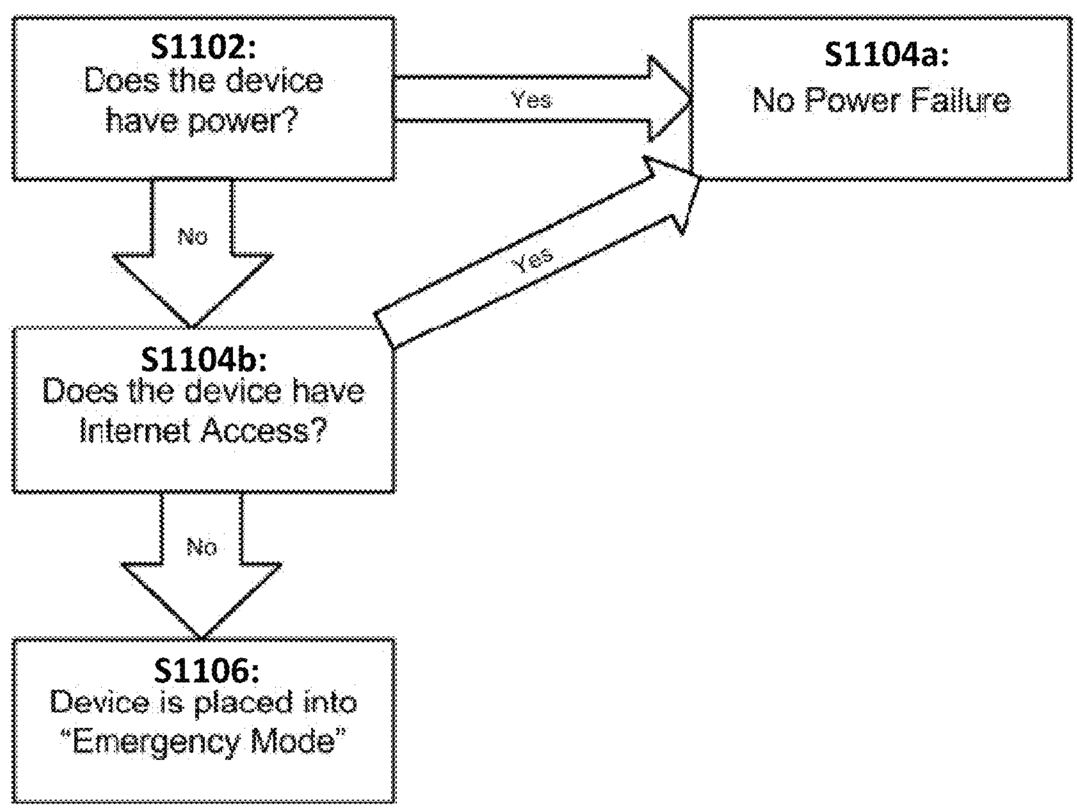
FIG. 11 is a flow chart of a process for power failure detection in accordance with exemplary embodiments of the present invention.

FIG. 11 is a flow chart of an exemplary process for power failure detection. The process may be performed by a processor (e.g., a microcontroller) based on programmed firmware instructions stored in memory. In a step S1102 the processor may determine whether the device has power. The processor may periodically test for power and/or may trigger a no power indicator when power is not present. In a step S1104*a*, if the device has power, the processor may determine that there is no current power failure. Otherwise, if the device does not have power, the processor may test whether the device has access to a data network, such as the Internet. If the device has access to a data network, the process may return to step S1104*a* where it determines that there is no power failure. If instead the device does not have access to a data network, in a step S1106 the device may be place into a power failure mode, which may be an emergency mode, which may utilize a backup battery. In embodiments, a power failure mode may utilize auxiliary lighting or may activate other lighting. In embodiments where the backup battery is located in the head unit, power may be transmitted from the head unit to the base unit. Control inputs may be received (e.g., via Bluetooth) to turn off or alter the power failure mode of operation.

Figure 12:
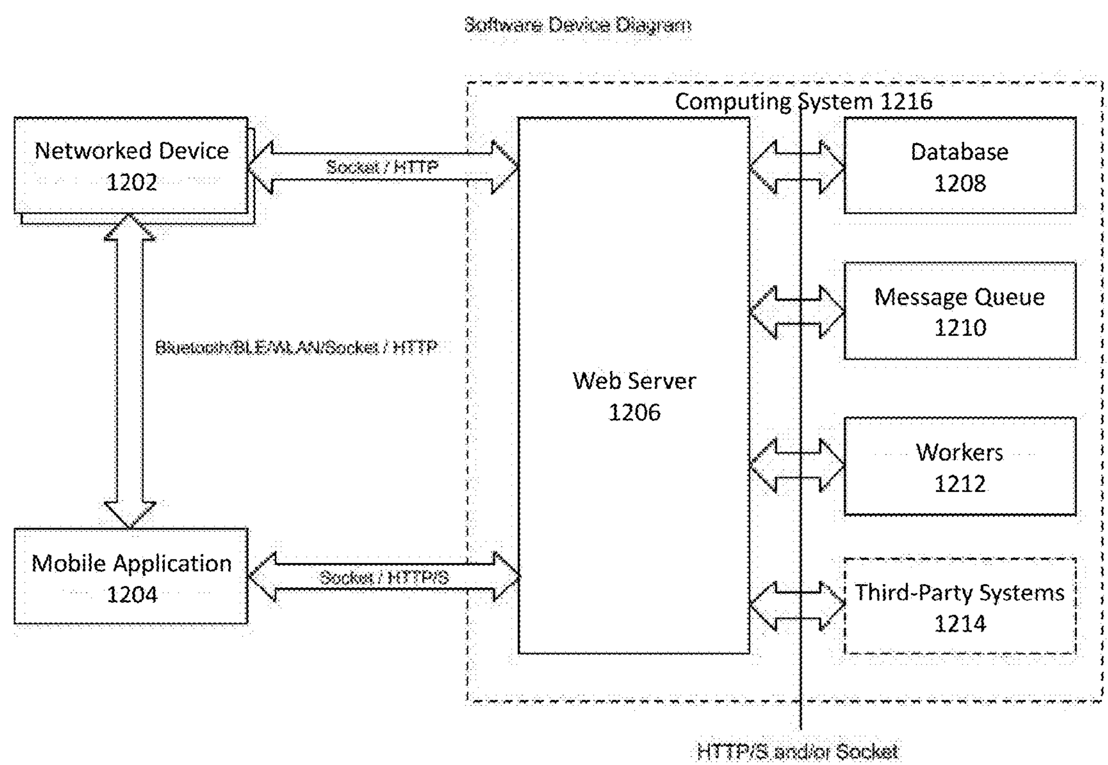
FIG. 12 is a schematic diagram of software architecture for a networked device system in accordance with exemplary embodiments of the present invention.

FIG. 12 is a schematic diagram of software architecture for a networked device system in accordance with exemplary embodiments of the present invention. One or more networked devices 1202 may communicate with a mobile application 1204 running on a user electronic device such as a smart phone. The mobile application 1204 and the networked device 1202 may each communicate with a web server 1206 via socket/HTTP connections. The web server may communicate with one or more databases 1208, message queues 1210, workers 1212 (which may be cron job processes that run periodically, e.g., on a schedule), and/or third-party systems 1214. The web server 1206, databases 1208, message queues 1210, workers 1212, and/or third-party systems 1214 may be located in a cloud computing setup 1216.

FIG. 13 is a schematic diagram of a user device 114. A user device may be an individual computer, networked computer, desktop computer, portable computer (e.g., laptop, notebook, etc.), tablet computer, mobile phone, smart phone, media player, PDA, camera, video camera, audio recording device, television, and/or video game system, to name a few. A user device 114 can include a display device 1302, such as a monitor, screen, and/or projector, and/or input devices 1304, which may be keyboards, accelerometers (e.g., for input via movement of the user device 114 or by knocking on the user device 114), cameras, touchscreens, and/or microphones with accompanying software (e.g., speech-to-text software). A user device 114 can further comprise one or more processor 1308.

Still referring to FIG. 13, a user device 114 can comprise data stored in one or more database on non-transitory computer-readable memory. User preference data 1320 can include user account information (e.g., login credentials and/or profile information) and/or user settings (e.g., settings for various networked devices), to name a few. A user device 114 can store network topology data 1322. Network topology data 1322 may indicate the devices present in a network, attributes of those devices (e.g., type of device, capability of each device, changeable settings of each device, to name a few), and/or locations of each device.

A user device 114 can include software modules running on the one or more processors, such as a communications module 1330 for handling communications, a user authentication module 1332 for verifying user credentials, a network topology module 1334 for ascertaining and/or mapping a network topology, a device acquisition module 1336 for adding devices to the networked system, a device grouping module 1338 for associating devices into groups as described herein, a device control module 1340 for controlling the operations of each device, a timer module 1342 for controlling devices based upon a time or time elapsed, an environment module 1344 for ascertaining environmental conditions (e.g., time of sunset), a location module 1346 for tracking a user's location (e.g., with respect to devices in a networked system), and/or a scenes module 1348 for managing scenes (e.g., scenarios such as watching television, eating dinner, waking up), to name a few. In embodiments, parental controls may be implemented, e.g., via a parental control module. Parental controls can include preventing access to one or more devices by one or more other users and/or setting values for master settings (e.g., a time to turn off lights). In embodiments, the same input can cause different control signals based on location (e.g., in kitchen versus in bedroom) and/or time of day.

Figure 14:
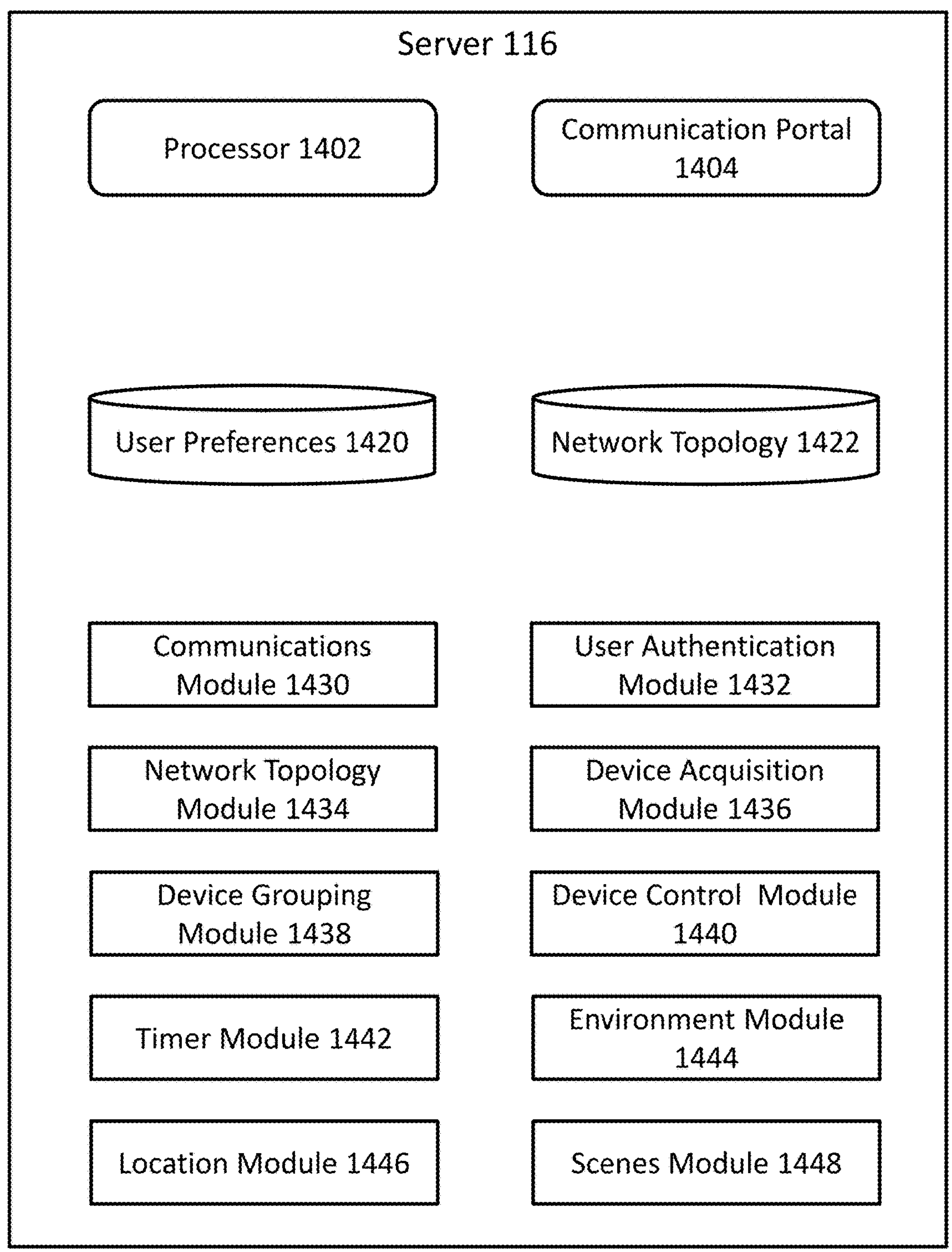
FIG. 14 is a schematic diagram of a server in accordance with exemplary embodiments of the present invention.

FIG. 14 is a schematic diagram of a server 116. A server may comprise a computer system of one or more computers. A server 116 can comprise one or more processors 1402 and communication portals 1404. The server may store user preference data 1420 and/or network topology 1422, as such data is described with respect to FIG. 13. A server can include one or more modules such as a communications module 1430, user authentication module 1432, network topology module 1434, device acquisition module 1436, device grouping module 1438, device control module 1440, timer module 1442, environment module 1444, location module 1446, and/or scenes module 1448, as such modules are described herein with respect to FIG. 13. Accordingly the functionality provided by those modules may be accessed and used from any location by accessing the server 116, e.g., by logging in via a mobile application or website from a location that is remote with respect to the networked devices. For example, a user may access the server by logging into a website from a computer at the user's office in order to turn the lights off (utilizing the device control module 1440) at the user's home.

Figure 15A:
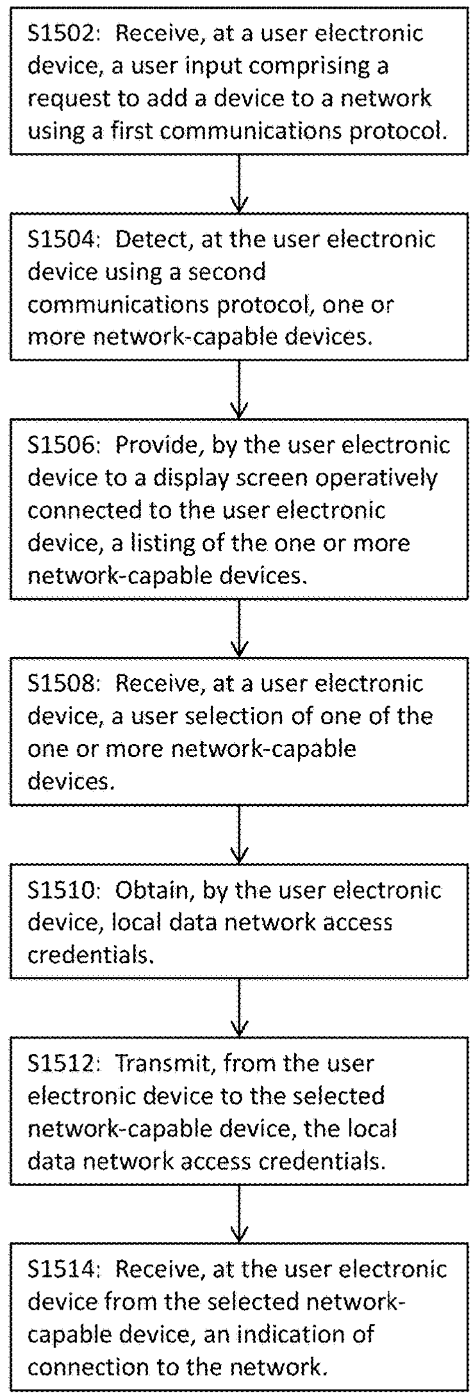
FIGS. 15A-B are flow charts of processes for device acquisition in accordance with exemplary embodiments of the present invention.

FIG. 15A is a flow chart of a process for device acquisition. A user may run a mobile application on a user electronic device (e.g., an app on a smart phone). The user may then input and/or select a device identifier (e.g., device name, device icon, device number, to name a few) corresponding to an available but non-networked networkable device (e.g., a network-capable device that is not yet connected to a network). In embodiments, a list of available, non-networked devices may be sorted by proximity to the user device running the mobile application. A user may then input a network identifier (e.g., a router identifier, such as an SSID, and/or Wi-Fi network name, to name a few) and a corresponding password where a password exists to access the network. The mobile application may relay the network identifier and/or network password to the selected device, and the selected device may connect to the network.

In a step S1502, a user electronic device may receive a user input comprising a request to add a device to a network, which network uses a first communications protocol (e.g., Wi-Fi-). In a step S1504, the user electronic device may detect, using a second communications protocol (e.g., Bluetooth), one or more network-capable devices. In a step S1506, the user electronic device may provide to a display screen operatively connected to (and/or integrated to) the user electronic device a listing of the one or more network-capable devices. The listing may be based upon proximity and/or signal strength using the second communications protocol. The listing may include devices already connected to the network. In a step S1508, the user electronic device may receive a user selection of one or the one or more network-capable devices. In embodiments, a selection of more than one device may be received. In embodiments, the user electronic device may receive a user command to add the selected device to a particular group, which may be an existing group of networked devices or a new group. In a step S1510, the user electronic device may obtain local data network access credentials, which may be stored in non-transitory computer-readable memory operatively connected to the first device or which may be input by a user. Local data network access credentials can include an SSID, which may be a router ID, and/or a password. In a step S1512, the user electronic device may transmit to the selected network-capable device, using the second communications protocol, the local data network access credentials. In a step S1514, the user electronic device may receive from the selected network-capable device an indication of its connection to the network.

Figure 15B:
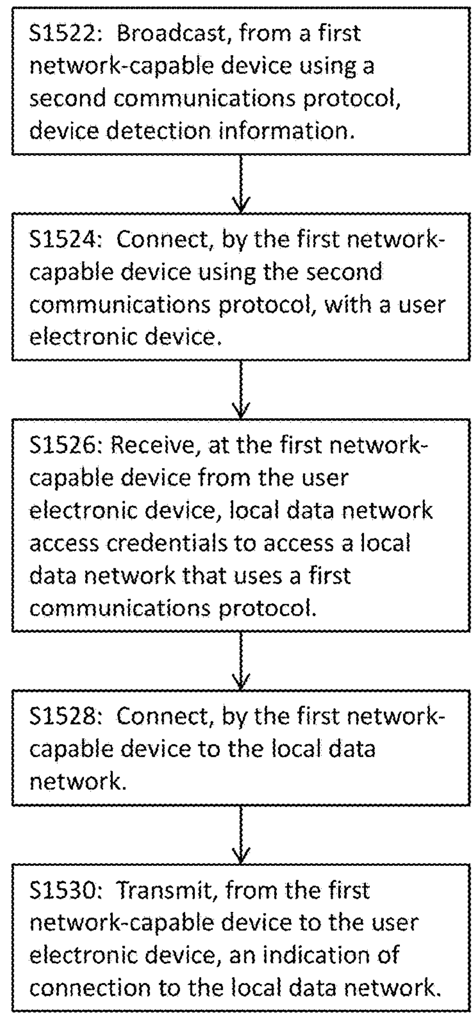

FIG. 15B is a flow chart of a process for device acquisition performed by a networkable device. A non-networked networkable device may advertise its services (e.g., advertise its existence) via Bluetooth. The networkable device may establish a connection with a user electronic device (e.g., a user electronic device configured to be paired, such as a smart phone). The networkable device may receive a network identifier and/or corresponding password characteristics from the user electronic device. The networkable device may then connect to a network corresponding to the received network identifier. Connecting to the network may entail using the received password, establishing a Wi-Fi connection, and/or verifying the Wi-Fi connection. In embodiments, the now networked device may generate, obtain machine-readable instructions for, and/or provide a notification of device connection to the user electronic device.

In a step S1522, a first network-capable device may broadcast using a second communications protocol (e.g., Bluetooth) device detection information. In a step S1524, the first network-capable device may connect, using the second communications protocol, with a user electronic device, such as a smart phone, computer, tablet computer, and/or remote control, to name a few. In a step S1526, the first network-capable device may receive from the user electronic device local data network access credentials to access a location data network that uses a first communications protocol (e.g., Wi-Fi). In a step S1528, the first network-capable device may connect to the local data network using the access credentials. In a step S1530, the first network-capable device may transmit to the user electronic device an indication of its connection to the local data network.

FIGS. 16A-E are exemplary screen shots of an application for networked device system administration. Such an application may be a downloadable application, e.g., downloaded on a user device such as a smart phone, and running on one or more processors. In embodiments, data input by a user via the mobile application may be relayed to one or more servers. The exemplary application interfaces described herein may be generated and/or rendered on display screens according to machine-readable instructions, which may be stored in local device memory or remote memory and/or which may be transmitted to a user device. Such machine-readable instructions can comprise content data (e.g., text and images such as device names, icons, or current settings), layout data (e.g., size and position data), and/or other presentation data (e.g., colors), to name a few. Transmitting instructions to a device or an application running on a device may trigger such an application to activate and/or render the GUI according to the instructions. In embodiments, playing audio via an associated audio application (e.g., a music player application connected via software to a device network application) may activate a device network application to enable control of devices such as networked speakers (e.g., networked lighting devices comprising speakers). In embodiments, the GUIs illustrated and described herein may be indicative of features available through a networked device control or management application (e.g., a downloadable application or a web-based application), although different styling and organization of features among the GUIs is contemplated.

FIG. 16A shows an exemplary login interface. A user may enter user credentials, such as a username (e.g., an email address, actual name, and/or user-created name) and/or corresponding password. In embodiments, fingerprints scanned through a fingerprint reader, retina scans, and/or voice recognition may be used to authenticate a user. The mobile application may authenticate a user by verifying the received user credentials. In embodiments, the mobile application may transmit the user credentials to a server for verification and/or for connecting to the server.

FIG. 16B shows an exemplary network topology interface. Such an interface may list and/or identify various network topology data, which can correspond to networked devices (e.g., such network topology data can comprise electronic identifiers and/or device names), groups of devices, locations of devices, and/or regions in a networked system (e.g., kitchen, master bedroom). The interface may also identify new devices, which may be devices recently added to the network and/or devices whose settings (e.g., timer settings) have not yet been set. In embodiments, the interface may identify available devices (e.g., network capable devices that are within range of the network) that are not yet connected to the network. The network topology data (e.g., electronic device identifiers, device setting data, device location data, may be received at the mobile application from a server with access to network topology data stored in one or more databases. In embodiments, the network topology data may be stored locally on the user electronic device. The interface may allow a user to select a device to view and/or edit device information (e.g., device settings, device groups, device region information, to name a few).

FIG. 16C shows an exemplary interface for connecting a new device, such as a light bulb. The interface may provide data input and/or selection fields whereby a user may input a device name, select and/or create one or more groups to associate with the device, and/or input and/or select a network identifier (e.g., a network name). In embodiments, the user may be required to input a device identifier, which may be a unique code assigned to the device, e.g., at the time of manufacturing.

FIG. 16D shows an exemplary interface for creating a device group. In embodiments, the interface may provide a data input field for a user to input a group name. The interface may also provide a device selection option so that a user may select one or more device to be included in the group. For example, a user may associate a plurality of speaker devices with a "TV speaker" group or may associate a plurality of lights located at a kitchen island with a "Kitchen Island" group. A user may then control the group of devices collectively through a single control input. For example, a user may turn off all devices (e.g., all lights) associated with an exemplary Kitchen Island group without inputting separate control commands to turn off each device. A user may also dim the group of lights, which may dim each light by the same amount.

Figure 16E:
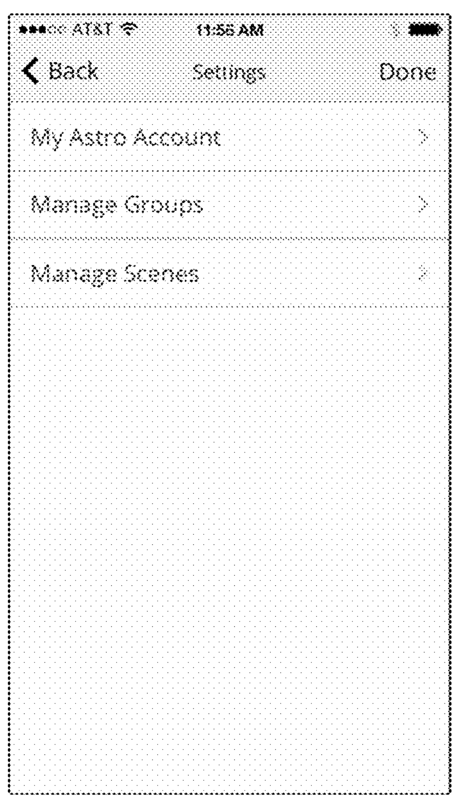

FIG. 16E shows a settings interface, which may allow a user to access and/or manage account settings (e.g., user credentials, billing information), groups settings (e.g., create groups, delete groups, combine groups, add devices to groups, remove devices to groups, rename groups, to name a few), and/or scenes settings (e.g., create new scenes, delete scenes, edit scenes, to name a few). Scenes may comprises device settings for particular scenarios, such as watching TV, eating dinner, going to sleep. A user may select a scene to execute the corresponding settings (e.g., values for each device load or group of device loads). Devices may be added to a scene, removed from a scene, and/or values of the load (e.g., power level, light brightness, speaker volume, to name a few) of each device may be adjusted.

FIGS. 17A-E are exemplary screen shots of an application for networked device control settings. As described with respect to FIGS. 16A-E, such settings may be administered using a server and/or a local user electronic device.

FIG. 17A shows an interface comprising control options for a particular networked device, which in this exemplary embodiment is named “Bedside Lamp” and is located in the “master bedroom”. The interface may show a current value of the device load, e.g., 72% (which may correspond to 72% of power and/or 72% brightness of the light). The interface may present one or more settings options for the device, such as an alarm clock, proximity lighting, transitional lighting, and/or environmental lighting, as described herein.

FIG. 17B shows an alarm clock interface for a networked device. One or more alarm times may be added, which may correspond to times at which a device will be activated and/or deactivated and/or when a load value will be changed (e.g., power increased). Alarms may be recurring (e.g., each day, each week), and/or alarms may be named (e.g., “Weekdays”, “Weekends”). Alarms may be toggled on and/or off.

FIG. 17C shows an exemplary proximity lighting interface. Proximity lighting may utilize geofencing features, which may allow location-based boundaries to be defined (e.g., associate a location with a user's home). Proximity lighting features may use one or more devices and/or methods for determining location, such as a GPS device (e.g., within a mobile phone), signal triangulation (e.g., among networked devices), and/or signal strength determinations. One or more rules may be set by a user based upon proximity settings, from which the mobile application and/or a server may generate electronic proximity rules. For example, when a user arrives at a location (e.g., a home location) one or more devices may be activated, and/or when a user departs a location one or more devices may be deactivated. Accordingly, when a user arrives home certain lights may be activated. Networked devices may be deactivated (e.g., powered off) when a user departs the home location.

FIG. 17D shows an exemplary transitional lighting interface. One or more device load settings may be changed based upon identified transitional points in time. Transitional times, such as sunset, may be received from a server or other computer system. Other transitional times may be set by a user, such as a bedtime, a “kids bedtime”, and/or a Sabbath time (e.g., a period of time during which devices must be activated or deactivated without a user's direct control), to name a few. At such transitional times, load values may be changed to turn a device off, on, and/or adjust its load (e.g., a low-power nightlight setting). In other embodiments, the type of load or an output quality of the device may be adjusted (e.g., white light in the morning, such as by using a core lighting device, and yellow light at night, such as by using an auxiliary light).

Figure 17E:
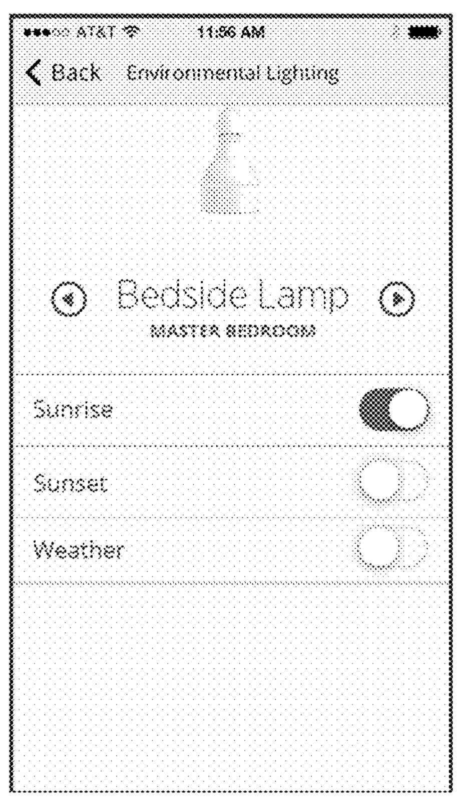

FIG. 17E shows an exemplary environmental lighting interface. Device loads may be adjusted based upon one or more environmental situations, such as sunrise, sunset, and/or weather (e.g., turn lights on during a day when it is raining). Such environmental situations may be input by the user, detected by sensor devices (which may be a part of a given networked device, attached to networked device, and/or a separate networked device), and/or received from an external source (e.g., a server or computer system via the Internet).

Figure 20A:
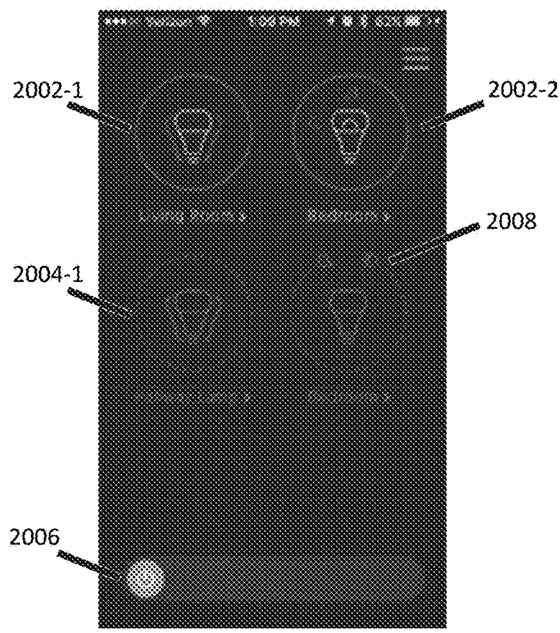
FIGS. 20A-F are screen shots of exemplary graphical user interfaces for a networked devices application dashboard in accordance with exemplary embodiments of the present invention.

FIGS. 20A-F are screen shots of exemplary graphical user interfaces for a networked devices application dashboard in accordance with exemplary embodiments of the present invention. FIG. 20A shows a main dashboard interface, which can show networked devices 2004 (e.g., a hallway lamp 2004-1) or groups 2002 of networked devices (e.g., a living room group 2002-1 or bedroom group 2002-2). A power graphical element 2006 (e.g., button, slider, switch) may be used to power all devices or groups of devices on or off. In embodiments, the GUI may indicate which devices or groups of devices are powered on or off. For example, a solid circle around a device or group may indicate that power is on (such as illustrated for device 2002-1), while a dashed or faded circle or a drawing of an unplugged plug and socket 2008 (e.g., as part of the boundary circle) may indicate power is off. Additional symbols may indicate a current mode, such as a sleep mode (e.g., a moon symbol) or a mode for playing audio (e.g., a symbol showing musical notes or audio waves). A device 2004 or device group 2002 may be selected to toggle power on or off for that device 2004 or group 2002. The device 2004 or device group 2002 may also be selected to view (e.g., navigate to) detailed information for the device 2004 or group 2002.

Figure 20B:
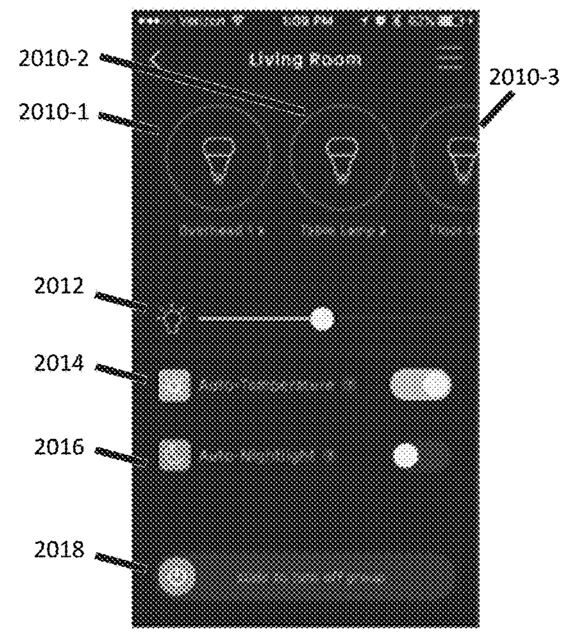

FIG. 20B shows a group detail GUI for an exemplary living room group of networked devices. The GUI illustrates the devices present in the group (e.g., 2010-1 Overhead 1, 2010-2 Table Lamp, 2010-3 Floor Lamp). Device and/or group names may be set by the user. Device or group icons may also be set (e.g., lightbulb, lamp, speaker, and/or a lightbulb with audio waves to indicate a lightbulb with an integrated speaker, to name a few). The group detail GUI may enable a user to control all devices in the group together, such as brightness for lights (e.g., via a slider graphical element 2012 or other user input graphical element) or audio volume for speakers, as well as powering all devices in the group on or off (e.g., via a group power control graphical element 2018). The group detail GUI may enable a user to select a particular device to view and/or manage settings or information for the particular device.

The group detail GUI can include additional settings, such as an toggling an auto-temperature feature 2014 on or off or toggling an auto nightlight feature 2016 on or off. The auto-temperature feature may adjust light color or temperature according to time of day (e.g., bluish-white in the morning, warm light in the evening, to name a few). Such color adjustment may vary according to season or geographical location. Accordingly, an algorithm running on a server in communication with networked devices may determine light color and time correlations and transmit such machine-readable instructions for such settings to be stored by and/or executed by one or more networked lighting devices. A networked lighting device may use a real-time clock to track time even when powered off so that the lightbulb can output the appropriate color light based upon user settings and/or time of day. An auto nightlight feature may control light brightness according to time of day or ambient light, such as by turning lights on in the evening, dimming lights later at night, and/or activating a low level nightlight mode later at night, to name a few. The networked lighting device may adjust light brightness based at least in part upon user settings, time of day, and/or data from an ambient light sensor.

Figure 20C:
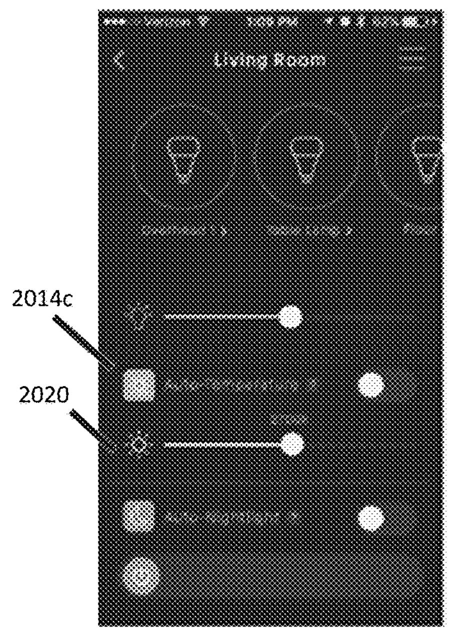

FIG. 20C illustrates an exemplary group detail GUI where the auto-temperature setting 2014*c* is turned off. The GUI can include a manual temperature setting 2020 that enables the user to set a specific color temperature (e.g., 2700 k) for all lighting devices in the group.

Figure 20D:
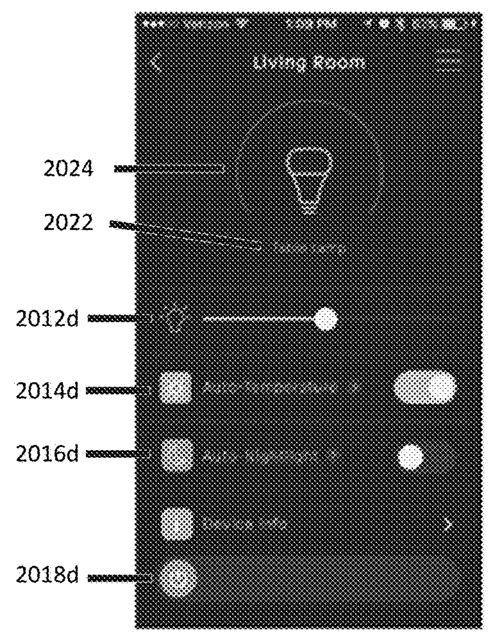

FIG. 20D shows an exemplary device detail GUI. Similar to features of a group detail GUI, the device detail GUI may indicate a device name 2022, icon 2024, and/or description, as well as a device power on/off setting 2018*d*. A power range or output range setting 2012*d* may control brightness for lights and/or volume for speakers. The device detail GUI can also include the temperature settings 2014*d* (e.g., auto or manual settings) and/or nightlight settings 2016*d*. The device detail GUI may show additional device information or include a link to such information.

Figure 20E:
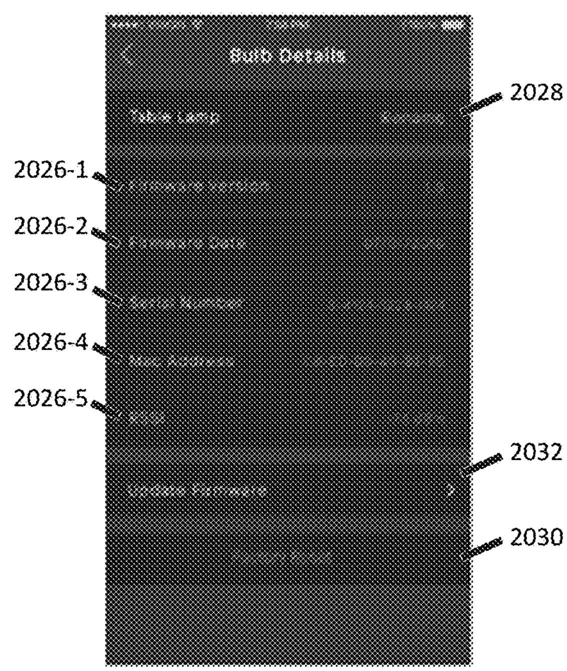

FIG. 20E is an exemplary device information GUI, which can display device information such as a name and/or technical details 2026 (e.g., firmware version 2026-1, firmware date 2026-2, device serial number 2026-3, Mac address 2026-4, and/or received signal strength indicator (RSSI) 2026-5, to name a few). The device information GUI may enable a user to rename a device (e.g., via a rename option 2028), reset settings to default settings (e.g., factory reset 2030), and/or update firmware 2032.

Figure 20F:
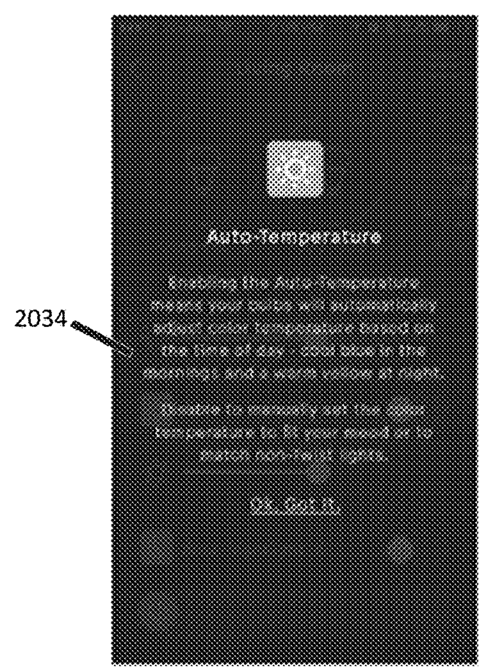

FIG. 20F is an exemplary auto-temperature explanation GUI, which can provide the user with information 2034 regarding the auto-temperature feature. In embodiments, other instructional or informational content may be provided to the user via various GUIs, tool tips, and/or notification windows.

FIGS. 21A-F are screen shots of exemplary graphical user interfaces for networked devices application menus in accordance with exemplary embodiments of the present invention.

Figure 21A:
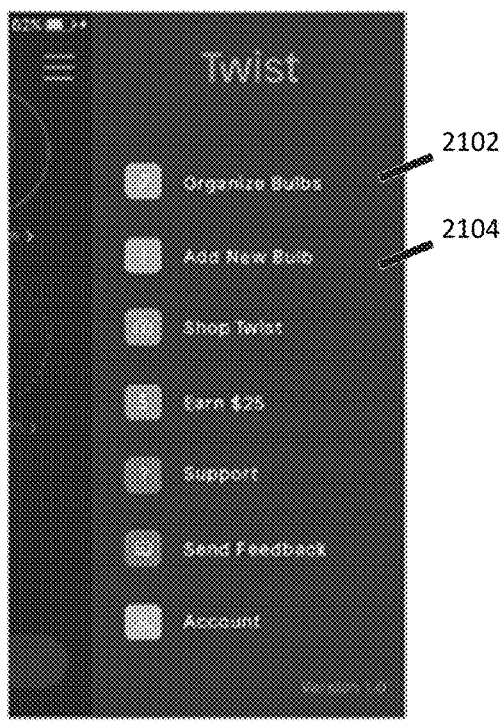
FIGS. 21A-F are screen shots of exemplary graphical user interfaces for networked devices application menus in accordance with exemplary embodiments of the present invention.

FIG. 21A illustrates an exemplary settings menu GUI. The settings can include options to organize devices (e.g., lightbulbs) by associating them with one or more device groups or rooms. A user may select an organize device graphical option 2102 to navigate to a device organization GUI or otherwise access device organization settings. The settings menu can also enable addition of new devices, e.g., via an add device graphical option 2104.

Figure 21B:
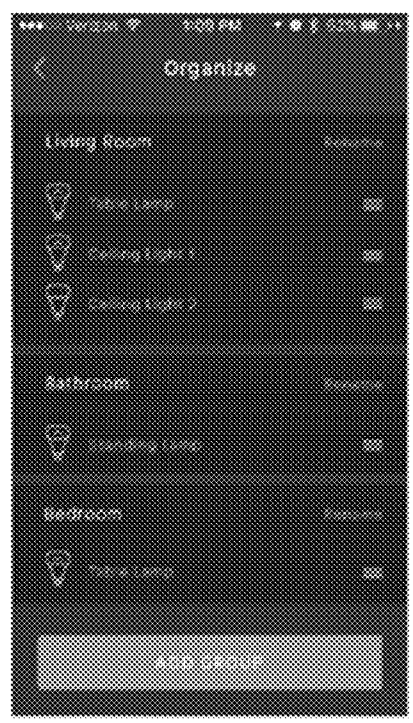

FIG. 21B shows an exemplary device organization GUI. The GUI may allow a user to create, edit, and/or delete device groups. In embodiments, groups can be renamed, devices can be moved among groups, devices can be copied into groups, and/or devices can be rearranged within a group, to name a few.

Figure 21C:
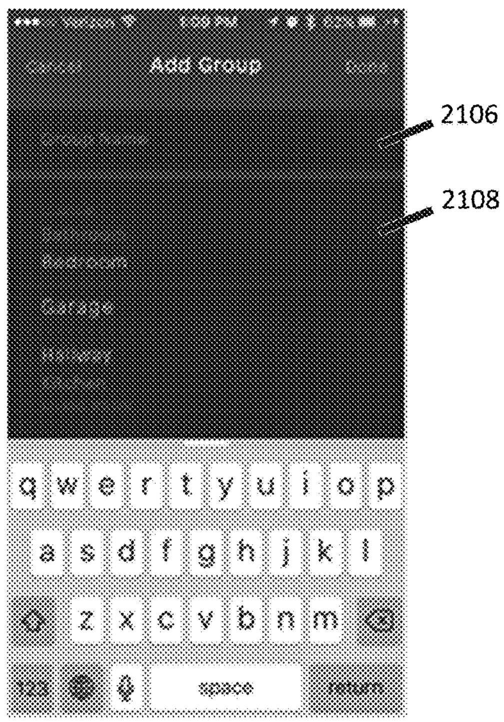

FIG. 21C shows an exemplary add group GUI, which enables a user to create a new device group. In embodiments, the user may select a group name from a predefined list of names 2108, or the user may input a custom group name 2106.

Figure 21D:
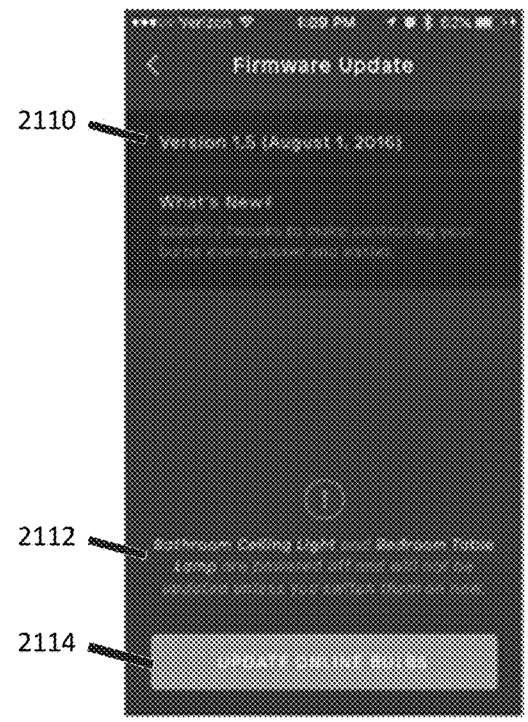

FIG. 21D illustrates an exemplary firmware update GUI. The firmware update GUI may indicate a currently installed firmware version 2110, a release date or installation date of the currently installed firmware version, and/or a firmware update notification, which can indicate that a new firmware version is available and/or features thereof. In embodiments, the firmware update GUI can display notification 2112 to the user related to the update, such as indications that devices should be powered on in order to receive the update 2110. The firmware update GUI can include a selectable graphical element to initiate a firmware update (e.g., update online bulbs graphical option 2114).

Figure 21E:
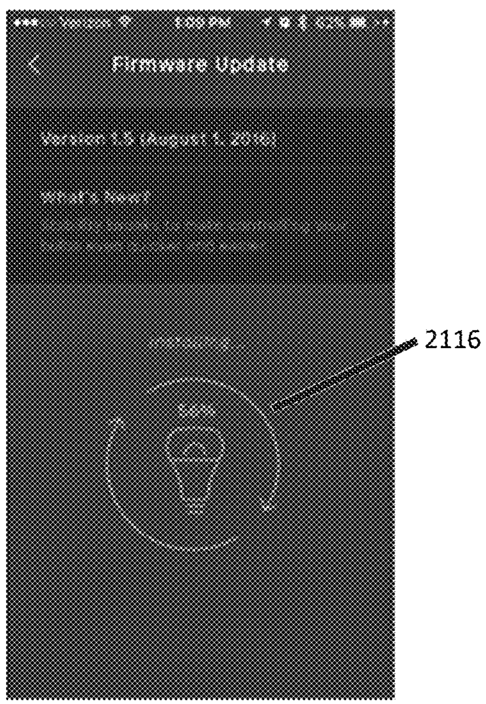

FIG. 21E illustrates an exemplary firmware update GUI during an update installation. The GUI can display a progress indicator 2116 which may comprise a number (e.g., percent complete) or graphical representation (e.g., status bar). In embodiments, during a firmware update of a networked lightbulb the bulb may provide visual indicators by pulsing and/or showing steady light of one or more colors. In embodiments, secondary indicator LEDs may be used to provide visual indicators.

Figure 21F:
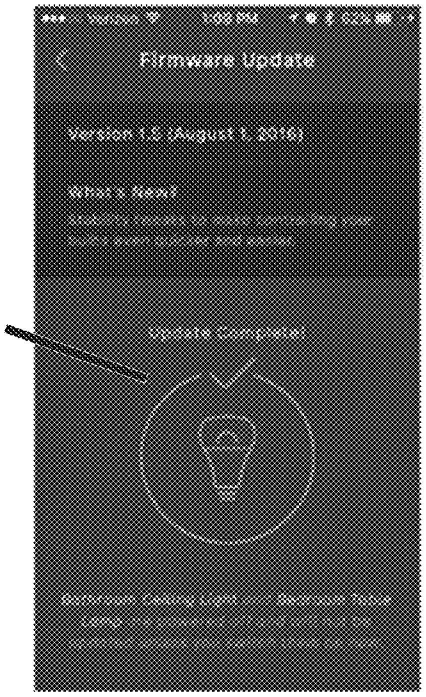

FIG. 21F shows an exemplary firmware update GUI after completion of a firmware update. The GUI may display an indication 2118 that the update is complete and/or may indicate the devices that have been updated and/or the devices have not yet been updated.

FIGS. 22A-H are screen shots of exemplary graphical user interfaces for a networked devices application account setup, application configuration, and device acquisition in accordance with exemplary embodiments of the present invention.

Figure 22A:
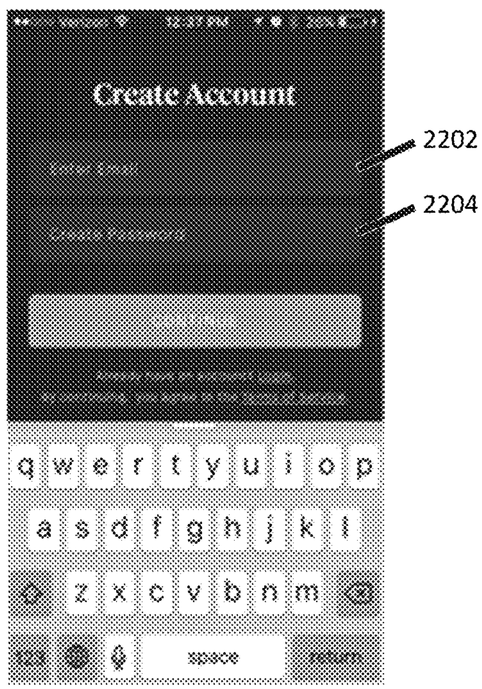

FIG. 22A shows an exemplary account creation GUI 2202, which prompts a user to input login credentials, such as an email address 2202 and password 2204. In embodiments, a username other than an email address may be used.

Figure 22B:
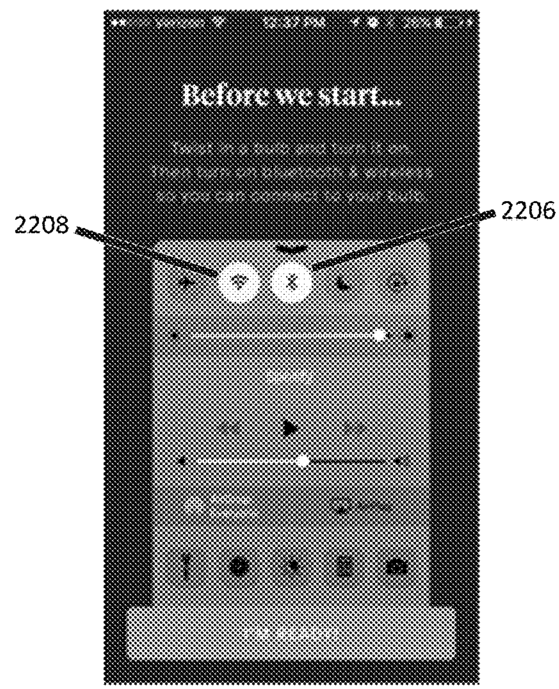

FIG. 22B shows a network configuration GUI, prompting a user to turn on Bluetooth 2206 and Wi-Fi connectivity 2208 so that a network-capable device can be connected to the device network.

Figure 22C:
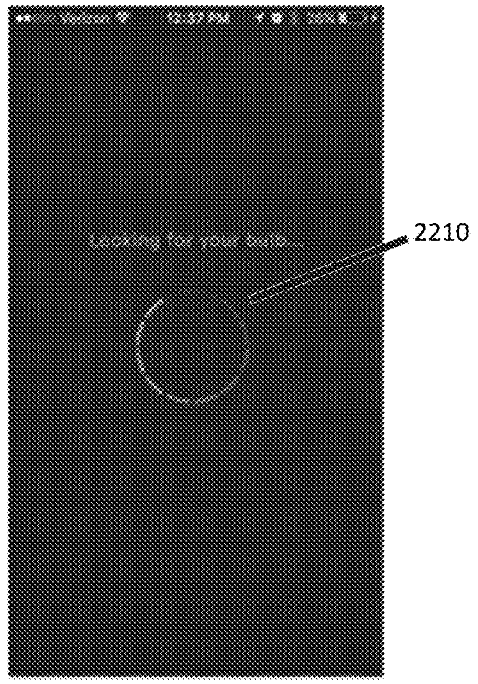

FIG. 22C shows a automatic device search GUI, which indicates to the user that the application is searching for network-capable devices to which to connect. Accordingly, the GUI may comprise a search and/or progress indicator element 2210.

Figure 22D:
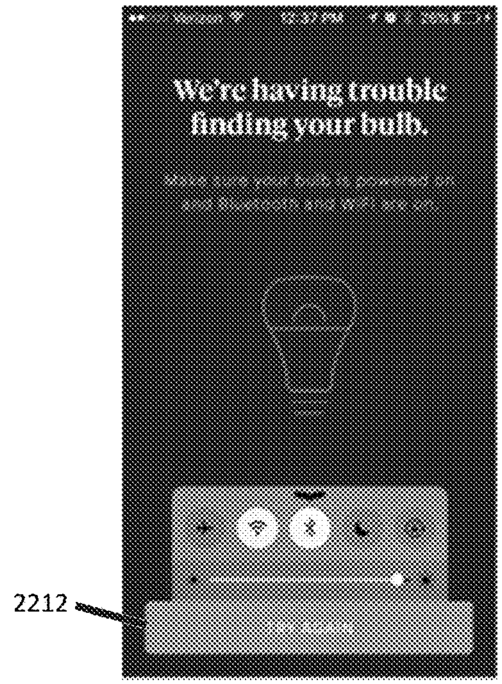

FIG. 22D shows a device search error GUI, which indicates that a network-capable device was not detected. The GUI may include suggestions or instructions to make the device discoverable. In embodiments, the GUI may include a selectable graphical element 2212 to search again for network-capable devices.

FIG. 22E illustrates an exemplary device found GUI. The GUI may indicate one or more devices or device types that were detected. The GUI may identify device names, model numbers, or types corresponding to found network-capable devices. Detected devices may provide a visual indication, such as flashing or steady light or a emitting a particular color of light (e.g., green).

FIG. 22F shows an exemplary device configuration GUI. The GUI may enable a user to set a name of a device (e.g., via text input or selection from one or more predefined and/or hierarchical lists, such as device names list 2214). The GUI may also enable a user to set a group or room for the device.

FIG. 22G illustrates an exemplary speaker network configuration GUI. The GUI may prompt a user to select a data network 2216, such as an Apple AirPlay network, which may be used to play audio via one or more networked device.

FIG. 22H illustrates an exemplary device successful configuration GUI. The GUI can indicate that a particular device was successfully added to the network, e.g., via a device added confirmation notification 2218.

Figure 18:
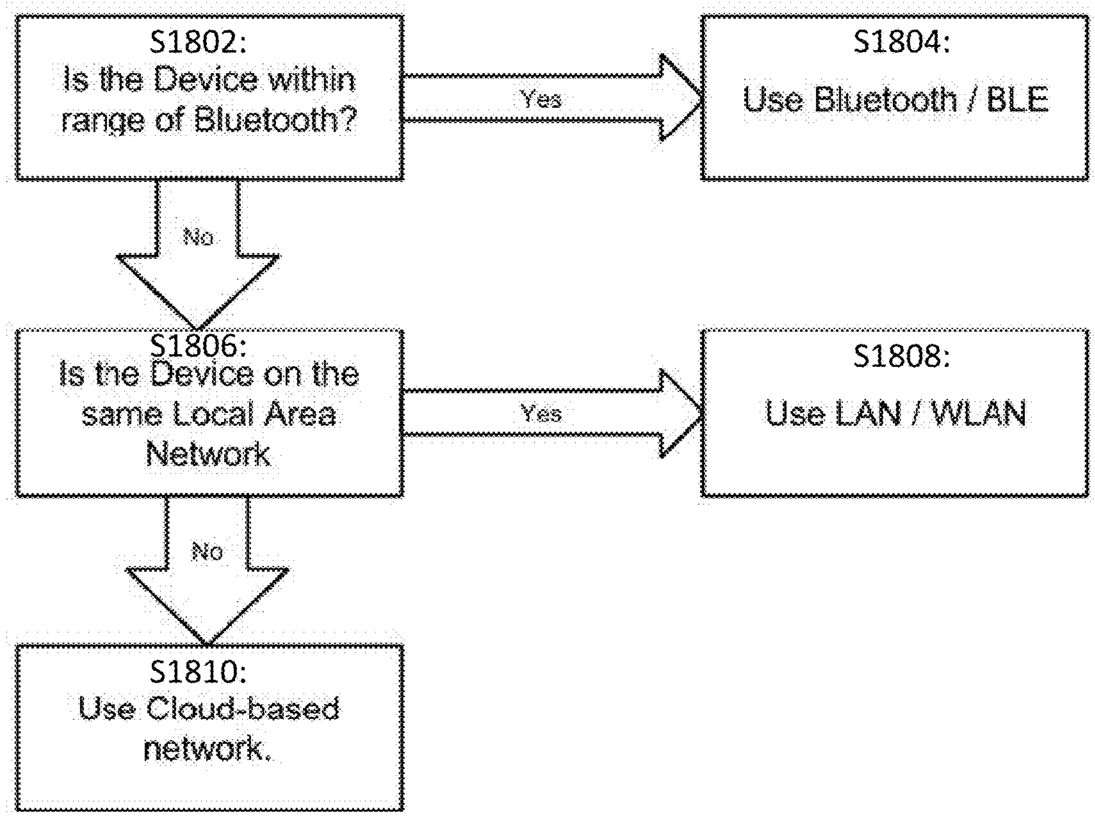
FIG. 18 is a flow chart of a process for network topology decision-making in accordance with exemplary embodiments of the present invention.

FIG. 18 is flow chart showing network topology connection laws specially programmed into the networked device in accordance with exemplary embodiments of the present invention. The connection laws may control the communications protocols used to communicate with various target devices. The connection laws may comprise a preferred ordering of communications protocols (e.g., use Bluetooth Low Energy before Wi-Fi). The connection laws may also comprise connectivity thresholds for evaluating suitable connectivity to maintain communications via a given communications protocol. Accordingly, a device may measure latencies of each of its connections, and the connection laws may comprise evaluation of the latencies. In embodiments, connection laws can comprise determining a connection of least resistance. The connection laws may identify specific communications protocols to use for specific device types (e.g., computers, smart phones, other networked devices, servers, to name a few). The networked device may determine whether the target device is within range of Bluetooth, which may include determining whether a Bluetooth signal from the target device meets or exceeds a threshold signal strength. In a step S1802, if within Bluetooth range, the networked device may determine at step S1804 to communicate via Bluetooth and/or Bluetooth Low Energy. If not within Bluetooth range, the networked device may determine in a step S1806 whether the target device is connected to the same local area network (LAN), which may be a wireless local area network. If connected to the same LAN, the networked device may determine at a step S1808 to communicate with the target device via the LAN, such as using Wi-Fi. If not on the same LAN, the networked device may determine at a step S1810 to communicate with the target device (e.g., a server, smart phone not connected to Wi-Fi, remote computer, to name a few) using a cloud-based network. The cloud-based network can comprise communication over the Internet. Accordingly, the networked device may use Wi-Fi to connect to the Internet through a router. In embodiments, a plurality of external data networks may be involved, such as the Internet and a cellular data network by which the target device accesses the Internet.

Networked devices of the present invention may be programmed to synchronize state. States can include on/off, power level (e.g., corresponding to brightness of a light), volume level, to name a few. For on/off states, turning off a first networked lighting device may cause other associated networked devices (e.g., associated through a group defined using the software) to turn themselves off. Each of a group of networked devices can detect when another member of the group leaves the network (e.g., which may correspond to the device being turned off). Networked devices may broadcast or otherwise transmit periodic signals that identify their states. If a signal from a particular device is not received by one or more other networked devices for a predefined number of transmission cycles (e.g., one, two, or three consecutive cycles, to name a few), the other devices may be programmed to turn off. Accordingly, changing the state and/or turning off a single device may provide a sufficient input to adjust the states of grouped devices. In embodiments, a single device may be designated as the master device, and the other networked devices will adjust state to match the master device. For example, the master device may be a networked device (e.g., networked lightbulb) connected to a switch, such as a wall switch. The other slave devices may not be connected to switches. The present invention provides a mechanism to extend the switch input to the slave devices.

Figure 19:
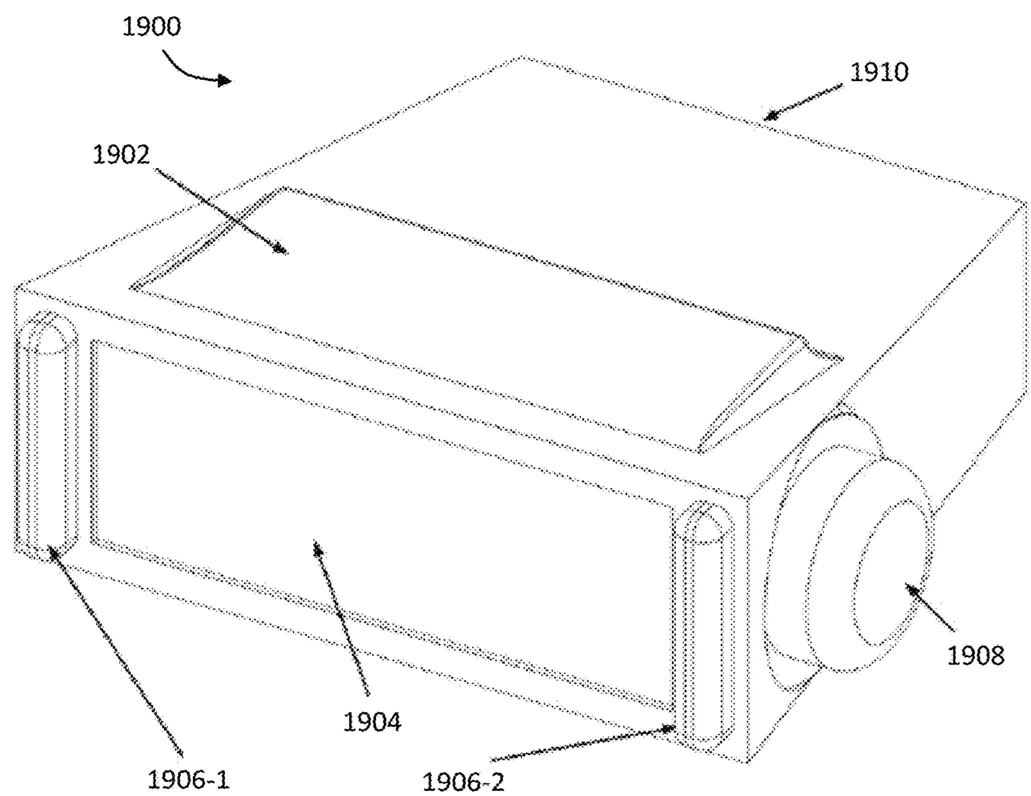
FIG. 19 is a perspective drawing of a networked alarm clock in accordance with exemplary embodiments of the present invention.

FIG. 19 shows an exemplary networked control device 1900 in accordance with the present invention. The networked control device 1900 may be alarm clock 1900. It may include control hardware (e.g., circuitry, antennas, and/or input hardware) for programming or otherwise transmitting control signals to networked devices. Accordingly the networked control device 1900 can include buttons and/or a capacitive touch area 1902 to detect and/or receive user inputs. It can also include a display 1904, which may be a high resolution display screen and/or an e-paper display. An e-paper display may be characterized by low power consumption. The display 1904 may show the time, date, weather, and/or menu information for controlling one or more networked devices, to name a few. The networked control device 1900 can comprise one or more lighting devices 1906 (e.g., 1906-1 and 1906-2), which may function as reading lights and/or which may provide screen illumination, such as for an e-paper display screen. The lights 1906 may be contained within the display bezel. A dimmer knob 1908 or other input device (e.g., buttons or touch capacitive area) may receive user inputs, which it may correspond to requests to dim the lights 1906 and/or networked lighting devices. In embodiments, such a knob 1908 may serve as a control input for other networked devices, such as speakers. The networked control device 1900 can thus provide control over networked devices to turn them on and/or off and/or to adjust their output (e.g., reduce or increase speaker volume, dim or brighten lights). The control device 1900 can provide light-based waking (e.g., to increase light output gradually in accordance with a scheduled alarm time). The control device 1900 can perform sleep tracking to track sleeping state of an individual in proximity to the device. Such tracking may utilize motion sensors and/or audio sensors (e.g., microphones) to detect breathing.

In embodiments, the control device 1900 can provide audio streaming to other networked devices. In embodiments, it can include an audio line in for connecting to wired audio outputs from audio devices (e.g., radios, mp3 players, to name a few). Audio streaming may be achieved using any of a variety of audio streaming protocols, such as Apple Airplay and Google Cast. Bluetooth Low Energy may be used to communicate with other devices. In embodiments, the device itself my output audio, such as by streaming music or other audio content. The device 1900 may receive updates from an external data network, such as weather, news, and/or calendar events, which may be displayed on the screen 1904 and/or may be communicated through audio. Accordingly, the device can include one or more speakers. A speaker may be provided in an audio cavity, which may increase the quality of the output sound without increasing the size of the speaker. Information may be provided through audio using text to speech sound generation and/or by relaying received audio content. Accordingly, the device may stream audio content from one or more sources, including radio broadcasts and/or Internet sources. The device may have charging ports (e.g., USB ports) for charging user electronic devices, such as smart phones and/or tablets. In embodiments, the control device 1900 may be a clock or alarm clock that is not used to control other networked devices. In embodiments, user devices may operatively connect to the control device 1900, e.g., to adjust its settings and/or its programming. Such connection may be made over Bluetooth and/or Wi-Fi, to name a few.

Figure 23:
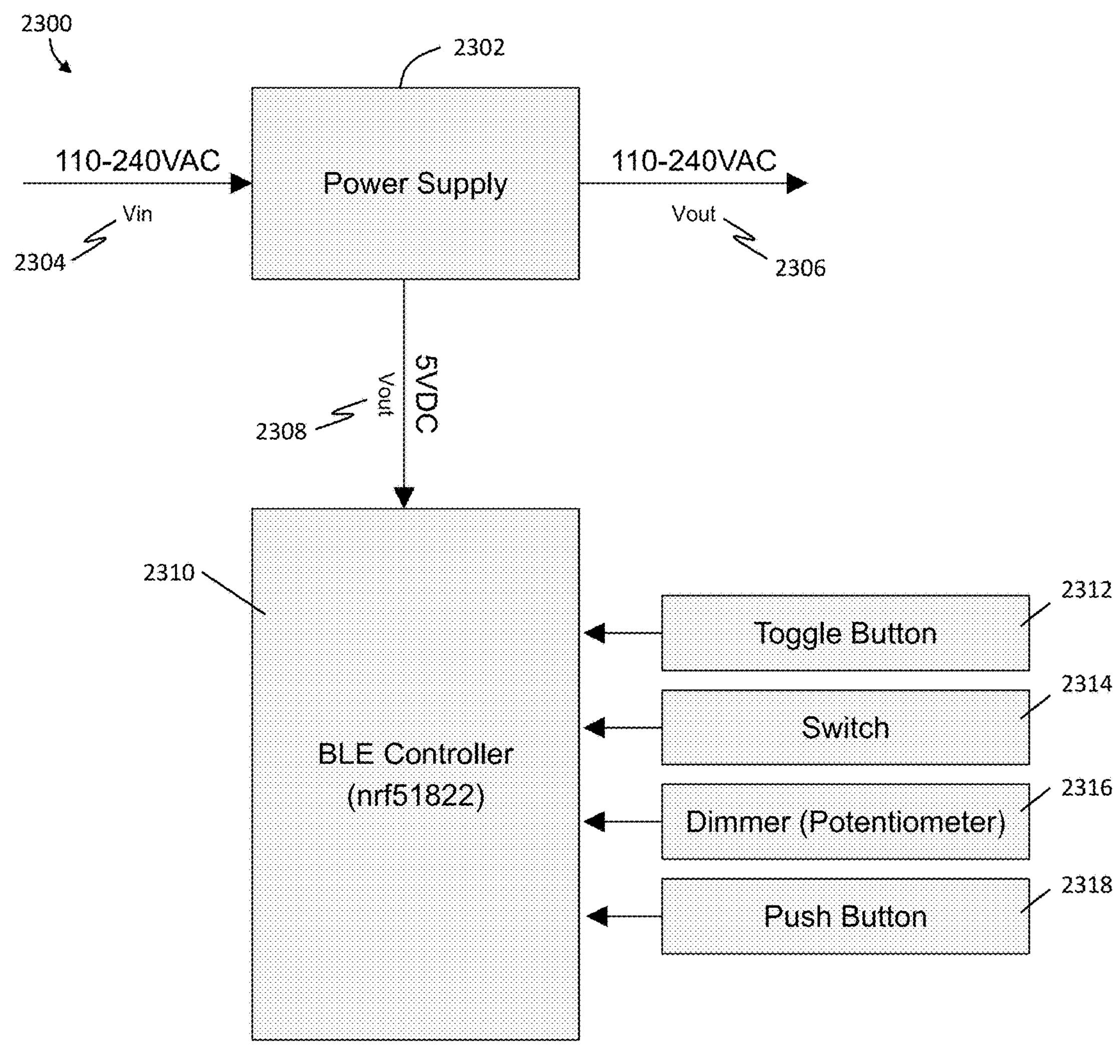
FIG. 23 is a block diagram of a network interface device in accordance with exemplary embodiments of the present invention.

FIG. 23 is a block diagram of network interface device 2300 in accordance with exemplary embodiments of the present invention. A network interface device 2300 may enable other devices to participate in the networked device system described herein, such as by being controlled by and/or communicating with other devices in such system. The network interface device 2300 may comprise an installable and/or integratable unit that can provide power to non-networked devices and also enable networked control of them without re-engineering the non-networked devices other than to locate the network interface device 2300 in line with the input power 2304 and/or to locate associated network-connected physical control input devices (e.g., toggle buttons 2312, switches 2314, dimmer switches 2316, and/or push buttons 2318, to name a few) on the device. In embodiments, a modular network interface device 2300 may be integrated into other products, such as lamps (e.g., table lamps or floor lamps), appliances, speakers, and/or subwoofers, to enable those products to participate in the device network. In embodiments, the network interface device 2300 may comprise a PCB or a plurality of PCBs. The network interface device 2300 and/or such PCBs may include any of the components or circuitry described herein with respect to networked lighting devices.

The network interface device 2300 may be powered by 110 V AC, 240 V AC, or 5 V DC, to name a few. It may comprise power control components such as power conversion circuitry to covert the input power to low voltage direct current to power one or more digital circuits. The power control components may also route power, e.g., high voltage alternating current (e.g., 110 V AC or 240 V AC), to one or more devices, such as a light fixture or other appliance. Input power 2304, which can be standard AC wall power, may be processed at a power supply 2302 or other power control components, which may divert power 2308 (e.g., 5V DC) to components of the network interface device 2300 and may output power 2306 to the non-networked device with which it is integrated (e.g., a lamp). Accordingly, the network interface device 2300 can be installed in line between an input power supply and a non-networked device, such as a standard lamp socket, connected bulb, and/or speaker. The network interface device 2300 may be located internal to devices. In other embodiments, the network interface device 2300 may be an external device comprising a male plug adapted to mate in a wall socket or other power source socket and a female plug adapted to receive a male power plug from a non-networked device.

The network interface device 2300 can comprise one or more control input devices and/or interfaces, such as toggle buttons 2312, switches 2314, dimmers or potentiometers 2316, push buttons 2318, knobs, and/or sliders, to name a few, which may be physically movable controls or touch screen control interfaces. Control input devices can include microphones for voice or audio control and/or cameras for gesture or motion control. Control input devices may be modularly connected to the network interface device 2300 and can enable physical and/or remote control (e.g., via a programmed remote control or a network control application running on or accessed from a user device). Physical inputs may be registered by software in the interface device and synced with software control devices (e.g., available in a mobile application).

The network interface device 2300 may also comprise a communication module configured to communicate with the device network, which may use a Bluetooth Low Energy protocol, one or more Bluetooth protocols (e.g., Bluetooth 4.0 or higher), and/or Wi-Fi. In embodiments, the interface device may include one or more additional communication modules, such as a Wi-Fi communication module in addition to a Bluetooth Low Energy module, or a single module may handle multiple communication protocols. The communication protocols can enable mesh networking (e.g., relaying communications from other sources or transmitting original communications to be relayed across the network) and/or communication with remote servers, such as cloud-based servers. The network interface device 2300 can include one or more controllers, such as microcontrollers, which can comprise one or more processors. In embodiments, a controller 2310 may include one or more processors, one or more communications chipsets, non-transitory computer-readable memory, and/or other control circuitry. An exemplary controller 2310 is the system on a chip model nRF51822 manufactured by Nordic Semiconductor.

The network interface device 2300 may include a real-time clock and accompanying supercapacitor to power the real-time clock. Such components may enable time-based actions, such as timers (e.g., to turn a device such as a lamp on at a predefined time of day and/or to turn a device on after a predefined period of elapsed time). Other time-based actions can include outputting a predefined quality of light or outputting certain audio (e.g., songs, tones, tunes, recordings, or tuning to particular stations or channels) at particular times (e.g., playing such audio at a particular time of day, emitting audio for an alarm, to name a few). Accordingly, the network interface device 2300 can enable networked, intelligent, and/or time-dependent control of otherwise non-networked or non-programmable devices. In embodiments, the network interface device 2300 may include an auxiliary device to enable auxiliary functionality, such as speakers to output audio, lights, cameras, and/or sensors, to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A lighting device for use with one or more other networked devices, comprising:
- (a) an outer globe comprised of an at least partially transparent rigid material and forming the exterior of a head portion of the lighting device;
- (b) a diffuser within the outer globe configured to receive light from one or more light sources and emit diffused light;
- (c) a plurality of light pipes configured to transport light from one or more LEDs to an inner surface of the diffuser, each light pipe a solid conduit comprised of transparent material;
- (d) an outer cowling forming the exterior of a base portion of the lighting device;
- (e) a power input connector located at the base of the lighting device and configured to mate with a standard lightbulb socket;
- (f) a power control printed circuit board within the lighting device operatively connected to the power input connector and disposed at least partially within a heat sink configured to dissipate heat, the power control printed circuit board comprising:
  - (i) a power converter configured to convert alternating current to direct current;
  - (ii) a voltage regulator configured to output steady direct current power at one or more voltages;
  - (iii) an output power connector to output power to one or more other components within the lighting device; and
  - (iv) an output current controller configured to control the output of electric current to the one or more other components within the lighting device;
- (g) a communication and control printed circuit board within the lighting device operatively connected to the power control printed circuit board and comprising:
  - (i) a first wireless communications module operatively connected to a first communications antenna;
  - (ii) an auxiliary device control unit;
- (h) an indicator printed circuit board within the lighting device comprising:
  - (i) a first plurality of LEDs each configured to deliver light to a respective one of the plurality of light pipes;
  - (ii) a real-time clock configured to track time; and
  - (iii) a supercapacitor operatively connected to the real-time clock and configured to provide power to the real-time clock at least in the absence of electricity flowing in to the lighting device via the power input connector;

(i) one or more microprocessors operatively connected to first non-transitory computer-readable memory having stored thereon first processing instructions readable by at least one of the one or more microprocessors;

(j) an auxiliary device mounted within the lighting device closer to the head of the lighting device than the indicator printed circuit board, operatively connected to the communication and control printed circuit board, and configured to receive power from the power control printed circuit board; and (k) an LED lighting printed circuit board mounted within the lighting device closer to the head of the lighting device than the indicator printed circuit board and having an aperture through which the auxiliary device extends, the LED lighting printed circuit board operatively connected to the indicator printed circuit board, configured to receive power from the power control printed circuit board and comprising a second plurality of LEDs configured to deliver light through the diffuser.

2. The lighting device of claim 1, wherein the first plurality of LEDs of the indicator printed circuit board are RGB LEDs.

3. The lighting device of claim 1, wherein the first communications antenna is located on the indicator printed circuit board.

4. The lighting device of claim 1, wherein the first wireless communications module is configured to communicate with one or more of the one or more other networked devices using a mesh network communications protocol.

5. The lighting device of claim 1, further comprising a second wireless communications module operatively connected to a second communications antenna.

6. The lighting device of claim 5, wherein the first wireless communications module is configured to communicate via Wi-Fi and the second wireless communications module is configured to communicate via a Bluetooth protocol.

7. The lighting device of claim 1, wherein at least one of the one or more microprocessors is located on the indicator printed circuit board.

8. The lighting device of claim 1, wherein at least one of the one or more microprocessors is located on the communications and control printed circuit board.

9. The lighting device of claim 1, wherein the communication and control printed circuit board, the indicator printed circuit board, and the LED lighting printed circuit board comprise a stacked circuit board configuration within the lighting device.

10. The lighting device of claim 1, wherein the output current controller comprises an LED driver.

11. The lighting device of claim 1, wherein the auxiliary device control unit comprises at least one of the one or more microprocessors configured to control the auxiliary device.

12. The lighting device of claim 1, wherein the auxiliary device comprises a speaker.

13. The lighting device of claim 1, wherein the first processing instructions comprise time-dependent settings, and the lighting device outputs light according to the time-dependent settings based at least in part upon a time measured by the real-time clock.

14. A lighting device for use with one or more other networked devices, comprising:

(a) an outer globe comprised of an at least partially transparent rigid material and forming the exterior of a head portion of the lighting device;

(b) a diffuser within the outer globe configured to receive light from one or more light sources and emit diffused light;

(c) an LED printed circuit board comprising a plurality of LEDs configured to deliver light through the diffuser;

(d) an outer cowling forming the exterior of a base portion of the lighting device;

(e) a power input connector located at the base of the lighting device and configured to mate with a standard lightbulb socket;

(f) a power control printed circuit board within the lighting device operatively connected to the power input connector and disposed at least partially within a heat sink configured to dissipate heat, the power control printed circuit board comprising:

(i) a power converter configured to convert alternating current to direct current;

(ii) a voltage regulator configured to output steady direct current power at one or more voltages;

(iii) an LED driver configured to control output of power to a plurality of LEDs;

(iv) an output power connector to output power to one or more other components within the lighting device; and (v) an output current controller configured to control the output of electric current to the one or more other components within the lighting device;

(g) one or more printed circuit boards within the lighting device operatively connected to the power control printed circuit board and comprising:

(i) a first wireless communications module operatively connected to a first communications antenna and configured to communicate wirelessly with one or more mobile user devices;

(ii) a real-time clock configured to track time;

(iii) a supercapacitor operatively connected to the real-time clock and configured to provide power to the real-time clock at least in the absence of electricity flowing in to the lighting device via the power input connector; and (iv) one or more microprocessors operatively connected to first non-transitory computer-readable memory having stored thereon first processing instructions readable by at least one of the one or more microprocessors to control the plurality of LEDs, wherein the first processing instructions include instructions to adjust light intensity of the plurality of LEDs based at least in part upon time of day.

15. The lighting device of claim 14, wherein the first wireless communications module is configured to communicate directly with the one or more mobile user devices via a direct wireless connection.

16. The lighting device of claim 14, wherein the first wireless communications module is configured to communicate indirectly with the one or more mobile user devices via at least one data network.

17. The lighting device of claim 14, wherein the first processing instructions comprise time-dependent settings, and the lighting device outputs light according to the time-dependent settings based at least in part upon a time measured by the real-time clock.

18. The lighting device of claim 17, wherein the time-dependent settings indicate a color temperature.

19. The lighting device of claim 17, wherein the time-dependent settings indicate a light intensity.

20. A lighting device for use with one or more other networked devices, comprising:

(a) an outer globe comprised of an at least partially transparent rigid material and forming the exterior of a head portion of the lighting device;

(b) a diffuser within the outer globe configured to receive light from one or more light sources and emit diffused light;

(c) an outer cowling forming the exterior of a base portion of the lighting device;

(d) a power input connector located at the base of the lighting device and configured to mate with a standard lightbulb socket;

(e) power control components comprising:

(i) a power converter configured to convert alternating current to direct current;

(ii) a voltage regulator configured to output steady direct current power at one or more voltages;

(iii) an output power connector to output power to one or more other components within the lighting device; and (iv) an output current controller configured to control the output of electric current to the one or more other components within the lighting device;

(f) communication and control components comprising:

(i) one or more microprocessors operatively connected to non-transitory computer readable memory having stored thereon processing instructions readable by at least one of the one or more microprocessors;

(ii) a first wireless communications module operatively connected to a first communications antenna and to at least one of the one or more microprocessors;

(iii) a real-time clock configured to track time; and (iv) a supercapacitor operatively connected to the real-time clock and configured to provide power to the real-time clock at least in the absence of electricity flowing into the lighting device via the power input connector;

(g) an auxiliary device; and (h) a first plurality of LEDs configured to deliver light through the diffuser.

21. The lighting device of claim 20, wherein the auxiliary device comprises a speaker.

22. The lighting device of claim 20, wherein the auxiliary device comprises a camera.

23. The lighting device of claim 20, wherein the auxiliary device comprises a motion sensor.

24. The lighting device of claim 20, wherein the auxiliary device comprises an air quality sensor.

25. The lighting device of claim 20, wherein the auxiliary device comprises a Wi-Fi repeater.

26. The lighting device of claim 20, wherein at least one of the one or more microprocessors is configured to control the auxiliary device.

27. The lighting device of claim 20, wherein the first communications antenna is located on the indicator printed circuit board.

28. The lighting device of claim 20, wherein the first wireless communications module is configured to communicate with one or more of the one or more other networked devices using a mesh network communications protocol.

29. The lighting device of claim 20, further comprising a second wireless communications module operatively connected to a second communications antenna.

30. The lighting device of claim 29, wherein the first wireless communications module is configured to communicate via Wi-Fi and the second wireless communications module is configured to communicate via a Bluetooth protocol.

31. The lighting device of claim 20, wherein at least one of the one or more microprocessors is located on the indicator printed circuit board.

32. The lighting device of claim 20, wherein at least one of the one or more microprocessors is located on the communications and control printed circuit board.

33. The lighting device of claim 20, wherein the first processing instructions comprise time-dependent settings, and the lighting device outputs light according to the time-dependent settings based at least in part upon a time measured by the real-time clock.

* * * * *